US012143852B2

(12) United States Patent
Di Girolamo et al.

(10) Patent No.: US 12,143,852 B2
(45) Date of Patent: Nov. 12, 2024

(54) MEETING STRICT QoS REQUIREMENTS THROUGH NETWORK CONTROL OF DEVICE ROUTE AND LOCATION

(71) Applicant: IPLA HOLDINGS INC., New York, NY (US)

(72) Inventors: Rocco Di Girolamo, Laval (CA); Michael F. Starsinic, Newtown, PA (US); Catlina Mihaela Mladin, Hatboro, PA (US); Hongkun Li, Malvern, PA (US); Quang Ly, North Wales, PA (US); Jiwan L. Ninglekhu, Conshohocken, PA (US)

(73) Assignee: IPLA HOLDINGS INC., New York, NY (US)

( * ) Notice: Subject to any disclaimer, the term of this patent is extended or adjusted under 35 U.S.C. 154(b) by 587 days.

(21) Appl. No.: 17/431,579

(22) PCT Filed: Feb. 21, 2020

(86) PCT No.: PCT/US2020/019153
§ 371 (c)(1),
(2) Date: Aug. 17, 2021

(87) PCT Pub. No.: WO2020/172491
PCT Pub. Date: Aug. 27, 2020

(65) Prior Publication Data
US 2022/0116814 A1 Apr. 14, 2022

Related U.S. Application Data

(60) Provisional application No. 62/908,806, filed on Oct. 1, 2019, provisional application No. 62/808,389, filed on Feb. 21, 2019.

(51) Int. Cl.
*H04W 28/02* (2009.01)
*H04W 4/02* (2018.01)
*H04W 4/40* (2018.01)

(52) U.S. Cl.
CPC ....... *H04W 28/0268* (2013.01); *H04W 4/027* (2013.01); *H04W 4/40* (2018.02)

(58) Field of Classification Search
CPC ... H04W 28/0268; H04W 4/027; H04W 4/40; H04W 4/021; H04W 24/02; H04W 4/44;
(Continued)

(56) References Cited

U.S. PATENT DOCUMENTS

2016/0282129 A1 9/2016 Wang et al.
2019/0222489 A1\* 7/2019 Shan ................. H04M 15/8022
(Continued)

FOREIGN PATENT DOCUMENTS

CN 108024228 A 5/2018

OTHER PUBLICATIONS

LG electronics, new solution for KI#15; SA WG2, S2-1901807, Feb. 19, 2019 (Year: 2019).\*
(Continued)

*Primary Examiner* — Abdullahi Ahmed
(74) *Attorney, Agent, or Firm* — CHIP LAW GROUP

(57) ABSTRACT

A Network Data Analytic Function (NWDAF) may assist an application server by determining a quality of server (QoS) or delivery timing requirements can be met at a location, e.g., along a route. The NWDAF may collect information from one or more cells near the location, e.g., an Operations and Management (OAM) system. Communications with the NWDAF may be facilitated by a Network Exposure Function (NEF) or an Nnwdaf_AnalyticsInfo_Request service operation. The NWDAF may indicate a potential QoS
(Continued)

change at the location. The application server may be a V2X application server.

23 Claims, 31 Drawing Sheets

(58) Field of Classification Search
CPC .. H04W 4/46; H04L 41/5032; H04L 41/5009; H04L 41/5025; H04L 43/14; H04L 65/80; G01C 21/34
See application file for complete search history.

(56) References Cited

U.S. PATENT DOCUMENTS

| | | | |
|---|---|---|---|
| 2020/0045559 A1* | 2/2020 | Kim | H04W 28/0268 |
| 2020/0112907 A1* | 4/2020 | Dao | H04W 28/0268 |
| 2020/0288296 A1* | 9/2020 | Fiorese | G06N 5/046 |
| 2022/0038946 A1* | 2/2022 | Kim | H04W 28/0284 |
| 2022/0110024 A1* | 4/2022 | Consoli | H04W 28/0268 |
| 2023/0362676 A1* | 11/2023 | Andretzky | H04W 24/02 |

OTHER PUBLICATIONS

Continental Automotive GmbH, "Discussion of Physical Layer Aspects of QoS Prediction for NR V2X", 7 .2.4.4—QoS management, R1-1813112, Nov. 12-15, 2018, 4 pages.
LG Electronics, AT&T, "New solution for KI#15", S2-1901807, SA WG2 Meeting #131, Feb. 25-Mar. 1, 2019, 17 pages.
ZTE, "Solution proposal on the key Issue", 3GPP Draft, S2-1810595, 3rd Generation Partnership Project, Oct. 9, 2018.

\* cited by examiner

MEETING STRICT QoS REQUIREMENTS THROUGH NETWORK CONTROL OF DEVICE ROUTE AND LOCATION

CROSS-REFERENCE TO RELATED APPLICATIONS

This application is the National Stage Application of International Patent Application No. PCT/US2020/019153, filed Feb. 21, 2020 which claims the benefit of U.S. Patent Application Ser. No. 62/808,389, filed on Feb. 21, 2019, and U.S. Patent Application Ser. No. 62/908,806, filed on Oct. 1, 2019, both titled, "Meeting Strict QoS Requirements through Network Control of Device Route and Location," the contents of which are hereby incorporated by reference in their entireties.

BACKGROUND

This disclosure pertains to the management of quality of service in digital networks as described, for example, in: 3GPP TS 22.261, Service requirements for the 5G system; Stage 1, V16.5.0 (2018-09); 3GPP TS 23.287 Architecture enhancements for 5G System (5GS) to support Vehicle-to-Everything (V2X) services V1.1.0 (2019-07); 3GPP TS 23.501, System Architecture for the 5G System; Stage 2, V15.2.0 (2018-06); 3GPP TS 23.502, Procedures for the 5G System; Stage 2, V15.2.0 (2018-06); 3GPP TR 22.832, Study on enhancements for cyber-physical control applications in vertical domains; V1.0.0 (2019-05); and 3GPP TR 23.786, Study on architecture enhancements for EPS and the 5G System to support advanced V2X services, V0.9.0 (2018-10).

SUMMARY

Cellular networks may not be able to always guarantee the required QoS of a service. One of the main reasons for this shortcoming is that the signal quality in a cell depends on radio conditions. These radio conditions fluctuate as a result of fading, interference, shadowing, obstacles, environmental conditions, etc. If a cellular network wants to compensate for a poor radio signal, it has a few options available, but these are all at the "radio level." For example, the cellular network may increase the transmission power, change the modulation and coding scheme, or change the antenna configuration.

Another potential mechanism to combat a poor radio signal is to physically move the device to an area with better coverage. This solution is applicable to several use cases, namely in cases where a device must travel long distances, or where a device can still perform its tasks anywhere in a limited geographical area. Using a smartphone analogy, when a user on the east side of a building has a poor data connection, the network could direct the user to a location with better signal strength (for example, the west side).

Allowing a cellular network to control the location of a device (or give advice on how to change the location of a device) in order to increase coverage provides another way to meet strict QoS requirements of some applications (like the V2X applications that control autonomous vehicles).

A potential mechanism to meet strict QoS requirements for sidelink communications is to allow the cellular network to provide input into resource management by providing sidelink communication policies for specific tasks based on information and requests provided by the device or an Application Function.

Methods and systems are disclosed herein to allow the cellular network to change or recommend a change to the location of a device, the route of a device, the speed of a device, and the physical distance between devices. Methods are also disclosed herein to allow the cellular network to provide input into resource management for sidelink communications requiring strict QoS requirements by providing sidelink communication policies for specific tasks based on information received from the device or an Application Function. To enable this, methods and systems are also disclosed to have the cellular network maintain route information for a device, have the cellular network maintain sojourn areas for a device (these may be areas where the device is willing to move in order to improve its coverage), and have the network recursively look for better routes or locations that meet the QoS needs of applications.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed.

DETAILED DESCRIPTION

Figure 1A:
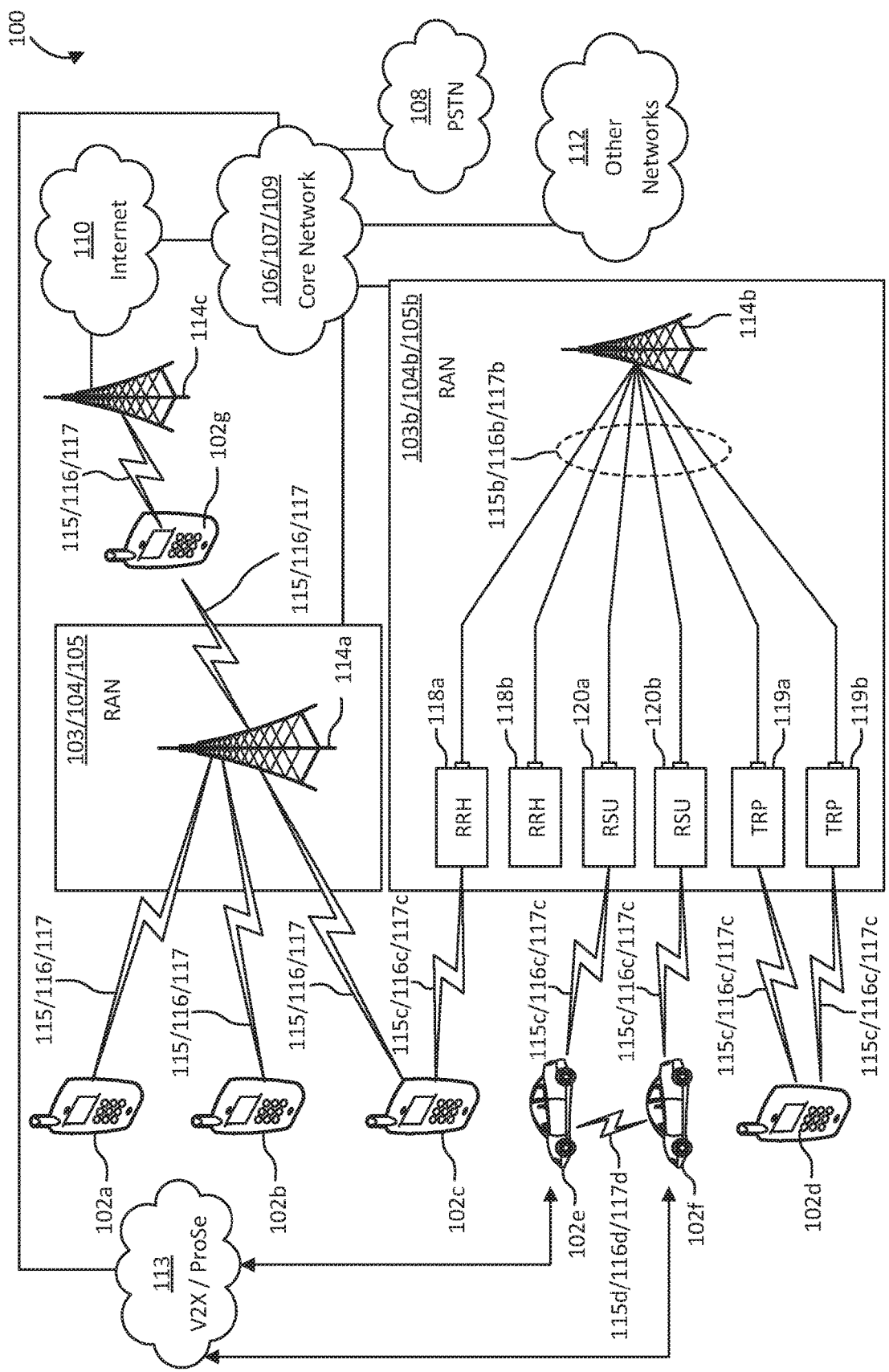
FIG. 1A illustrates one embodiment of an example communications system in which the methods and apparatuses described and claimed herein may be embodied.

Cellular networks may not be able to always guarantee the required QoS of a service. An example reason for this shortcoming is that the latency and/or packet error rate increases due to interference in a radio cell. Current solutions try to solve this using reactive mechanisms. If the needed QoS cannot be met, the core network may be required to notify the impacted applications so that these applications may take an appropriate action. The core network may send the notification in advance of the QoS failure in order to give the application enough time to react. In most cases, the applications adapt to this warning, but the end effect is a reduced service offering. For example, in the autonomous driving scenario, if the QoS is such that the network cannot meet the requirements to allow fully autonomous driving, then the V2X application would transition the vehicle to a lesser "Level of Automation" (such as manual driving). In such a case, the benefit of the fully automated driving is lost.

When the network cannot meet the QoS requirements of an application, the network may take a more proactive approach and try to maintain the service requested by the applications. Three proactive options are possible. First, is to move the device to a location where the QoS will be met. Second is to change the route of the device so that problem cells are avoided. Third is to hand over the device to another cell or operator that can meet the QoS requirements.

When the service requirements of an application are applied to sidelink communications a possible proactive approach is for the network to change sidelink communication policies dynamically.

One problem is that current cellular systems cannot move a device to a specific location or direct the device to follow certain routes. In fact, the location and route of a device are imposed onto the network. As a secondary issue, even if the cellular network could move a device or change the route of a device, there is no mechanism to give guidance to the network so that it can make these decisions. As a tertiary issue for sidelink communications, there is no mechanism to dynamically change the sidelink communication policies at the device, based on network information about link conditions.

Example Communication System and Networks

The $3^{rd}$ Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrums below 7 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency communication (URLLC), massive machine type communications (mMTC), network operation (e.g., network slicing, routing, migration and interworking, and energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones. All of these use cases and others are contemplated herein.

FIG. 1A illustrates one embodiment of an example communications system 100 in which the methods and apparatuses described and claimed herein may be embodied. As shown, the example communications system 100 may include wireless transmit/receive units (WTRUs) 102a, 102b, 102c, 102d, 102e, 102f, and/or 102g (which generally or collectively may be referred to as WTRU 102), a radio access network (RAN) 103/104/105/103b/104b/105b, a core network 106/107/109, a public switched telephone network (PSTN) 108, the Internet 110, other networks 112, and V2X server (or ProSe function and server) 113, though it will be appreciated that the disclosed embodiments contemplate any number of WTRUs, base stations, networks, and/or network elements. Each of the WTRUs 102a, 102b, 102c, 102d, 102e, 102f, and 102g may be any type of apparatus or device configured to operate and/or communicate in a wireless environment. Although each WTRU 102a, 102b, 102c, 102d, 102e, 102f, and 102g is depicted in FIGS. 1A-1E as a hand-held wireless communications apparatus, it is understood that with the wide variety of use cases contemplated for wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane.

The communications system 100 may also include a base station 114a and a base station 114b. Base stations 114a may be any type of device configured to wirelessly interface with at least one of the WTRUs 102a, 102b, and 102c to facilitate access to one or more communication networks, such as the core network 106/107/109, the Internet 110, Network Services 113, and/or the other networks 112. Examples of Network Services may include V2X Services, ProSe Services, IoT Services, Video Streaming, Edge Computing, etc. Base stations 114b may be any type of device configured to wiredly and/or wirelessly interface with at least one of the Remote Radio Heads (RRHs) 118a and 118b, Transmission and Reception Points (TRPs) 119a, 119b, and/or Roadside Units (RSUs) 120a and 120b to facilitate access to one or more communication networks, such as the core network 106/107/109, the Internet 110, other networks 112, and/or Network Services 113. RRHs 118a and 118b may be any type of device configured to wirelessly interface with at least one of the WTRU 102c, to facilitate access to one or more communication networks, such as the core network 106/107/109, the Internet 110, Network Services 113, and/or other networks 112. TRPs 119a and 119b may be any type of device configured to wirelessly interface with at least one of the WTRU 102d, to facilitate access to one or more communication networks, such as the core network 106/107/109, the Internet 110, Network Services 113, and/or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, and/or Network Services 113. By way of example, the base stations 114a and 114b may be a base transceiver station (BTS), a Node-B, an eNode B, a Home Node B, a Home eNode B, a next generation node-B (gNode B), a satellite, a site controller, an access point (AP), a wireless router, and the like. While the base stations 114a and 114b are each depicted as a single element, it will be appreciated that the base stations 114a and 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, and mmWave). The air interface 115/116/117 may be established using any suitable radio access technology (RAT).

The base stations 114b may communicate with one or more of the RRHs 118a, 118b, TRPs 119a, 119b, and/or RSUs 120a and 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, and mmWave). The air interface 115b/116b/117b may be established using any suitable radio access technology (RAT).

The RRHs 118a, 118b, TRPs 119a, 119b and/or RSUs 120a, 120b, may communicate with one or more of the WTRUs 102c, 102d, 102e, and 102f over an air interface 115c/116c/117c, which may be any suitable wireless communication link (e.g., radio frequency (RF), microwave, infrared (IR), ultraviolet (UV), visible light, cmWave, and mmWave). The air interface 115c/116c/117c may be established using any suitable radio access technology (RAT).

The WTRUs 102a, 102b, 102c, 102d, 102e, 102f, and/or 102g may communicate with one another over a direct air interface 115d/116d/117d, such as Sidelink communication, (not shown in the figures), which may be any suitable wireless communication link (e.g., radio frequency (RF), microwave, infrared (IR), ultraviolet (UV), visible light, cmWave, and mmWave). The air interface 115d/116d/117d may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and/or RSUs 120a and 120b in the RAN 103b/104b/105b and the WTRUs 102c, 102d, 102e, and 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a in the RAN 103/104/105 and the WTRUs 102a, 102b, 102c, or RRHs 118a, 118b, TRPs 119a, 119b, and/or RSUs 120a and 120b in the RAN 103b/104b/105b and the WTRUs 102c and 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). The air interface 115/116/117 or 115c/116c/117c may implement the 3GPP NR technology. The LTE and LTE-A technology includes LTE D2D and V2X technologies and interface (such as Sidelink communications and etc.). The 3GPP NR technology includes NR V2X technologies and interface (such as Sidelink communications and etc.).

In an embodiment, the base station 114a in the RAN 103/104/105 and the WTRUs 102a, 102b, 102c, or RRHs 118a, 118b, TRPs 119a, 119b and/or RSUs 120a, 120b in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, NR, etc.) to establish a picocell or femtocell. As shown in FIG. 1A, the base station 114c may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, messaging, authorization and authentication, applications, and/or voice over internet protocol (VoIP) services to one or more of the WTRUs 102a, 102b, 102c, 102d, and 102f For example, the core network 106/107/109 may provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 1A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102a, 102b, 102c, 102d, 102e, and 102f to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The other networks 112 may include wired or wireless communications networks owned and/or operated by other service providers. For example, the networks 112 may include any type of packet data network (e.g., an IEEE 802.3 ethernet network) or another core network connected to one or more RANs, which may employ the same RAT as the RAN 103/104/105 and/or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links. For example, the WTRU 102g shown in FIG. 1A may be configured to communicate with the base station 114a, which may employ a cellular-based radio technology, and with the base station 114c, which may employ an IEEE 802 radio technology.

Although not shown in FIG. 1A, it will be appreciated that a User Equipment may make a wired connection to a gateway. The gateway maybe a Residential Gateway (RG). The RG may provide connectivity to a Core Network 106/107/109. It will be appreciated that many of the ideas contained herein may equally apply to UEs that are WTRUs and UEs that use a wired connection to connect to a network. For example, the ideas that apply to the wireless interfaces 115, 116, 117 and 115c/116c/117c may equally apply to a wired connection.

Figure 1B:
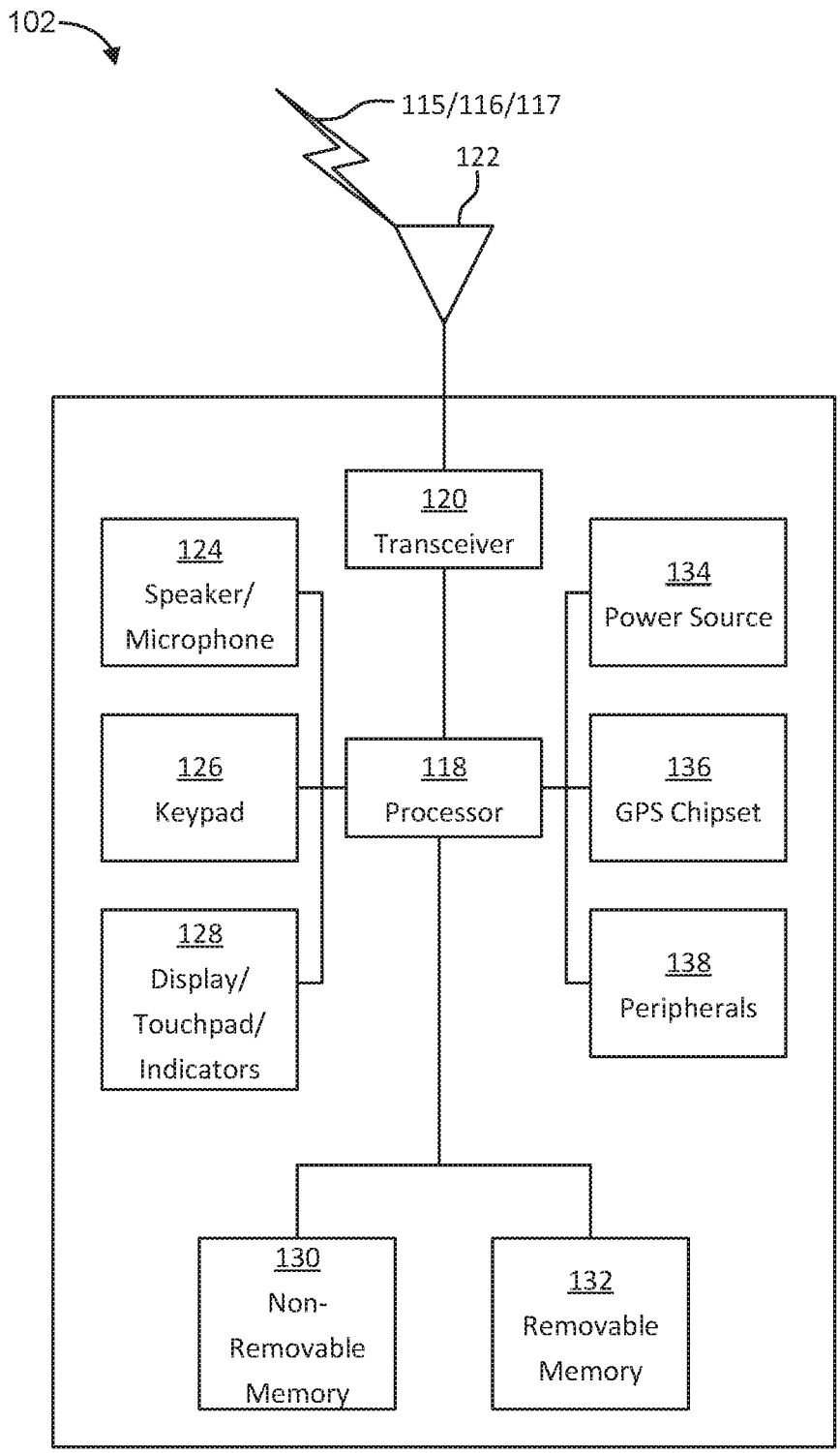
FIG. 1B is a block diagram of an example apparatus or device configured for wireless communications in accordance with the embodiments illustrated herein.

FIG. 1B is a block diagram of an example apparatus or device configured for wireless communications in accordance with the embodiments illustrated herein, such as for example, a WTRU 102. As shown in FIG. 1B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node B (eNode B), a home evolved node-B (HeNB), a home evolved node-B gateway, a next generation node-B (gNode-B), and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), and a state machine. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a) over the air interface 115/116/117 or another UE over the air interface 115d/116d/117d. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless or wired signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server that is hosted in the cloud or in an edge computing platform or in a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a and 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, a biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, and an internet browser.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 1C:
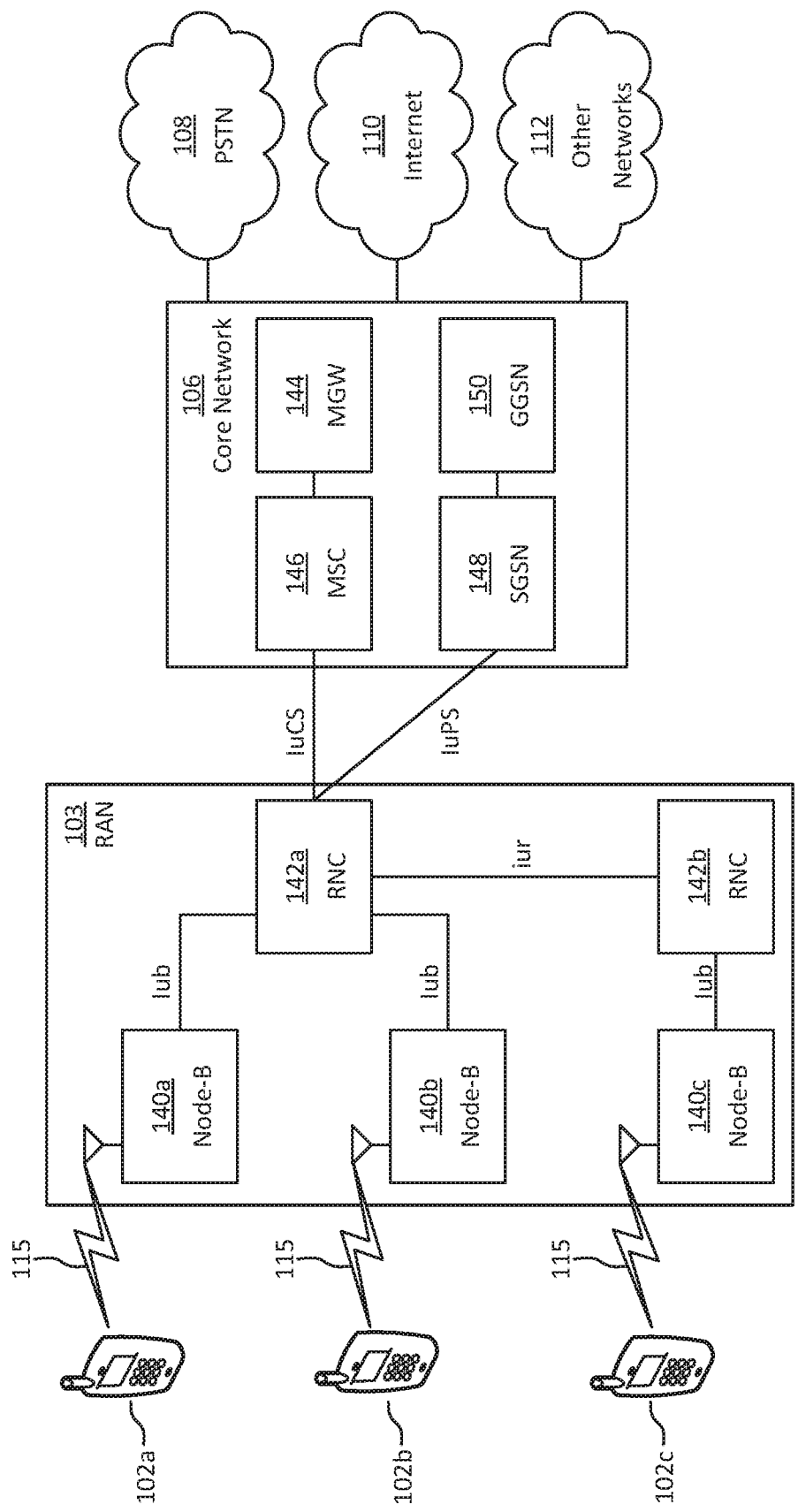
FIG. 1C is a system diagram of an example radio access network (RAN) and core network (CN) in accordance with an embodiment.

FIG. 1C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 1C, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a and 142b. It will be appreciated that the RAN 103 may include any number of Node-Bs and RNCs while remaining consistent with an embodiment.

As shown in FIG. 1C, the Node-Bs 140a and 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a, 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, 102c and IP-enabled devices.

As noted above, the core network 106 may also be connected to the other networks 112, which may include other wired or wireless networks that are owned and/or operated by other service providers.

Figure 1D:
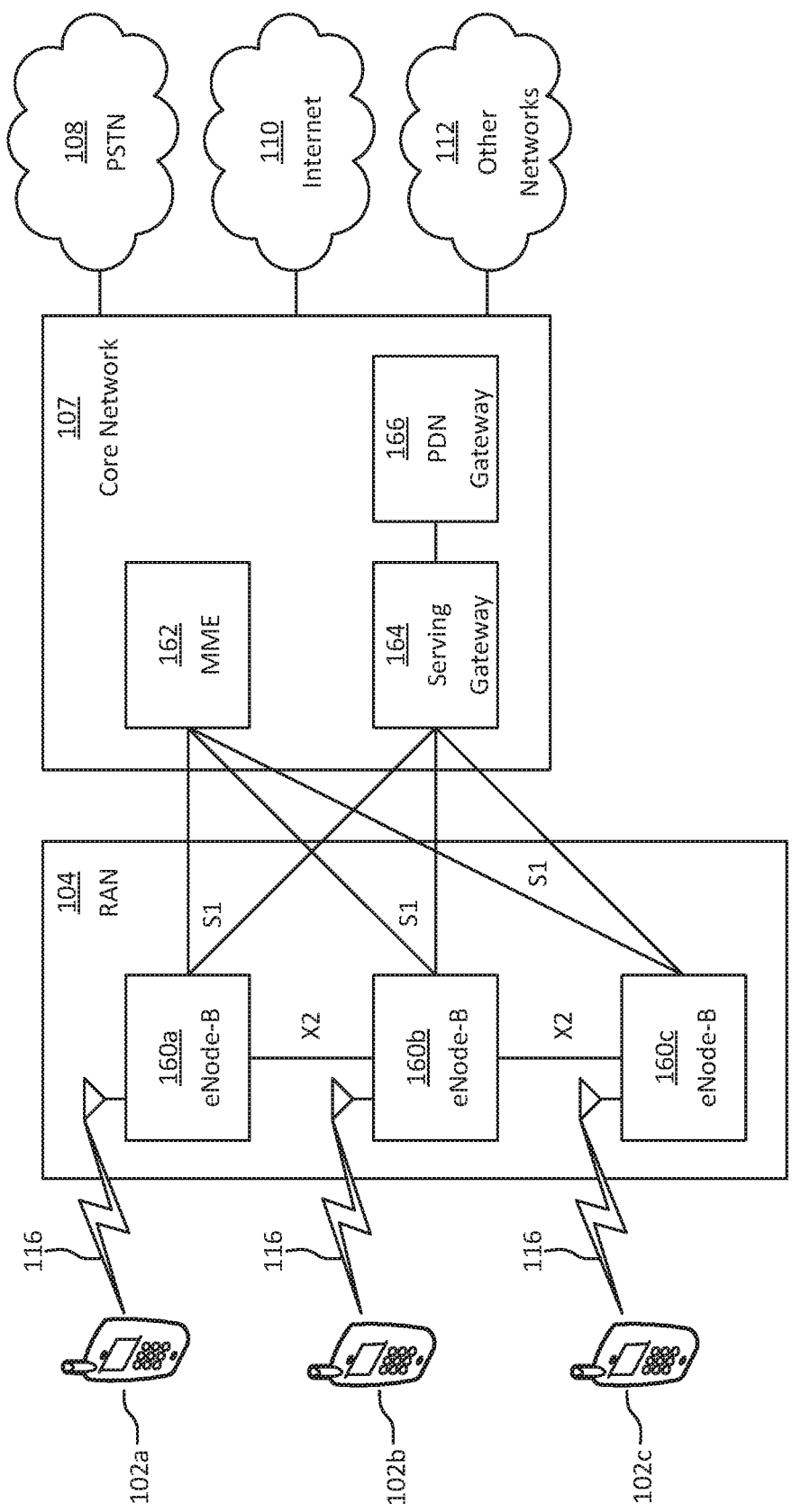
FIG. 1D is another system diagram of a RAN and core network according to another embodiment.

FIG. 1D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode Bs 160a, 160b, and 160c, though it will be appreciated that the RAN 104 may include any number of eNode Bs while remaining consistent with an embodiment. The eNode Bs 160a, 160b, and 160c may each include one or more transceivers for communicating with the WTRUs 102a, 102b, and 102c over the air interface 116. In an embodiment, the eNode Bs 160a, 160b, and 160c may implement MIMO technology. Thus, the eNode B 160a, for example, may use multiple antennas to transmit wireless signals to, and receive wireless signals from, the WTRU 102a.

Each of the eNode Bs 160a, 160b, and 160c may be associated with a particular cell (not shown) and may be configured to handle radio resource management decisions, handover decisions, scheduling of users in the uplink (UL) and/or downlink (DL), and the like. As shown in FIG. 1D, the eNode Bs 160a, 160b, and 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode Bs 160a, 160b, and 160c in the RAN 104 via an Si interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c. The MME 162 may also provide a control plane function for switching between the RAN 104 and other RANs (not shown) that employ other radio technologies, such as GSM or WCDMA.

The serving gateway 164 may be connected to each of the eNode Bs 160a, 160b, and 160c in the RAN 104 via the Si interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned and/or operated by other service providers.

Figure 1E:
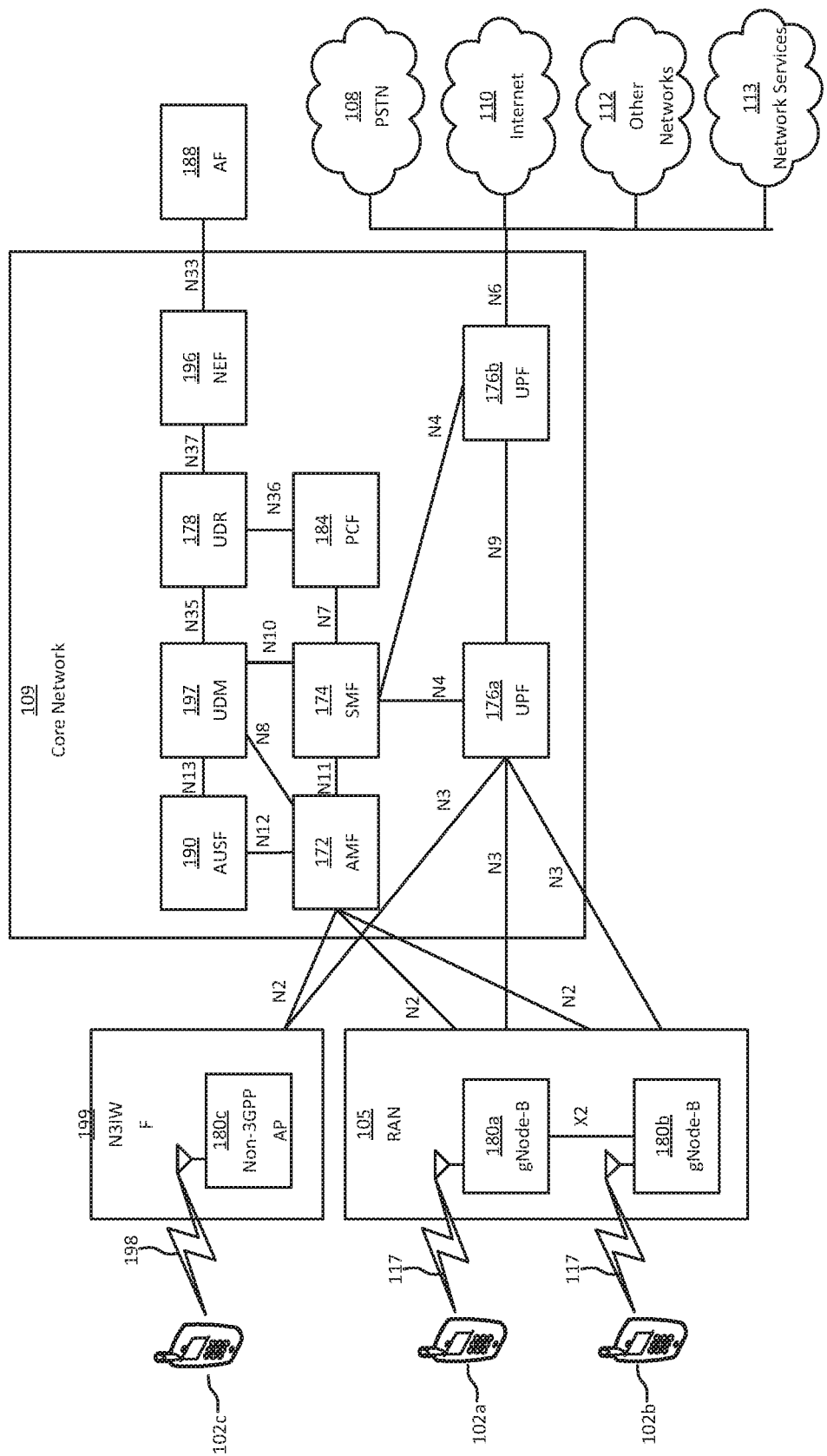
FIG. 1E is another system diagram of a RAN and core network according to another embodiment.

FIG. 1E is a system diagram of the RAN 105 and the core network 109 according to an embodiment. The RAN 105 may employ an NR radio technology to communicate with the WTRUs 102a and 102b over the air interface 117. The RAN 105 may also be in communication with the core network 109. The N3IWF 199 may employ a non-3GPP radio technology to communicate with the WTRU 102c over the air interface 198. The N3IWF 199 may also be in communication with the core network 109.

The RAN 105 may include gNode-Bs 180a and 180b though it will be appreciated that the RAN 105 may include any number of gNode-Bs while remaining consistent with an embodiment. The gNode-Bs 180a and 180b may each include one or more transceivers for communicating with the WTRUs 102a and 102b over the air interface 117. In an embodiment that uses an integrated access and backhaul connection, the same air interface may be used between the WTRUs and gNode-Bs which may be the core network 109 via one or multiple gNBs. In an embodiment, the gNode-Bs 180a and 180b may implement MIMO, MU-MIMO, and/or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode B. It should also be appreciated the RAN 105 may employ more than one type of base station. For example, the RAN may employ eNode Bs and gNode-Bs.

The N3IWF 199 may include a non-3GPP Access Point 180c though it will be appreciated that the N3IWF 199 may include any number of non-3GPP Access Points while remaining consistent with an embodiment. The non-3GPP Access Point 180c may include one or more transceivers for communicating with the WTRUs 102c over the air interface 198. In an embodiment, the non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink and/or downlink, and the like. As shown in FIG. 1E, the gNode-Bs 180a and 180b may communicate with one another over an Xn interface.

The core network 109 shown in FIG. 1E may be the 5G Core Network (5GC) The 5GC may offer numerous communication services to customers who are interconnected by the radio access network. The 5G Core Network 109 comprises a number of entities that perform the functionality of the core network. As used herein, the term "core network entity" or "network function" refers to any entity that performs one or more functionalities of a core network. It is understood that such core network entities may be logical entities that are implemented in the form of software (i.e., computer-executable instructions) stored in a memory of, and executing on a processor of, an apparatus configured for wireless and/or network communications or a computer system such as those illustrated in FIG. 1F.

As shown in FIG. 1E, the 5G Core Network 109 may include an access and mobility management function (AMF) 172, a session management function (SMF) 174, user plane functions (UPF) 176a and 176b, a user data management function (UDM) 197, an authentication server function (AUSF) 190, a Network Exposure Function (NEF) 196, a policy control function (PCF) 184, a non-3GPP interworking function (N3IWF) 199 an application function (AF) 188, a User Data Repository (UDR) 178. While each of the foregoing elements are depicted as part of the 5G core network 109, it will be appreciated that any one of these elements may be owned and/or operated by an entity other than the core network operator. It should also be appreciated that the 5G core network may not consist of all of these elements, may consist of additional elements, and may consist of multiple instances of each of these elements. FIG. 1E shows that network functions directly connect to one another, however, it should be appreciated that they may communicate via routing agents such as a diameter routing agent or message buses. Although FIG. 1E shows that connectivity between network functions is achieved via a set of interfaces, or reference points, it should be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 1E.

The SMF 174 may be connected to the AMF 172 via an N11 interface, may be connected to a PCF 184 via an N7 interface, and may be connected to the UPF 176 via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF176b may provide the WTRUs 102a, 102b, and 102c with access to a packet data network (DN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199 via an N2 interface. The N3IWF facilities a connection between the WTRU 102c and the 5G core network 170 via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and connected to an application function (AF) 188 via an N5 interface. The N15 and N5 interfaces are not shown in FIG. 1E. The PCF 184 may provide policy rules to control plane nodes such as the AMF 172 and SMF 174, allowing the control plane nodes to enforce these rules. The PCF 184 may send policies to the AMF 172 for the WTRUs 102a, 102b, and 102c so that the AMF may deliver the polices to the WTRUs 102a, 102b, 102c via an N1 interface. Polices may then be enforced, or applied, at the WTRUs 102a, 102b, 102c.

The UDR 178 acts as a repository for authentication credentials and subscription information. The UDR may connect to Network Functions so that Network Function can add to, read from, and modify the data that is in the repository. For example, the UDR 178 may connect to the PCF 184 via an N36 interface, the UDR 178 may connect to the NEF 196 via an N37 interface, and the UDR 178 may connect to the UDM 197 via an N35 interface.

The UDM 197 may serve as an interface between the UDR 178 and other Network Functions. The UDM 197 may authorize Network Functions access of the UDR 178. For example, the UDM 197 may connect to the AMF 172 via an N8 interface, the UDM 197 may connect to the SMF 174 via an N10 interface, and the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions 188. Exposure occurs on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g., in the areas of functionality, performance, and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of Network Slicing techniques, it is likely that the network architecture would not be flexible and scalable enough to efficiently support a wider range of use cases need when each use case has its own specific set of performance, scalability and availability requirements. Furthermore, introduction of new network services should be made more efficient.

In a network slicing scenario, a WTRU 102*a*, 102*b*, and 102*c* may connect to an AMF 172, via an N1 interface. The AMF may be logically part of one or more slices. The AMF may coordinate the WTRU's connection or communication with one or more UPF(s) 176, SMF(s) 174, and other Network Functions. Each of the UPF(s) 176, SMF(s) 174, and other Network Functions may be part of different or the same slices. When they are part of different slices, they may be isolated from each other in the sense that they may utilize different computing resources, security credentials, etc.

The 5G core network 109 may facilitate communications with other networks. For example, the 5G core network 109 may include, or may communicate with, an IP gateway (e.g., an IP multimedia subsystem (IMS) server) that serves as an interface between the 5G core network 109 and the PSTN 108. For example, the core network 109 may include, or communicate with a short message service (SMS) service center that facilities communication via the short message service. For example, the 5G core network 109 may facilitate the exchange of non-IP data packets between the WTRUs 102*a*, 102*b*, and 102*c* and servers or applications functions 188. In addition, the core network 170 may provide the WTRUs 102*a*, 102*b*, and 102*c* with access to the networks 112, which may include other wired or wireless networks that are owned and/or operated by other service providers.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 1F:
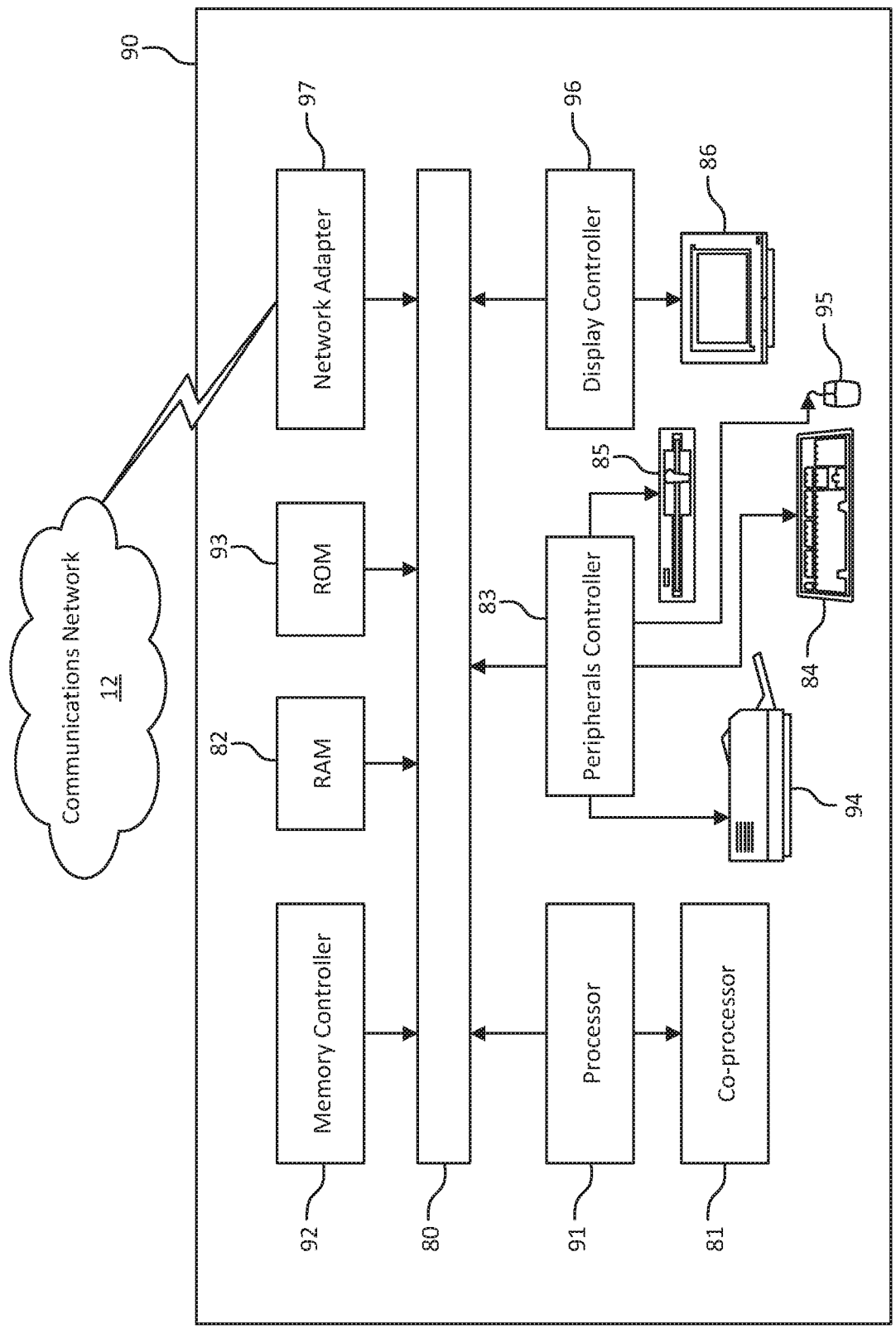
FIG. 1F is a block diagram of an exemplary computing system 90 in which one or more apparatuses of the communications networks illustrated in FIGS. 1A, 1C, 1D, and 1E may be embodied.

FIG. 1F is a block diagram of an exemplary computing system 90 in which one or more apparatuses of the communications networks illustrated in FIGS. 1A, 1C, 1D, and 1E may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the Peripheral Component Interconnect (PCI) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, a LCD-based flat-panel display, a gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 1G:
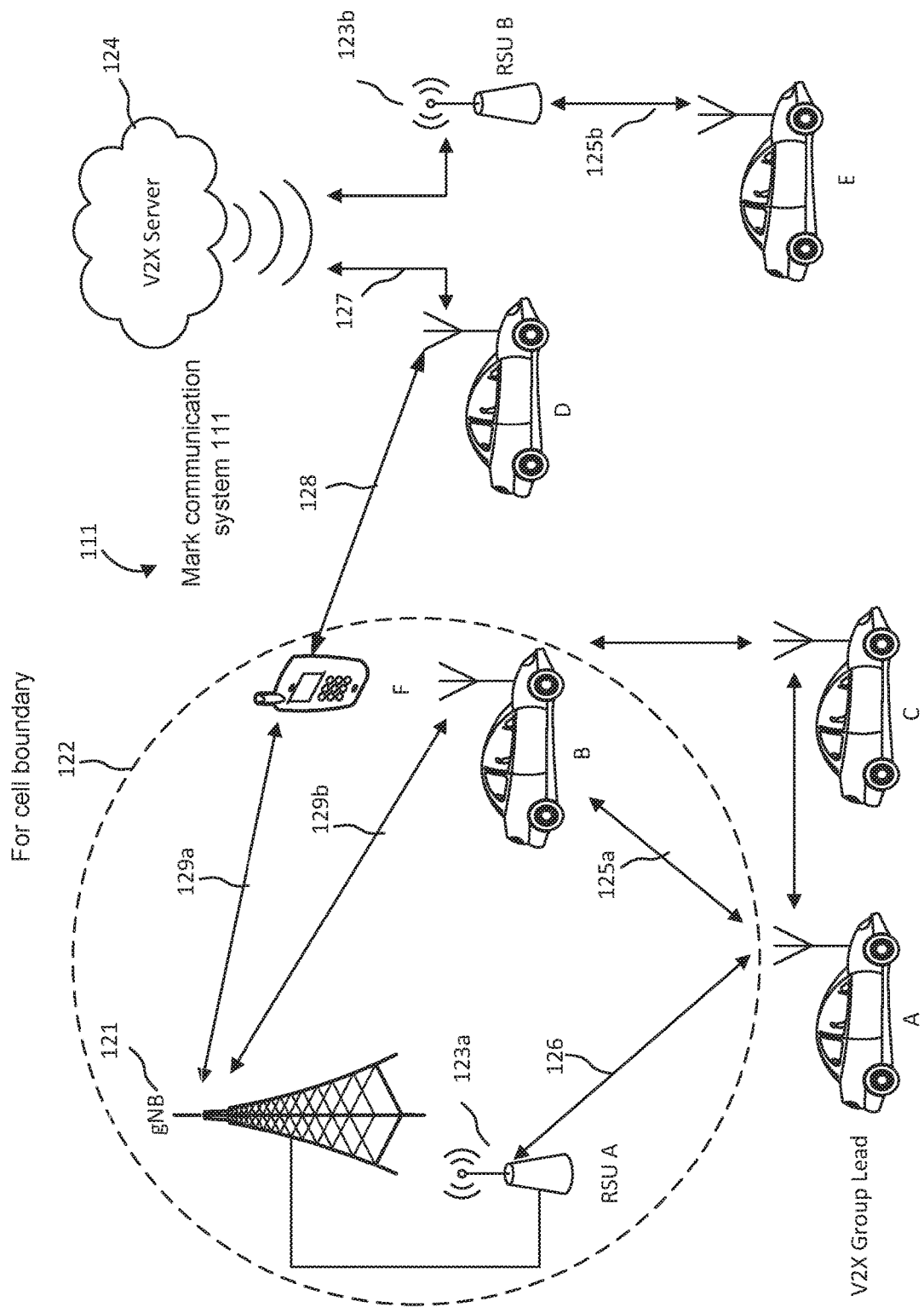
FIG. 1G is a block diagram of an example communications system.

FIG. 1G illustrates one embodiment of an example communications system 111 in which the methods and apparatuses described and claimed herein may be embodied. As shown, the example communications system 111 may include wireless transmit/receive units (WTRUs) A, B, C, D, E, F, a base station gNB 121, a V2X server 124, and RSU A 123a and B 123b, though it will be appreciated that the disclosed embodiments contemplate any number of WTRUs, base station gNBs, V2X networks, and/or network elements. One or several or all WTRUs A, B, C, D, E may be out of range of the access network coverage 122. WTRUs A, B, and C form a V2X group, among which WTRU A is the group lead and WTRUs B and C are group members. WTRUs A, B, C, D, E, and F may communicate among them over Uu interface 129b if under the access network coverage or Sidelink (PC5 or NR PC5) interface 125b if under or out of the access network coverage. WTRUs A, B, C, D, E, and F may communicate to an RSU via a vehicle-to-network (V2N) 126 or Sidelink interface 125b. WTRUs A, B, C, D, E, and F may communicate to a V2X Server 124 via a vehicle-to-infrastructure (V2I) interface 127. WTRUs A, B, C, D, E, and F may communicate to another UE via a vehicle-to-person (V2P) interface 128.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information, and which may be accessed by a computing system.

Figure 2:
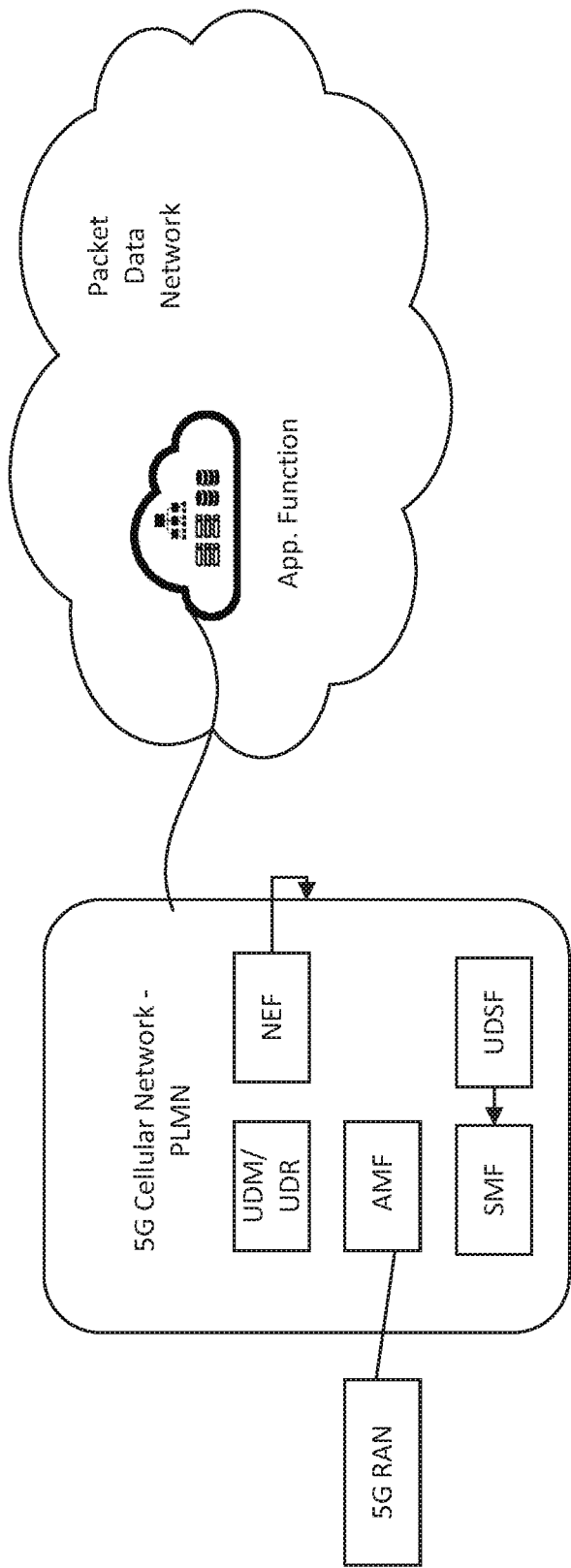
FIG. 2 shows a block diagram of example cellular entities.

FIG. 2 shows a number of important cellular network entities and cellular network functions.

The Access and Mobility Management Function (AMF) is a network function within the 5G cellular network that handles registration, connection, mobility, and reachability management. It also is involved with security: access authentication, access authorization, and deriving the access network specific keys.

The Session Management Function (SMF) is a network function within the 5G cellular network that is responsible for most session related aspects of a device. This includes PDU Session Establishment/Modification/Release. It is also responsible for IP address allocation and for selection and control of the UP functions. It is the termination point for all session management related NAS messages.

The Unified Data Management (UDM) is a network function within the 5G cellular network that stores subscription information for the connecting device. Note that in some cases the operator subscription information may be stored in the Unified Data Repository (UDR), in which case the UDM would be a form of front end that retrieved the subscription data from the UDR.

The Network Exposure Function (NEF) is a network function that exposes services and capabilities provided by the 5G 3GPP network. It also provides a means for $3^{rd}$ party applications to provide information to the cellular network (for example mobility or communication patterns).

The Unstructured Data Storage Function (UDSF) is the 5G network function used to store unstructured data from any other network function. The UDSF belongs to the same PLMN where the network function that uses it is located. The UDSF typically stores UE context that is needed by a network function.

The 5G-RAN is a 5G radio access network that connects to the 5G core network (e.g., New Radio (NR) or Wi-Fi).

Application Function: External server that interacts with the core network through the Network Exposure Function and may interact with the device through an IP connection.

QoS in 5G

From TS 23.501, System Architecture for the 5G System; Stage 2, V15.2.0 (2018-06): "The 5G QoS model is based on QoS Flows. The QoS Flow is the finest granularity of QoS differentiation in the PDU Session. A QoS Flow ID (QFI) is used to identify the QoS Flow in the 5G System. User Plane traffic with the same QFI within a PDU Session receives the same traffic forwarding treatment (e.g., scheduling and admission threshold)."

A QoS Flow is controlled by the SMF and may be preconfigured, or established via the PDU Session Establishment procedure or the PDU Session Modification procedure.

A QoS flow may be characterized in a number of ways. A QoS profile provided by the SMF to the RAN, for example, or by one or more QoS rule provided by the SMF to the UE, or by one or more UL and DL Packet Detection Rules (PDRs) provided by the SMF to the UPF which are in the PDU session of a UE. The UE may use the stored QoS rules to determine mapping between UL User Plane traffic and QoS Flows.

PDU Sessions

A PDU session provides the basic connectivity service between the UE and the data network. In 5G a PDU session is always initiated by a UE. A PDU session may have one or more QoS flows, each with its own QoS rules, QoS profiles, and PDRs. At establishment, only a default QoS flow is typically assigned for the PDU session.

If the core network is aware of specific QoS requirements for applications, it can create the QoS flows during the PDU Session Establishment. Alternatively, the UE may request such QoS flows using the PDU Session Modification procedure. Details are provided in TS 23.502, Procedures for the 5G System; Stage 2, V15.2.0 (2018-06).

Figure 3:
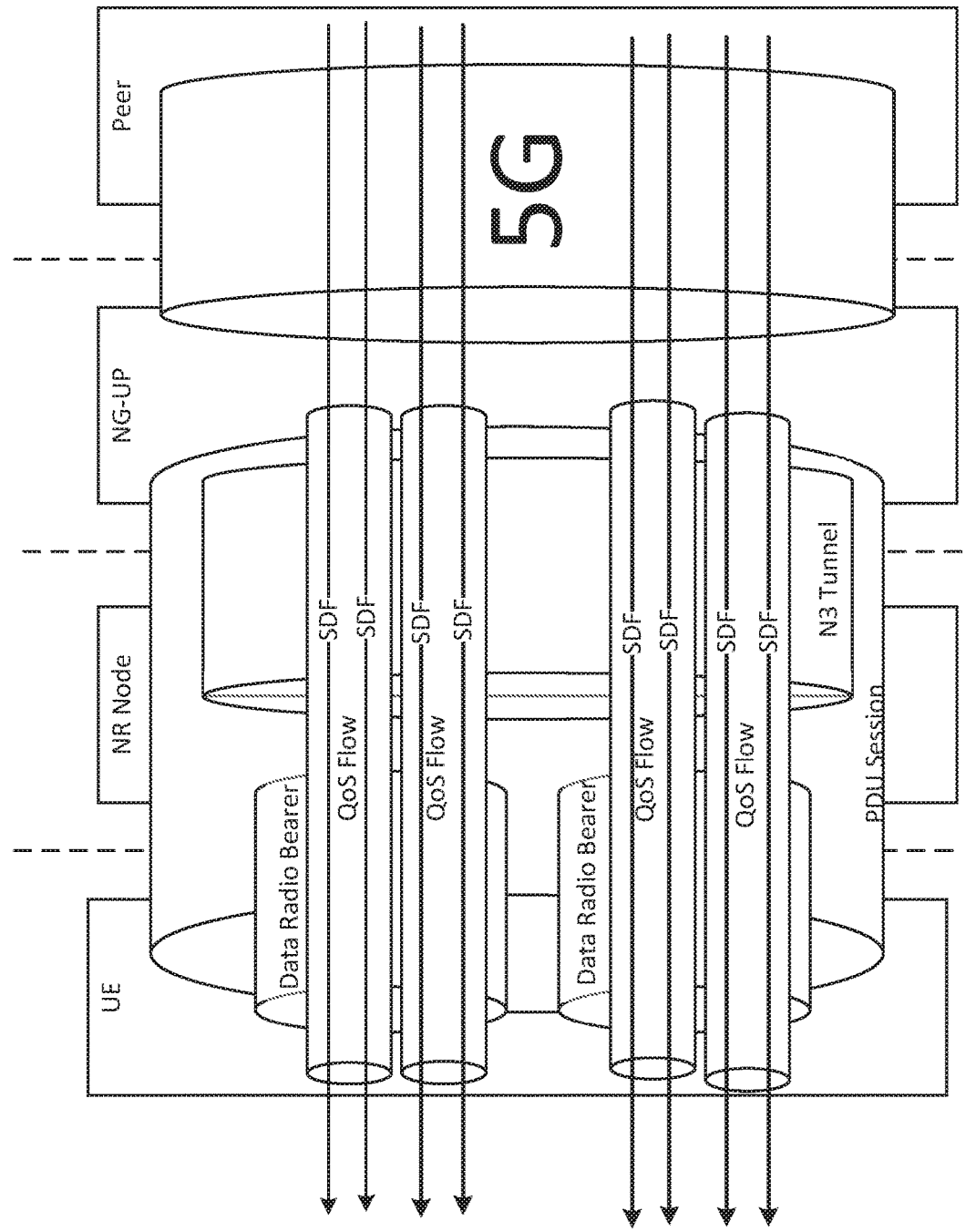
FIG. 3 shows a block diagram of example QoS Flows and PDU Sessions.

FIG. 3 shows a PDU session made up of multiple QoS flows. Note that the QoS flow may carry one or more IP flows.

QoS Monitoring for V2X Applications

As specified in TS 22.261, Service requirements for the 5G system; Stage 1, V16.5.0 (2018-09): "The QoS requirements specified for particular services such as URLLC services, vertical automation communication services, and V2X, mandate QoS guarantees from the network. However, the network may not be able to always guarantee the required QoS of the service. An example reason for this shortcoming is that the latency and/or packet error rate can increase due to interference in a radio cell. In such cases, it is critical that the application and/or application server is notified in a timely manner. Hence, the 5G system should be able to support QoS monitoring/assurance for URLLC services, V2X and vertical automation."

As a result, a number of new 5G requirements have been introduced. First, the 5G system shall provide a mechanism for supporting real time E2E QoS monitoring within a system. Second, the 5G system shall be able to provide real time QoS parameters and events information to an authorized application/network entity. Third, the 5G system shall be able to provide event notification upon detecting error that the negotiated QoS level cannot be met/guaranteed. Fourth, the 5G system shall be able to provide information that identifies the type and the location of a communication error (e.g., cell id). Lastly, the 5G system shall provide information on the current availability of a specific communication service in a particular area (e.g., cell id) upon request of an authorized user.

In order to address some of these requirements, an SA2 study item was started for enhanced V2X services. Of note is a use case where the autonomous driving mode of the vehicle is dictated by the QoS guarantees that may be provided by the network. For example, if the QoS requirement cannot be met, a fully autonomous vehicle is warned in advance, and the vehicle may return to a lesser "Level of Automation".

As part of this study item, SA2 3GPP TR 23.786, Study on architecture enhancements for EPS and the 5G System to support advanced V2X services, V0.9.0 (2018-10) has investigated a number of items. First is different QoS metrics that may be required for these V2X applications.

Second is more demanding 5QI categories.

Third is the idea that these applications require QoS Level(s) over a certain path (e.g., identified by coordinates and the time and a time window over which a certain QoS level or levels are requested to be provided at each coordinate in the path).

Fourth is the notion that the NWDAF determines a list of cell IDs and related TAIs that support the path. The NWDAF performs a preliminary assessment of the availability of resources that may be based on a centralized view of the status of the RAN along the path. The NWDAF may also assess whether there is high likelihood QoS cannot be guaranteed (e.g., the NWDAF knows there is patchy coverage along the path).

NR eV2X Sidelink Communications

The eV2X SA2 report in 3GPP TR 23.786 makes a number of high-level proposals expected to be in scope of normative work. QoS support uses a unified model for PC5 and Uu, e.g., the use of 5QIs for V2X communication over PC5, such that the application layer can have a consistent way of indicating QoS requirements regardless of the link used. This does not prevent the AS layer from implementing different mechanisms over PC5 and Uu to achieve the QoS requirements. Also, the 5QI used for PC5 may be different from that used for Uu even for the same V2X service.

The corresponding service requirements have Key Performance Indicators specified with the following parameters: Payload (Bytes); Transmission rate (Message/Sec); Maximum end-to-end latency (ms); Reliability (%); Data rate (Mbps); and Minimum required communication range (meters).

5GS eV2X types of traffic are broadcast, multicast, and unicast. UE-PC5-AMBR is applied to all types of traffic and is used in RAN for capping the UE PC5 transmission in resources management.

For unicast the same QoS Model as that of Uu applies, e.g., each of the unicast links can be treated as a bearer, with associated QoS flows. All the QoS characteristics defined in 5QI apply, as well as the additional data rate parameter. In addition, the Minimum required communication range is treated an additional parameter specifically for PC5 use.

For broadcast traffic, there is no bearer concept, each of the messages may have different characteristics according to the application requirements. The 5QI is used in the similar manner as that of the ProSe Per-Packet Priority (PPPP)/ ProSe Per-Packet Reliability (PPPR), e.g., to be tagged with each of the packet, and represents all the characteristics needed for the PC5 broadcast operation (e.g., latency, priority, and reliability). The AS layer may handle unicast, groupcast and broadcast traffic by taking all their priorities into account.

A group of V2X broadcast specific 5QIs could be defined specifically for PC5 use, and a mapping between the EPS V2X QoS parameters, e.g., PPPP and PPPR, with the new 5QIs may be standardized. The working assumption is that NR PC5 design may also support the use of V2X 5QIs.

Procedure for UE Triggered V2X Policy Provisioning

Figure 6:
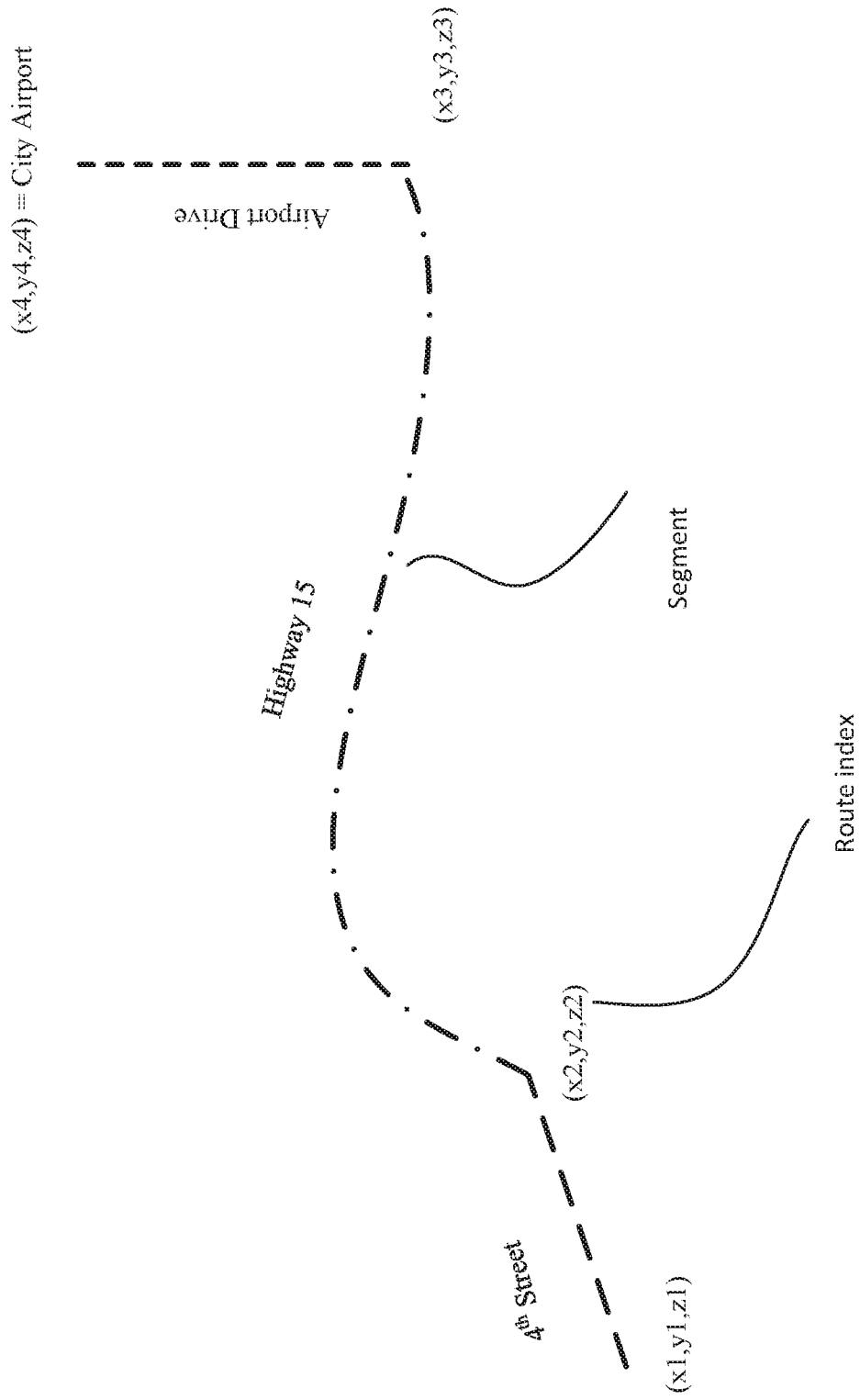
FIG. 6 shows an example route definition.
Figure 18:
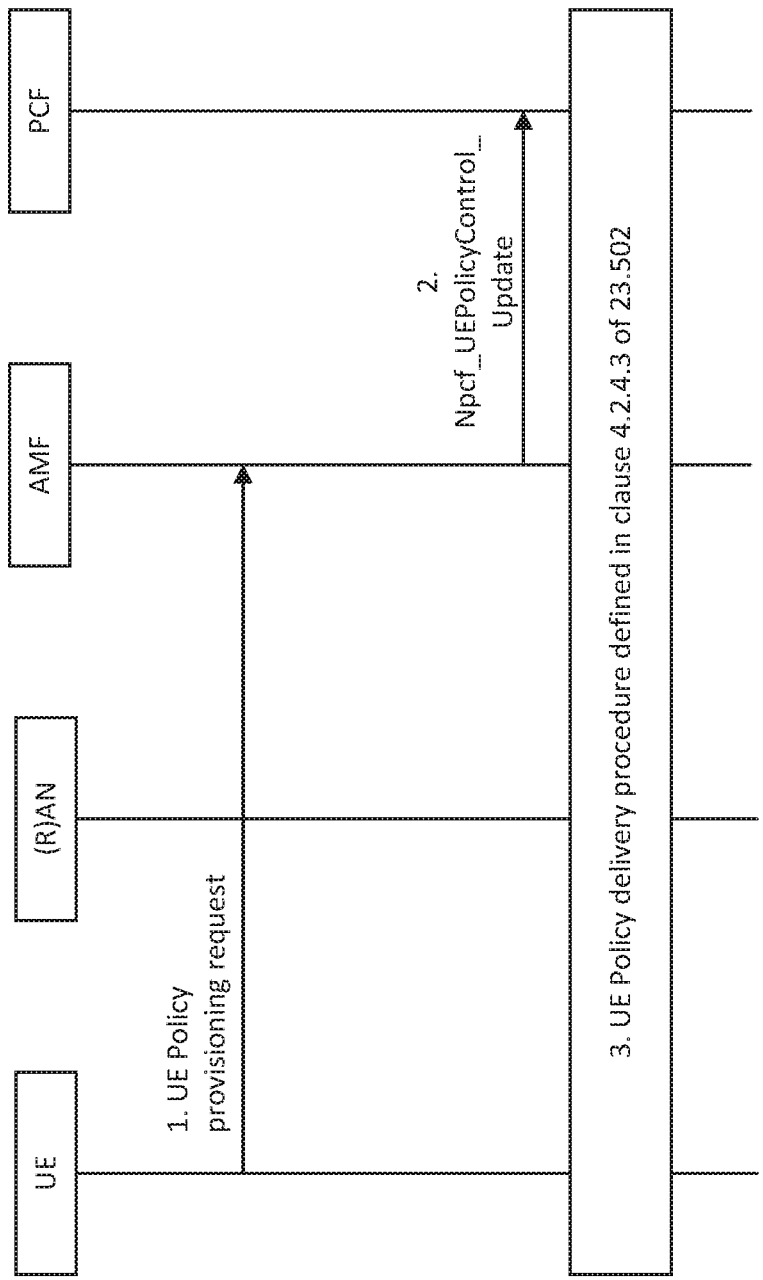
FIG. 18 shows a call flow for an example UE triggered V2X Policy provisioning procedure from 3GPP TS 23.287 Architecture enhancements for the 5G System (5GS) to support Vehicle-to-Everything (V2X) services; V1.1.0 (2019-07).

3GPP TS 23.287 Architecture enhancements for 5G System (5GS) to support Vehicle-to-Everything (V2X) services V1.1.0 (2019-07) describes how 5GS V2X Policy/parameters (which includes QoS parameters and PC5 QoS rules) are provisioned to the UE based on an explicit UE request when the UE determines that its parameters are invalid, e.g., if there are no valid parameters for a geographical area, if the validity timer expires. The NAS request to the AMF includes a UE Policy Container (V2X Policy/Parameter) to the AMF. The UE includes V2X Policy/Parameters in the request so that the network knows what V2X Policy/Parameters are already provisioned in the UE. The AMF sends the Npcf_U-EPolicyControl_Update request to the PCF including the V2X Policy/Parameters received from UE to the PCF. The PC5 QoS parameters retrieved by the PCF from the UDR are provided to the NG-RAN via AMF. The AMF stores such information as part of the UE context and delivers it to the UE via a dedicated message. This flow is detailed in FIG. 18 (excerpted from FIG. 6.2.4-1 of TS 23.287)

The provisioning procedure may also be PCF-based, in that the PCF determines to update the V2X Policy/parameters of the UE in the AMF. This may be useful, for example, in the context of UE Mobility, e.g., wherein a UE moves from one PLMN to another PLMN. This is achieved by using the procedure of UE Policy Association Modification initiated by the AMF without AMF relocation, as defined in TS 23.502, Procedures for the 5G System; Stage 2, V15.2.0 (2018-06).

When there is a subscription change in the list of PLMNs where the UE is authorized to perform V2X communication over PC5 reference point. This is achieved by using UE Policy Association Modification initiated by the PCF procedure.

When there is a change of service specific parameter as described in TS 23.502, Procedures for the 5G System; Stage 2, V15.2.0 (2018-06).

In the PCF-based cases, the PC5 QoS rule and parameters are provisioned to the UE when the UE includes V2X Policy Provisioning request during the following procedures described in TS 23.502 [2]: Registration, UE Policy Association Establishment and UE Policy Association Modification.

The provisioning procedure may also be PCF-based, in that the PCF determines to update the V2X Policy/parameters of the UE in the AMF, e.g., in UE Mobility, wherein a UE moves from one PLMN to another PLMN. This is achieved by using the procedure of UE Policy Association Modification initiated by the AMF without AMF relocation, as defined in TS 23.502, Procedures for the 5G System; Stage 2, V15.2.0 (2018-06).

When there is a subscription change in the list of PLMNs where the UE is authorized to perform V2X communication over PC5 reference point. This is achieved by using UE Policy Association Modification initiated by the PCF procedure as defined in TS 23.502, Procedures for the 5G System; Stage 2, V15.2.0 (2018-06).

When there is a change of service specific parameter as described in TS 23.502, Procedures for the 5G System; Stage 2, V15.2.0 (2018-06).

In the PCF-based cases, the PC5 QoS rule and parameters are provisioned to the UE when the UE includes V2X Policy Provisioning request during the following procedures: Registration, UE Policy Association Establishment and UE Policy Association Modification. These procedures are described in TS 23.502, Procedures for the 5G System; Stage 2, V15.2.0 (2018-06).

Example Use Cases

Use Case 1: Changing the Physical Route of a Vehicle

Figure 4:
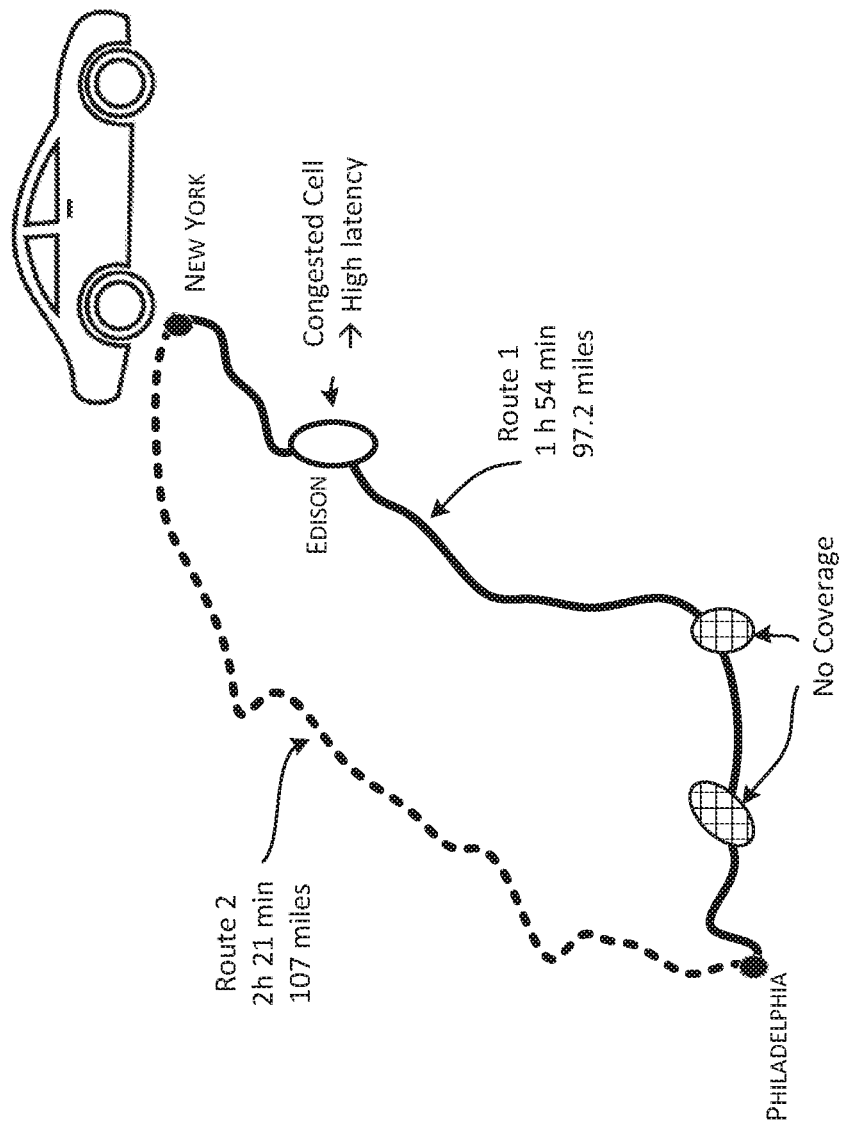
FIG. 4 shows a block diagram of an example of controlling a physical route of a vehicle.

FIG. 4 shows a use case where Sally wants to use her autonomous car to take a trip from New York to Philadelphia to attend a meeting. During the trip Sally needs to attend an important video conference. Her autonomous car also sends and receives various telemetry data to a $3^{rd}$ party server—some of which is time critical. Although this data is small and infrequent, it requires very low latency.

Sally's car is equipped with a navigation application that determines two potential routes to Philadelphia (Route 1 and Route 2). Both routes would allow Sally enough time to get to her meeting, but Route 1 would save her 20 minutes in travel time, as it uses mostly highway. The car informs the network about the two potential routes, as well as the connectivity requirements that are required along the routes (Sally's video conference as well as the car telemetry data). The operator has a small coverage hole along the highway used by Route 1, and directs the car to use Route 2 as the connectivity needs will be met throughout the drive from New York to Philadelphia.

Use Case 2: Control Location of a Device

Figure 5:
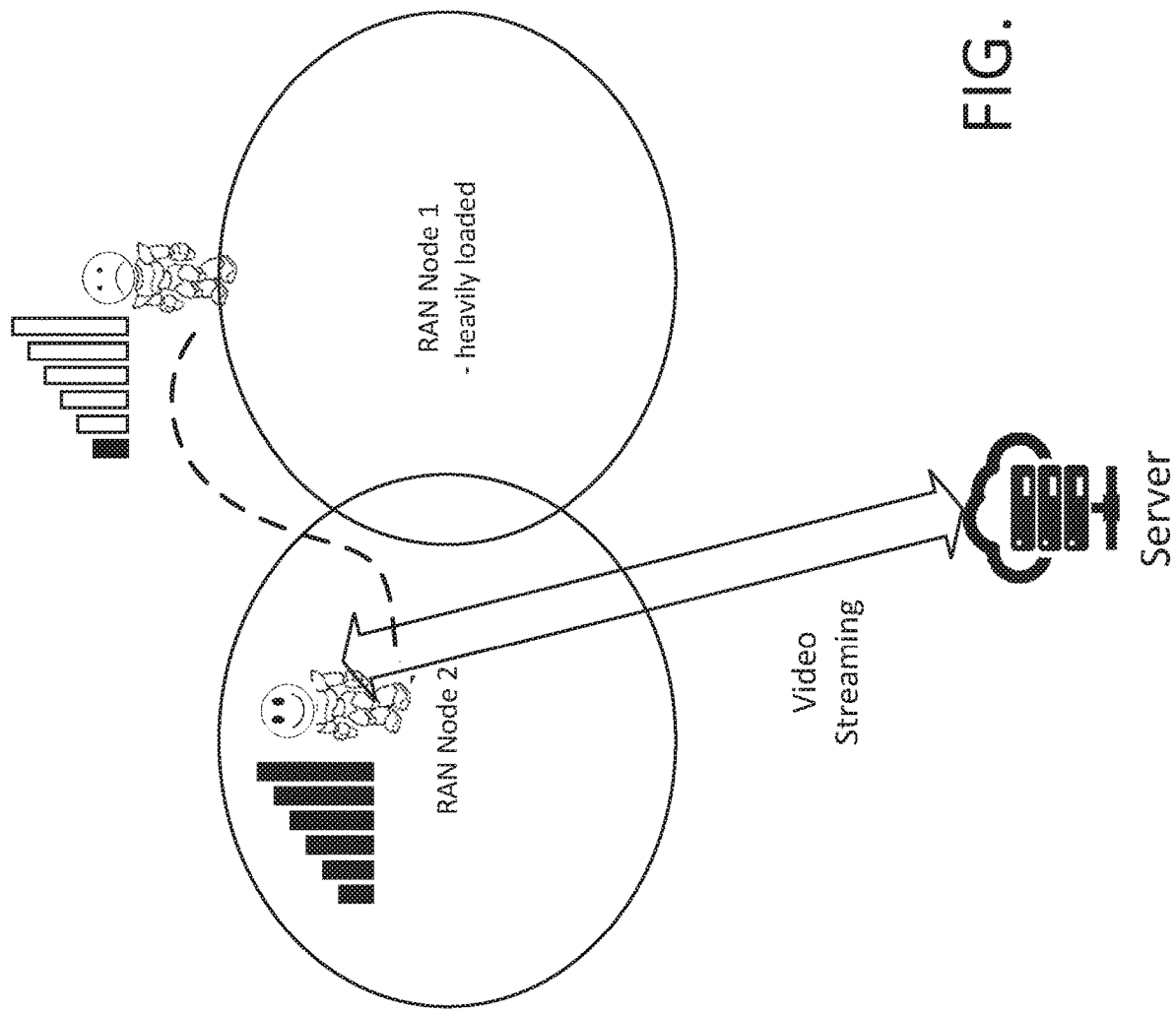
FIG. 5 shows a block diagram of an example of controlling a location of a device.

FIG. 5 shows a use case where an autonomous robot needs to stream a large video to a backend server as quickly as possible. The robot is at the edge of coverage of a RAN node, and has very poor signal connection. The current connectivity would lead to video that is not streamed correctly.

As the robot is mobile, the core network leverages this capability to assist the video streaming. The robot makes a connectivity request to the cellular network, providing its connectivity requirements, and also some location guidance. For example, the robot might provide the following guidance "I am able to move anywhere in a 500 m radius from my current location." The cellular network uses this information and determines that if the robot moves 300 m due east, it will be in better radio conditions, and in a RAN node with plenty of excess capacity. The cellular network tells the robot to move to the desired location. The robot streams the video with the desired quality.

Use Case 3: Coordination for Cooperative Tasks

Figure 19:
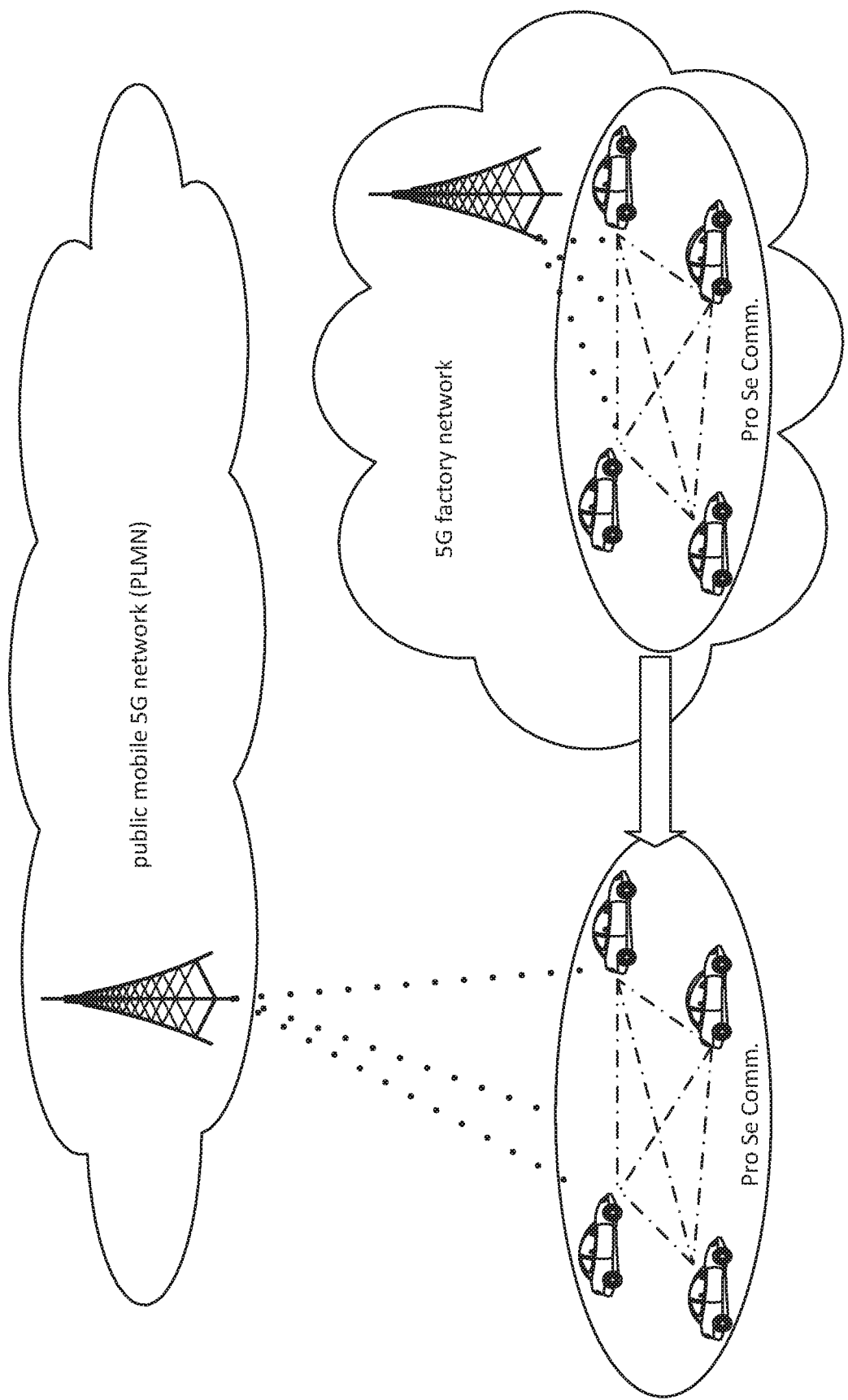
FIG. 19 illustrates an example of cooperative carrying of work pieces use case from 3GPP TR 22.832, Study on enhancements for cyber-physical control applications in vertical domains; V1.0.0 (2019-05).

FIG. 19 shows a use case described in 3GPP TR 22.832 Study on enhancements for cyber-physical control applications in vertical domains; V1.0.0 (2019-05) for the purpose of eliciting requirements for advanced functionality in 3GPP 5GS.

In this case, autonomous robots/Automatic Guided Vehicle (AGVs) are carrying together, in a coordinated way, a heavy work piece in a manufacturing plant or a remote work-site. Deployments providing for cyber-physical control applications may include coverage via the 5G LAN service (e.g., factory 5G network) and the Public Land Mobile Network (PLMN). The robots need to exchange control commands and feedback, as well as status information via Device-to-device/ProSe communications.

Control communications require high QoS levels given the low delay tolerance involved and the amount of micro-adjustments needed. At the same time, some status and process management information may be more delay tolerant and use different resources. For example, high-definition video may be acquired constantly from all mobile units in order to update the plant maps used by the all autonomous units. While the aim is to update the maps in real-time, transmitting the video for this purpose may be less important than accomplishing the cooperative task of carrying the work piece, so the QoS can be changed dramatically for this purpose.

Cellular networks may not be able to always guarantee the required QoS of a service. An example reason for this shortcoming is that the latency and/or packet error rate increases due to interference in a radio cell. Current solutions try to solve this using reactive mechanisms. If the needed QoS cannot be met, the core network may be required to notify the impacted applications so that these applications may take an appropriate action. The core network may send the notification in advance of the QoS failure in order to give the application enough time to react. In most cases, the applications adapt to this warning, but the end effect is a reduced service offering. For example, in the autonomous driving scenario, if the QoS is such that the network cannot meet the requirements to allow fully autonomous driving, then the V2X application would transition the vehicle to a lesser "Level of Automation" (such as manual driving). In such a case, the benefit of the fully automated driving is lost.

When the network cannot meet the QoS requirements of an application, the network may take a more proactive approach and try to maintain the service requested by the applications. Three proactive options are possible, First is to move the device to a location where the QoS will be met. Second is to change the route of the device so that problem cells are avoided. Third is to handover the device to another cell or operator that can meet the QoS requirements.

One problem is that current cellular systems cannot move a device to a specific location or direct the device to follow certain routes. In fact, the location and route of a device are imposed onto the network. As a secondary issue, even if the cellular network could move a device or change the route of a device, there is no mechanism to give guidance to the network so that it can make these decisions.

Solution Concepts

Cellular networks may not be able to always guarantee the required QoS of a service. One of the main reasons for this shortcoming is that the signal quality in a cell depends on radio conditions. These radio conditions fluctuate as a result of fading, interference, shadowing, obstacles, or environmental conditions. If a cellular network wants to compensate for a poor radio signal, it has a few options available, but these are all at the "radio level." For example, the cellular network may increase the transmission power, change the modulation and coding scheme, or change the antenna configuration.

Another potential mechanism to combat a poor radio signal is to physically move the device to an area with better coverage. This solution is applicable to several use cases, namely in cases where a device must travel long distances, or where a device can still perform its tasks anywhere in a limited geographical area. Using a smartphone analogy, when a user on the east side of a building has a poor data connection, the network could direct the user to a location with better signal strength (for example the west side).

Allowing a cellular network to control the location of a device (or give advice on how to change the location of a device) in order to increase coverage provides another way to meet strict QoS requirements of some applications (like the V2X applications that control autonomous vehicles).

Methods and systems are disclosed herein to allow the cellular network to change, or recommend a change to, the location of a device, the route of a device, the speed of a device, and the physical distance between devices. To enable this, methods and systems are also disclosed to have the cellular network maintain route information for a device, have the cellular network maintain sojourn areas for a device (these may be areas where the device is willing to move in order to improve its coverage), and have the network recursively look for better routes or locations that meet the QoS needs of applications.

Some of the ideas targeting a device (UE) and core network function (Server-MF) disclosed herein include the following:

Main ideas that relate to UE (device) actions when its route is controlled by the network may include informing the network about its capability to have the network control its route, monitoring its route and providing this route information to the network, monitoring its hosted applications and requesting from the network: strict QoS, advance warning, expected network action if QoS is not met, receiving QoS specific measurement configuration from the network, receiving from the network a request to provide one or more alternate routes, providing the one or more alternate routes to the network, receiving a selected alternate route, providing new route to the navigation handling application, and navigating according to route.

Secondary ideas that relate to UE (device) actions when its route is controlled by the network: where the informing is done through a UE registration to the core network, where the expected network action may be selected from: notifying the application on the UE, notifying a $3^{rd}$ party server, change the route of the UE, where the strict QoS requirements may include one or more of the following: UL and DL throughput information (average, minimum), access latency, paging latency, where the requesting strict QoS requirements is provided in a PDU Session Establishment or a PDU Session Modification, where the route is provided as a list of locations, time instances, speed, and where the QoS Specific measurements may include RACH delay and paging delay.

Main ideas that relate to User Equipment (UE) actions when its location is controlled by the network: informing the network about its capability to have the network control its location within an area, monitoring its hosted applications and requesting from the network: strict QoS, advance warning, expected network action if QoS is not met, receiving QoS specific measurement configuration from the network, receiving from the network a request to move to a new location, providing new location to the navigation handling application, and navigating according to location.

Secondary ideas that relate to UE (device) actions when its location is controlled by the network: where the informing is done through a UE registration to the core network, where the area is provided as a geofence, known area, building, radius/dome around current location, where the expected network action may be selected from: notifying the application on the UE, notifying a $3^{rd}$ party server, change the location of the device, where the requesting strict QoS requirements may include one or more of the following: UL and DL throughput information (average, minimum), access latency, paging latency, and where the requesting strict QoS requirements is provided in a PDU Session Establishment or a PDU Session Modification.

Main ideas that relate to Core Network Function (Server-MF) actions: receiving a request to evaluate if network can meet the strict QoS requirements of a UE, retrieving UE context information, asking to evaluate if strict QoS requirement can be met, configuring measurements at the UE, RAN nodes, and CN nodes, configure monitoring at the RAN nodes and CN nodes, and asking the SMF to start a PDU session with the agreed QoS.

Device Characteristics

A device may be in one of three transit modes of operation. First, a device may be In-transit, whereby the device must go from its current or starting location/position to a destination location/position. While moving from the starting position to the destination position, the device is said to be "in-transit."

Second, a device may be Sojourning, where the device is moving within a relatively small area (e.g., in a building of warehouse). A sojourning device is mobile, but it has no need to go to a destination location. The device may be thought of as portable—it can move from location to location for communication reasons; and Third, a device may be stationary, whereby the device is in a fixed location (e.g., at a charging station.)

A device may change its transit mode of operation. For example, an autonomous taxi needs to go from the airport taxi bay to a hotel at address: 123 Main Street. In this case: starting location=airport taxi bay; destination location=123 Main Street; autonomous taxi is "in-transit" while driving passenger from the airport to the hotel; autonomous taxi is "sojourning" while waiting for passengers at the airport taxi bay—Taxi may move anywhere in the taxi bay; autonomous taxi is "sojourning" while waiting for passengers at the hotel—Taxi may move anywhere in the hotel parking lot; and the autonomous taxi is "stationary" while at a charging station.

A device may host a number of applications that have strict QoS requirements. QoS requirements may a include number of throughput attributes which may be measured in a number of ways.

For example, average UL throughput is the required average uplink throughput, for instance in bps, measured over an observation period. Average DL throughput is the required average downlink throughput, for instance in bps, measured over an observation period. The observation period is the duration of a window over which the average UL and DL throughputs may be calculated. The average taken over the period may be a rolling average or a non-rolling average, for example.

An instantaneous UL throughput is a minimum required UL throughput, for instance in bps, after a period of non-activity. For instance, after the device comes out of a sleep mode such as Discontinuous Reception (DRX) or Power Saving Mode (PSM). Instantaneous DL throughput refers to a minimum required DL throughput, for instance in bps, after a period of non-activity. For instance, after the device comes out of a sleep mode such as DRX or PSM.

Peak UL throughput means the maximum UL throughput, for instance in bps. This may help with network management and ensure no device monopolize network bandwidth. Peak DL throughput is the maximum DL throughput, for instance in bps. This may help with network management and ensure no device monopolize network bandwidth.

Minimum UL throughput is the minimum UL throughput required for a UE application, for example in bps. This is similar to average throughput, but this requirement may help video streaming applications keep a certain QoS throughout the transit period. Minimum DL throughput is the minimum DL throughput required for a UE application, for example in bps. This is similar to average throughput, but this requirement may help video streaming applications keep a certain QoS throughout the transit period.

An access latency may be specified, which is a maximum latency to send a first data packet. This may be the time for a device to go from an IDLE mode to sending a first data packet. A paging latency is a maximum time for a device to be paged. This may be the time it takes for an Application Server to trigger a device to come out of an IDLE mode. The application may have a certain schedule for QoS requirements. For example, the QoS requirement is to be met from 12:00 PM to 1:30 PM.

A device may have a planned route. This is an indication of the intended route of the device, similar to turn-by turn directions from a GPS navigation application. A route is made up of segments between route indices (see FIG. 6). It may be provided in many forms, such as a set of route indices with a time to say when the device expects to be at the route index. Table 1 shows an example.

TABLE 1.

Route Indices Example

| Location | time |
|---|---|
| (x1, y1, z1) | 12:30PM |
| (x2, y2, z2) | 12:50PM |
| (x3, y3, z3) | 1:15PM |
| (x4, y4, z4) | 1:30PM |

A route may include a set of segments, as well as time range when the device expects to be on that segment, as illustrated in Table 2.

TABLE 2

Route Segments Example

| Segment | Start time | End Time |
|---|---|---|
| 4$^{th}$ Street | 12:30PM | 12:50PM |
| Highway 15 | 12:50PM | 1:15PM |
| Airport Drive | 1:15PM | 1:30PM |

A device may provide an indication of where the device needs to be and desired time, as illustrated in Table 3.

TABLE 3

Destination Example

| Destination | Desired Time |
|---|---|
| City Airport | 1:40PM |

Additionally, a route may include several items of travel information, including, for example, location, timing, speed, and distance. Location may be in the form of a GPS location, an address, a base station id, a cell id, or an access point ID. Time indices may be used that describe when the location should be occupied. A minimum or maximum speed, velocity, acceleration, or direction may be associated with a location. A minimal or maximum distance between nearby devices (an inter-device distance) may be associated for a route.

For example, a route information may include: 123 Elm Street at time 1 PM and 456 Maple Drive at 2 PM; Maximum Speed=30 Miles/hour; and Minimum inter-device distance=3 meters.

Device/Core Network Functionality

Figure 7:
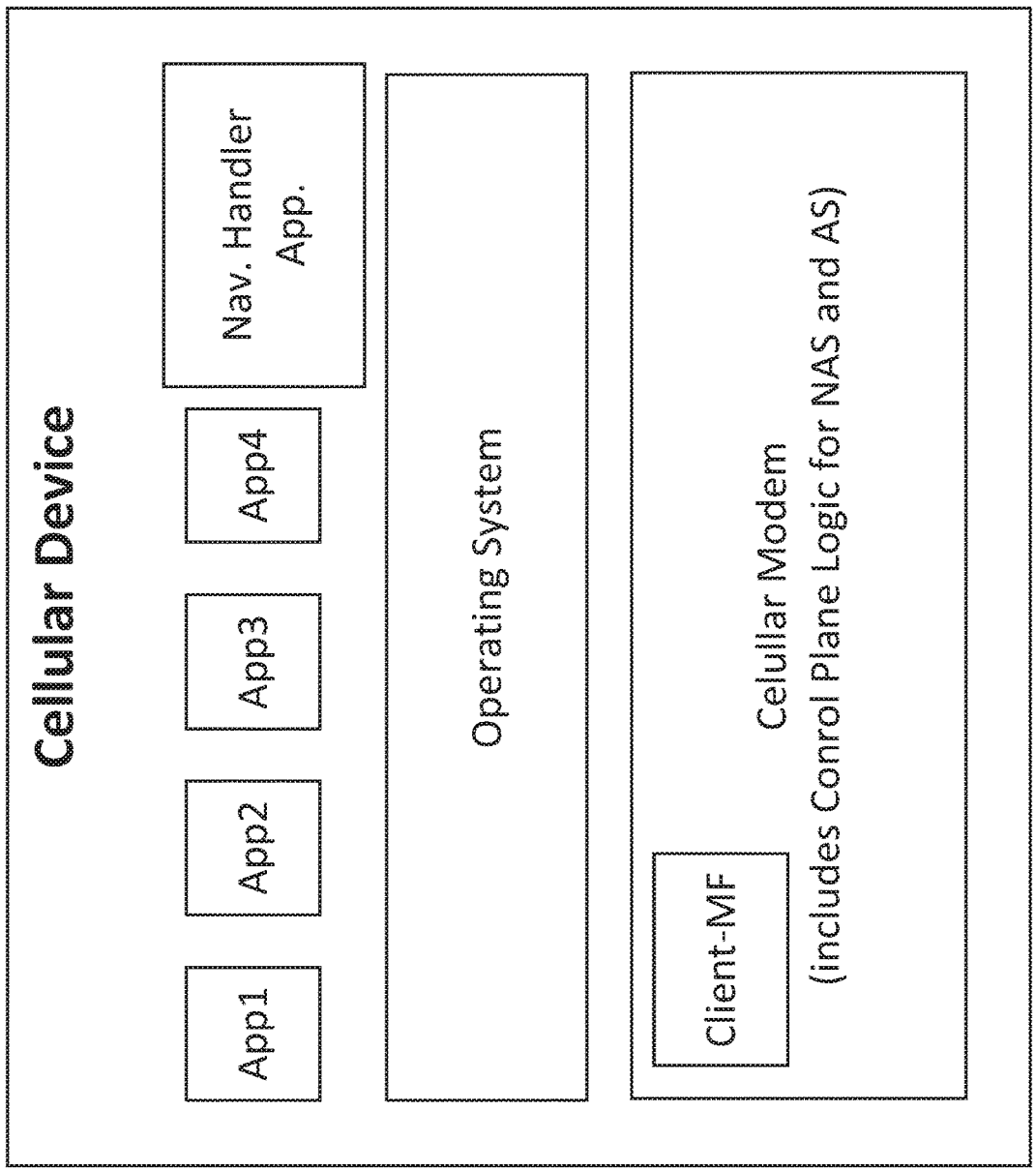
FIG. 7 shows an example cellular device.

A typical device is shown in FIG. 7. The device may host several applications (some of which have strict QoS requirements), an operating system, a navigation handler application, and cellular modem. The device also hosts a Client-Mobility Function (Client-MF) that manages QoS requirements and device mobility. The Client-MF may be an application running on the device, a functionality in the operating system running on the device, or some functionality within the control plane of the device (for example in the Non-Access Stratum (NAS) layer or the Access Stratum (AS) layer of the cellular modem). Hereinafter, it is assumed that the Client-MF is part of the Non-Access Stratum (NAS) layer of the cellular modem.

The Client-MF may have several functions, such as: communicating with the Server Mobility Function (Server-MF) in the core network; determining the transit mode (in-transit, sojourning, stationary) of the device; aggregating QoS requirement needs of all applications on the device; managing the QoS related measurements for the device; and interfacing with the navigation handler application of the device.

Note that in some cases, the Client-MF functionality may be hosted by an M2M/IoT server. This M2M/IoT server may host Client-MF for a number of devices. If needed, it may provide the necessary control to the devices using an over-the-top mechanism.

The core network hosts a new function referred to as the Server Mobility Function (Server-MF). The Server-MF may be a new network function within the core network, or part of an existing network function such as the AMF, SMF, NWDAF, PCF or deployed as an AF. Hereinafter, it is assumed that the Server-MF is a new network function. The Server-MF may have several functions, such as: communicating with a device's Client-MF; configuring monitoring in RAN nodes and/or CN nodes and/or Operations and Management (OAM) System; configuring measurements in device, RAN nodes, CN nodes, and/or OAM System;

interacting with the NWDAF to determine if the QoS requirement may be met or if it can be anticipated that the QoS Requirement can be met; and managing the device context related to QoS requirements, such as location of device, sojourning area of device, route of device, QoS needs of device, and transit state of device.

Device Registration

Figure 8:
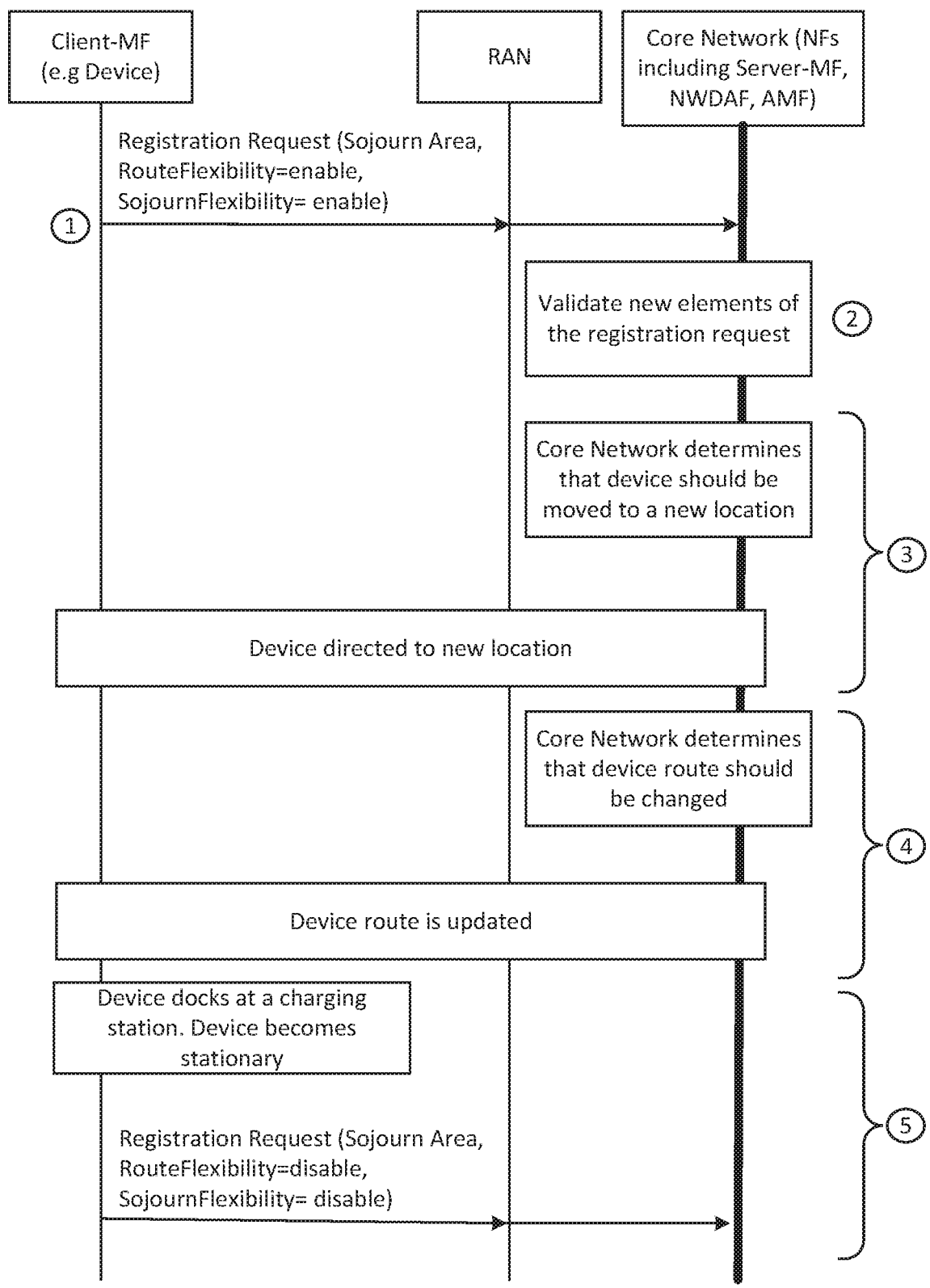
FIG. 8 shows a call flow of an example device registration procedure.

In order to use the new functionality, the device may first register its capabilities with the core network. The registration procedure (initial and update) is shown in FIG. 8 and described below. Note that the procedure is shown between a Client-MF and a Server-MF. Typical examples of entities hosting the Client-MF include Devices. An example of a Server-MF is a Network Function (NF) in the core network.

At step 1, the device registers with the core network. This may be through a Registration Request message. As part of this registration, the device may include information about its network-controlled mobility. This registration message may include information regarding one or more of the following device capabilities.

First, for example, is Device Mobility, which pertains to whether the device is stationary/fixed, mobile, and portable.

Second is Sojourning Area, which pertains to an area over which the device may continue to fulfil its primary role. For example, a drone may have as a primary role to provide sensor readings in certain areas around a city and report these readings to a cloud server. These areas may be quite large, and the drone is permitted to take these sensor readings anywhere in the area. The area can be thought of as a sojourning area.

A sojourning area may be described, for example, as a geofence, a dome around a current location, or a known area. For example, a known area may be described as a specific park (e.g., Central Park), a specific building/venue (e.g., Empire State Building), or a specific meeting place (e.g., Times Square.)

If a device provides a sojourning area, it implies that it is willing to move anywhere in this area. The network may use this to have the device move to help meet the device's QoS requirements or to help load balance the network resources.

Third, a registration message may include information regarding Sojourn Flexibility comprising, for example, an indication to the core network as to whether the device is willing to move within its Sojourning Area in order to meet the QoS requirement, at the request of the core network.

Fourth is Route Flexibility, such as an indication to the core network as to whether the device is willing to change its physical route in order to meet the QoS requirement, at the request of the core network.

Fifth is Serving Cell Flexibility, such as an indication to the core network as to whether the device is willing to change its serving cell selection rules in order to meet the QoS requirement, at the request of the core network.

Sixth is Network Optimization Flexibility, such as an indication to the core network to as whether the device is willing to be directed to a certain location, or have its route changed. For example, the network may want to change the route of a device for load balancing reasons across RANs.

Seventh is Advanced Measurement Capability, such as indication to core network about device capability to perform and report QoS related measurements such as RACH latency or paging latency.

Eighth is Cooperative Advanced Measurement Availability, such as an indication to core network about device availability to perform and report QoS related measurements to be used for QoS evaluation or route planning of other UEs.

The type of measurements (Mean Opinion Score (MOS) and number of dropped packets) that can be reported may also be provided by the UE to the network.

At step 2, the core network cross-references the device subscription to validate the registration request. If the core network accepts the registration request, it responds with a Registration Accept message. The device is now registered to the core network.

At step 3, when needed, the core network uses the SojournFlexibility to direct the device to a certain location. This may be to meet the QoS requirements of the device, or for some network optimization.

At step 4, when needed, the core network uses the RouteFlexibility to direct the device along a certain route. This may be to meet the QoS requirements of the device, or for some network optimization. Details are provided below.

At step 5, at some point later, the device is physically docked to re-charge its batteries. In this case, the device updates its registration, and tells the core network that it is no longer capable of Sojourn Flexibility or Route Flexibility (e.g., they are set to "disable").

Note that one or more of the new information elements contained in the registration message may also be contained in the device's subscription information. For example, when the information is received by an NF (e.g., the AMF or MF-Server), the information may be stored in the UDR.

Maintaining Planned Route in Core Network

Figure 9:
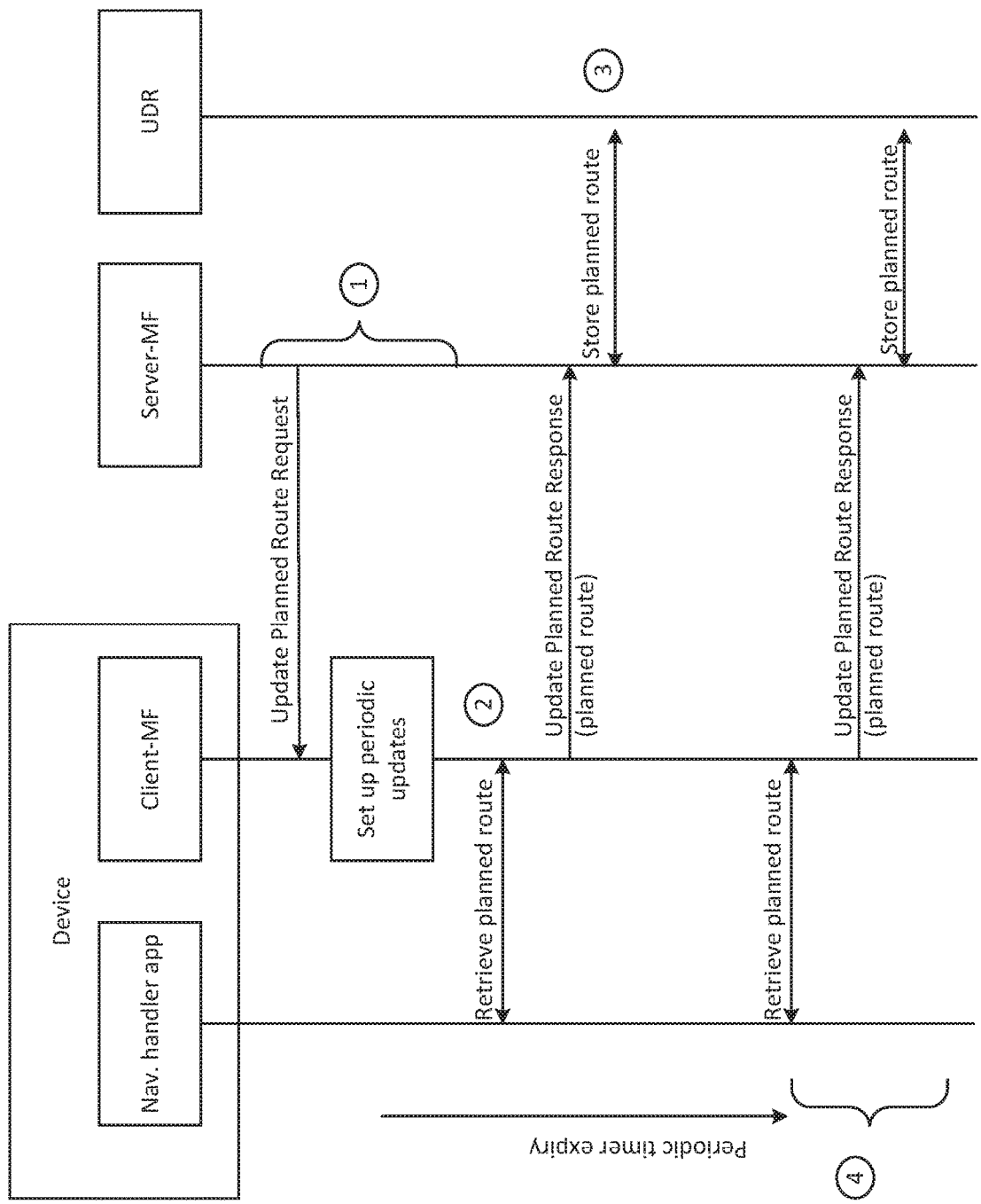
FIG. 9 shows a call flow of an example method for maintaining planned route information in a core network.

The core network maintains both the Planned Route of a device as well as the actual/current route of the device. This information is provided to the network by the navigation handler application of the device. This information may be provided every time a new route is calculated by the device, periodically by the device, or on request from the core network. The Planned route is an indication of the intended route of the device, such as turn-by-turn directions from a GPS navigation application, for example. The procedure to maintain the planned route at the core network is shown in FIG. 9.

At step 1, the Server-MF asks the device to update its planned route with a control plane message Update Planned Route Request. This request may include an indication to report the Planned route periodically (say every 30 minutes), or to update the planned route when it deviates from the route that is known to the core network.

At step 2, the Client-MF retrieves the planned route from the navigation handler application. If the device has a planned route, it provides it to the Server-MF (it may use one or more of the forms shown in Table 1, Table 2, and Table 3) using an Update Planned Route Response. Otherwise, the Client-MF may return an indication that the device is not on a planned route. For example, the Update Planned Route Response may return an indication that the device may be stationary to perform some tasks such as taking a sensor reading or charging. Alternatively, the Update Planned Route Response may return an indication that the device may be sojourning in a Sojourning Area. The Client-MF may also provide an indication of the Sojourning Area.

At step 3, the Server-MF stores the Planned route. This may be stored in the Server-MF, or in the core network's UDR or UDSF. The information may also be provided to the NWDAF so that it can be used to generate improved data analytics.

At step 4, if the Server-MF has requested periodic updates of the Planned route, the Client-MF starts a timer. At expiry of the timer, the Client-MF retrieves the planned route from the navigation handler application and forwards it to the Server-MF.

As an alternative to step 4 if the Server-MF in step 1 has requested to be notified when the planned route has changed, then the Client-MF may subscribe to the navigation handler application to be notified of changes to the planned route. When the device does change route, for example due to unexpected traffic congestion, the Client-MF is informed and sends an Update Planned Route Notify to the Server-MF, which includes the new planned route.

As an alternative to the Update Planned Route Request from step 1, the Server-MF may ask for the planned route during the device registration, as an option of the Registration Accept message.

Route Flexibility

Route flexibility allows the core network to change or suggest changing, the physical route of a device for the core network to meet strict QoS requirements of an application on the device or to mitigate or avoid network congestion situations. In addition, route flexibility also allows the core network to change the physical route of a device for network optimization reasons (e.g., load balancing). In the following, it is assumed that the device has already registered with the core network, has indicated that it supports route flexibility, and that route flexibility is enabled.

Note that a suggestion to change a route might include a new path for the device to travel. It may also include a request for the device to change speeds or the times that it reaches certain points in the route.

It is useful to consider four events that may occur during the lifetime of a device.

Event 1 is when an application with strict QoS requirements is started on a device and the device already has a planned route.

Event 2 is when a device has an ongoing application session with strict QoS requirements, and the planned route of the device needs to be changed.

Event 3 is when an application with strict QoS requirements over a planned route, is started on a device.

Event 4 is when a device has an ongoing application with strict QoS requirements. The device is moving along the planned route, and the network determines that the QoS requirement will not be met.

Although not shown, if the device has further indicated support for network optimization flexibility, (NetworkOptimizationFlexibility=enabled), the core network may independently determine to change the physical route of a device for load balancing or other network optimizations. In such a case, the procedure/call flow is like that of Event 4, with the following delta—the trigger is network optimization and not failure to meet QoS requirements.

Note that hereafter, it is assumed that the device context and device route information, used by the Server-MF, is stored in the UDR. Alternatively, it can be stored in the PCF, UDSF, NWDAF, or another NF.

Event 1: New Strict QoS Application Started on Device Already on a Planned Route In this case, the device is already on a planned route. The device has informed the network, and the route information is available to the Server-MF. The route information may be stored in the Server-MF, UDR, PCF, UDSF, or NWDAF. Hereafter, it will be assumed that the route information is stored in the UDR, although this information may be stored in the Server-MF, or other network functions. An application is started on the device with strict QoS requirements. The detailed call flow is shown in FIGS. 10A and 10A and described below.

Figure 10A:
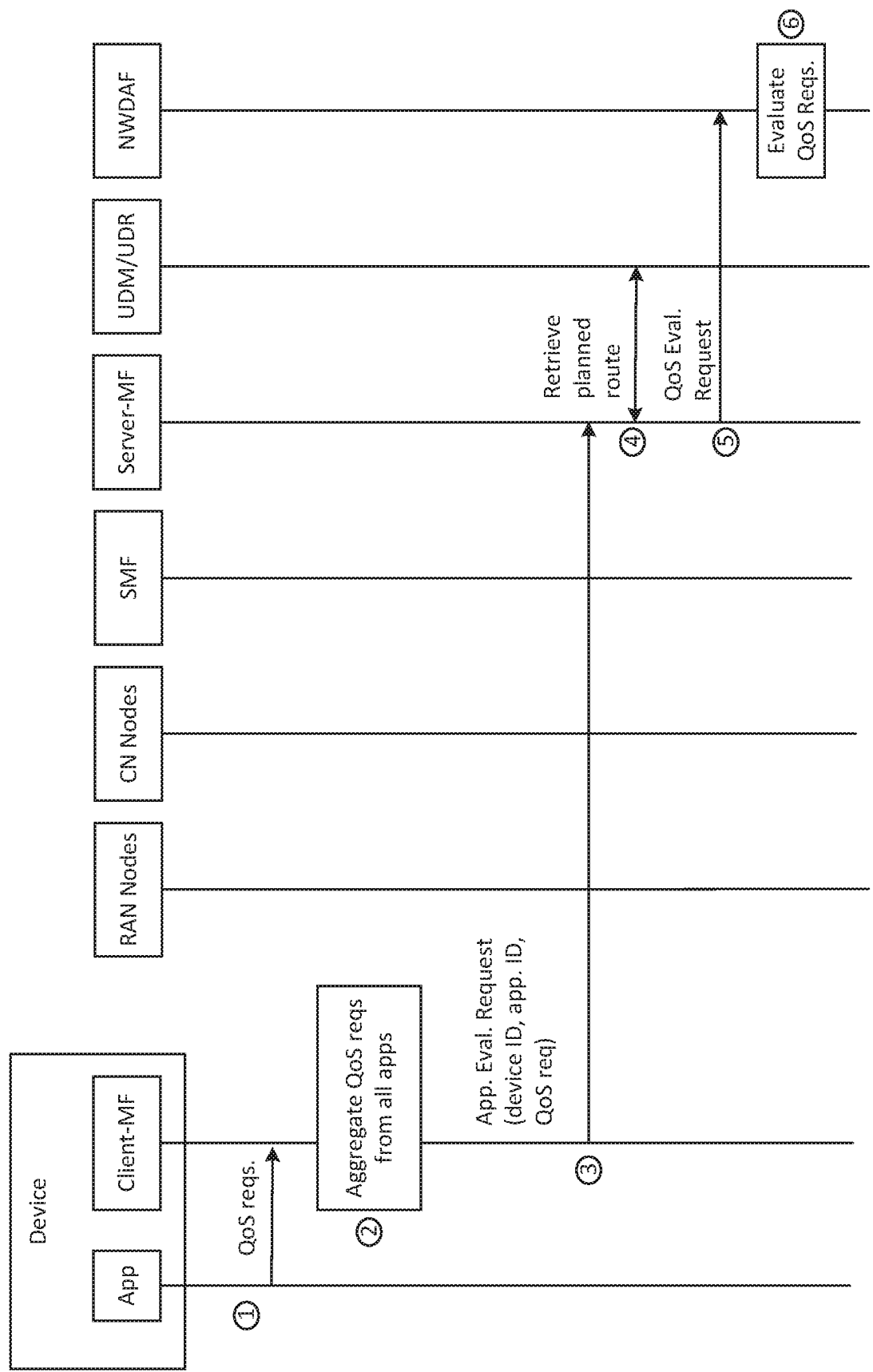
FIGS. 10A and 10B show a call flow of an example new strict QoS application procedure.

At step 1 of FIG. 10A, the application sends a message to the Client-MF to check whether the QoS requirements of the application may be met along the planned route. The message may include several items. First is a planned route. Second is a set of QoS Requirements of the application. The requirements may be multiple sets of preferred requirements. For example, a preferred QoS level and a minimum acceptable QoS level.

First is Advance Warning for warning the application requires if the QoS requirement will not be met. Fourth is a Core Network Action, such as an action to be taken by the core network, if it determines that the QoS requirements will not be met. There are several choices for such an action. For example, first, the core network may notify the application with an indication of the QoS that may be offered. Second is to notify a $3^{rd}$ party server, with an indication of the QoS that may be offered. In such a case, the application may also need to specify the address of the $3^{rd}$ party sever. Third is to change the route of the device.

At step 2, the Client-MF in the device determines the aggregate needs of all active applications.

At step 3, the modem issues an Application Evaluation Request. This request message may include the information that is part of step 1. In addition, the request may also include some Application ID to identify the application on the device. This ID may be assigned by the Client-MF. The message is sent to the Server-MF through the AMF. For example, this message may be a PDU Session Establishment Request, or a PDU Session Modification Request.

At step 4, server-MF retrieves the planned route of the device, using a Retrieve Device Context Request to the UDM/UDR. This request may include a device identifier, for example the Permanent Equipment Identifier (PEI), 5G S-Temporary Mobile Subscription Identifier (5G-S-TMSI), SUPI, and GPSI, as well as an indication of the requested information. For example, for this event, the Server-MF may retrieve the Planned Route of the device, and the Route-Flexibility of the device.

At step 5, the Server-MF, issues the QoS Evaluation Request to the NWDAF. This request may include: QoS requirements received from step 3, the planned route of the UE received from step 4.

At step 6, the NWDAF evaluates if the strict QoS requirements of the application can be met on the current planned route of the device. See NWDAF QoS Eval Procedure. The output of this procedure is Reject or Accept. If the output is Accept, the procedure may also determine whether any monitoring needs to be set up at RAN nodes and CN nodes to verify that QoS is maintained. Monitoring of the RAN nodes may be done via the OAM System. If so, the NWDAF may also specify what needs to be monitored in each node. For example, NWDAF may determine that a RAN node should monitor the number of devices in IDLE mode and notify the Server-MF if this number exceeds a threshold. In another example, the NWDAF may determine that a RAN node should monitor the average DL throughput to a given device and notify the Server-MF if this throughput is below a threshold. Note the NWDAF may also notify the SMF or PCF.

If the output at step 6 is Accept, the procedure may also determine whether any new measurements need to be made at the device, any RAN node, and/or any CN node. If so, the NWDAF may also specify the details for the new measurements, such as the frequency of reporting, thresholds, etc. For example, the NWDAF may determine that a UE should measure the RACH access periodically and report if this delay exceeds threshold T1. The NWDAF may determine that the UE should report measurements via Minimization of Drive Testing (MDT) or change the frequency with which it reports MDT. This information may be sent to the OAM system.

If the output at step 6 is Accept, the procedure may also determine new route information, if the NWDAF determines that the current planned route will not meet the strict QoS requirements.

Figure 10B:
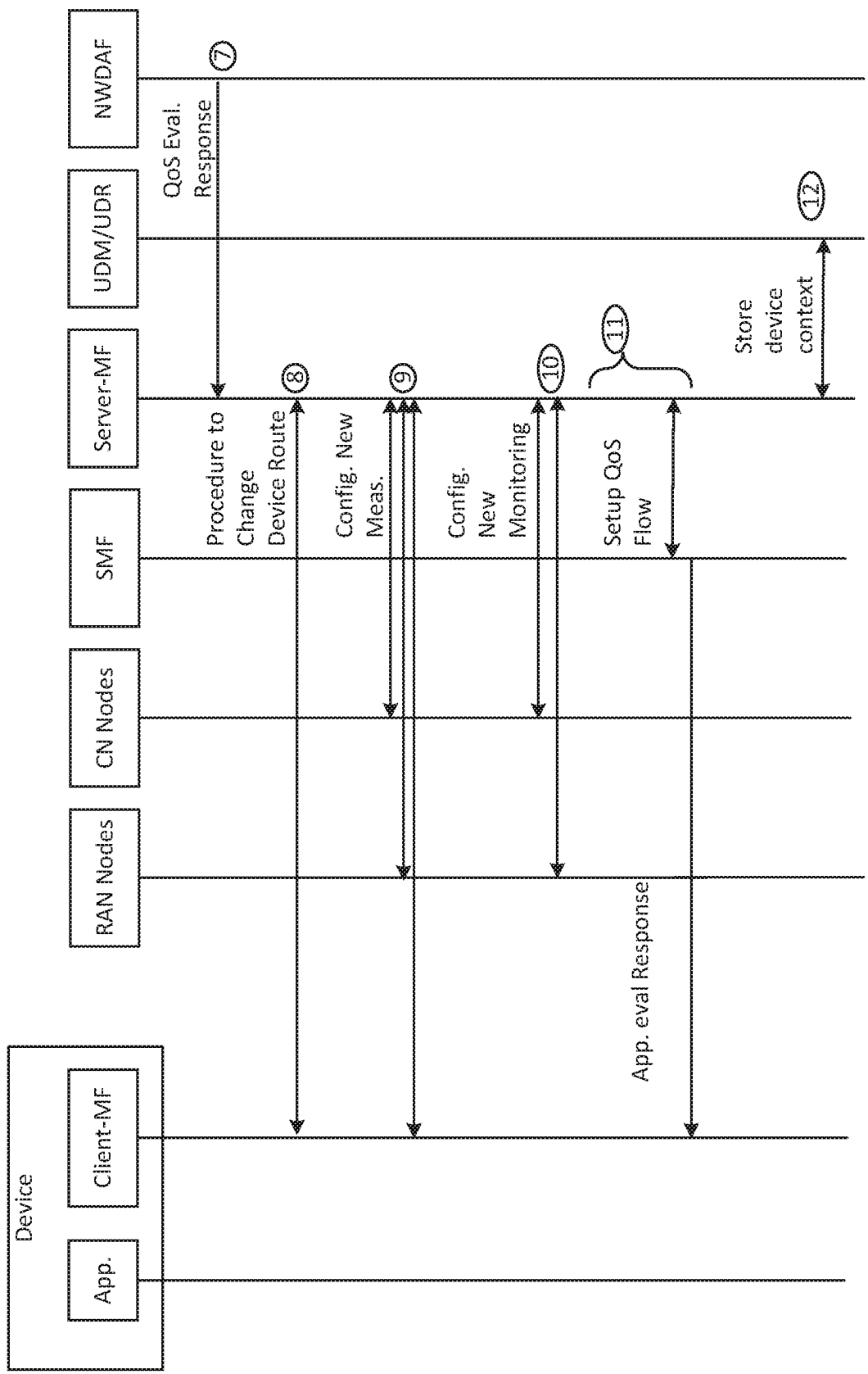

The call flow of FIG. 10A is continued in FIG. 10B. At step 7 of FIG. 10B, the NWDAF responds to the Server-MF with the QoS Evaluation Response, including the output information described in step 6. This response may include: Reject/Accept, New route, Monitoring Configuration, Measurement Configuration.

At step 8, if the NWDAF has determined a new route, the Server-MF requests that the device change route as described herein.

At step 9, if the NWDAF has determined that new measurements are required, the Server-MF configures the UE/RAN node/CN node measurements as described herein.

At step 10, if the NWDAF has determined that new monitoring is required, the Server-MF configures the RAN node/CN node monitoring, as described herein, or configures the UE to monitor its connection quality.

At step 11, if the NWDAF has determined that the QoS required by the application can be met, the Server-MF asks the SMF to establish the QoS Flow for this application. As part of this step, the SMF sends Application Evaluation Response to the device. The response may contain Accept/Reject decision, QoS Rules for the application, QoS Flow level QoS parameters if needed for the QoS Flow(s) associated with those QoS rule(s).

At step 12, the Server-MF, saves the device context in the UDR. This may include the new route, the new measurements, the new monitoring, and the accepted QoS requirements.

Note that in step 3, the device sends a control plane message to the core network to evaluate if the desired QoS requirement may be met over the device's planned route. This message is shown as an Application Evaluation Request, but it may be a PDU Session Establishment Request, a PDU Session Modification Request, or some other control plane message. Hereinafter, only the Application Evaluation Request is shown as representative embodiment, but it should be understood, that the procedures described below may be triggered by any of the control plane messages.

As another alternative, the device may include its current planned route in the Application Evaluation Request of step 3.

As another alternative the exchanges with the UE, RAN Nodes, and CN nodes described in steps 8, 9, and 10, may be combined to reduce these signalling exchanges. For example, a single message may be sent to the UE that may include the new route information from step 7, the new measurements from step 8, and/or the new monitoring from step 9. Similarly, a single message may be sent to each of the impacted RAN nodes or CN nodes to configure the new measurements from step 8, and/or the new monitoring from step 9.

Event 2: Device with Strict QoS Application, Selects a New Planned Route

In this case, the device already has ongoing applications with strict QoS requirements. The device may be in any transit state (stationary, sojourning, in-transit). Some external event causes the device to start moving on a planned route, or to modify an existing planned route. For example, an autonomous taxi may be parked at an airport taxi port. The taxi is at a charging station and is stationary. A customer hops on board and requests a ride to a hotel in the downtown area. In such a case, the autonomous taxi transitions to a new Planned Route.

In the following, it is assumed that the device has already registered with the core network, and has indicated that is supports route flexibility, and that route flexibility is enabled. Furthermore, it is assumed that the transit state of the device, as well as the current Planned Route, is stored in the UDR. This is only an example embodiment, and this information may be stored in the Server-MF, UDM/UDR, UDSF, or other network functions. The detailed call flow is shown in FIGS. 11A and 11B and described below.

Figure 11A:
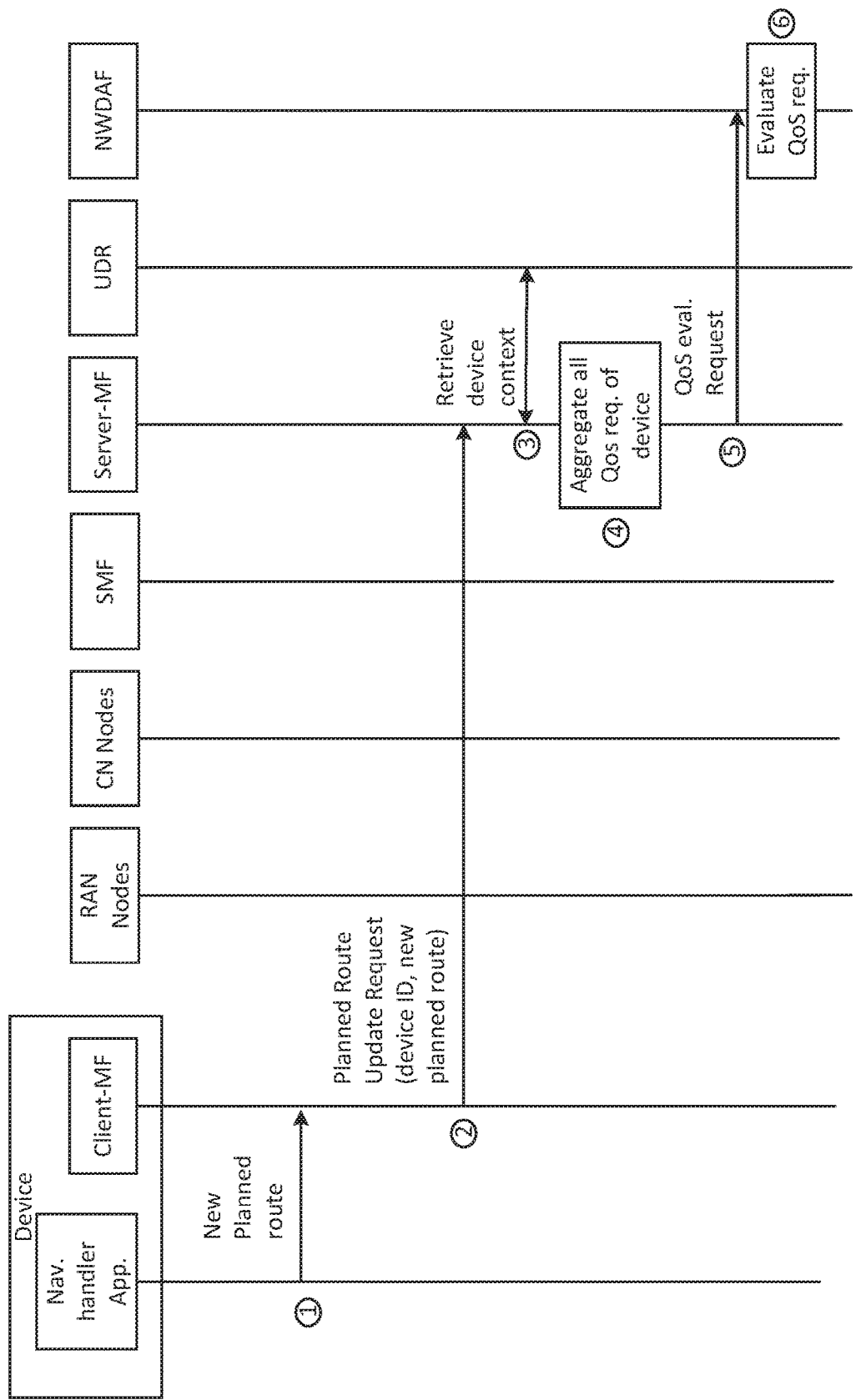
FIGS. 11A and 11B show a call flow of an example method for a device with a strict QoS application selecting a new planned route.
Figure 11B:
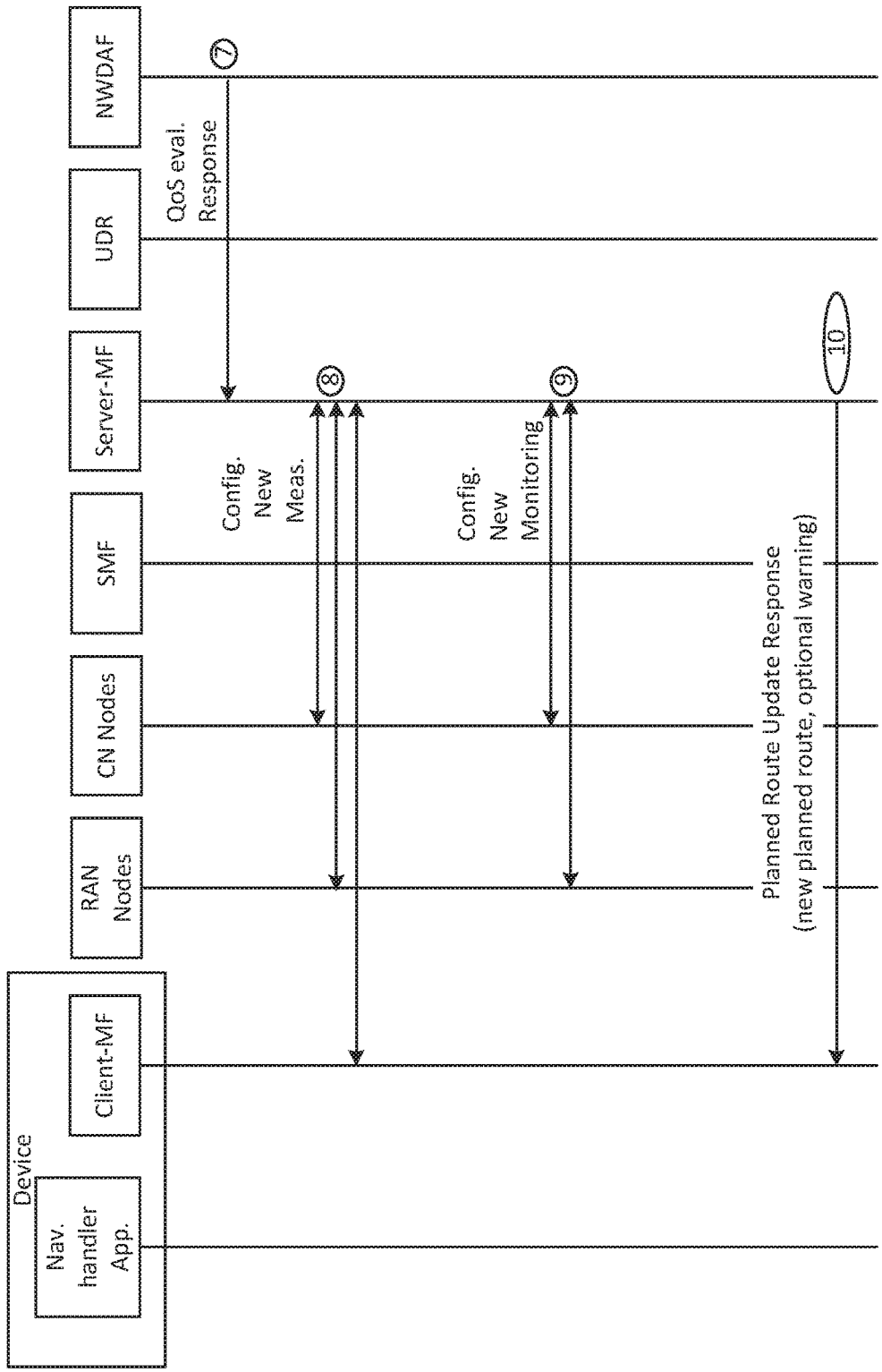

At step 1 of FIG. 11A, the navigation handling application sends a message to the Client-MF including the planned route. This message may include the information that is shown in Table 1, Table 2, and Table 3.

At step 2, the Client-MF sends a Planned Route Update Request to the core network. This message may include, for example: a device identifier (PEI or 5G-S-TMSI or SUPI or GPSI); a desired planned route; or the information that is shown in Table 1, Table 2, and Table 3. This message is routed from the AMF to the Server-MF.

At step 3, The Server-MF retrieves the device context from the UDR using a Retrieve Device Context Request. This request may include a device identifier, for example the PEI, 5G-S-TMSI, SUPI, or GPSI, as well as an indication of the requested information. For example, for this event, the Server-MF may retrieve QoS requirements of all active applications on the device, the transit state of the device, potentially an existing Planned Route of the device, and the Route Flexibility of the device.

At step 4, the Server-MF aggregates the QoS requirements of all the applications on the device.

At step 5, the Server-MF sends the QoS Evaluation Request to the NWDAF. This request may include: QoS requirements aggregated in step 4, the desired planned route of the UE received from step 2 or step 3.

At step 6, the NWDAF evaluates if the strict QoS requirements of the applications can be met on the desired planned route of the device. See NWDAF QoS Eval Procedure. The output of this procedure is Reject or Accept. If Accept, the procedure may also determine whether any monitoring needs to be set up at RAN nodes and CN nodes to verify that QoS is maintained. If so, the NWDAF may also specify what needs to be monitored in each node. For example, NWDAF may determine that a RAN node should monitor the number of devices in IDLE mode and notify the Server-MF if this number exceeds a threshold. In another example, the NWDAF may determine that a RAN node should monitor the average DL throughput to a given device and notify the Server-MF if this throughput is below a threshold.

If the output at step 6 is Accept, the procedure may further determine whether any new measurements need to be made at the device, any RAN node, and/or any CN node. If so, the NWDAF may also specify the details for the new measurements, such as the frequency of reporting, or thresholds. For example, the NWDAF may determine that a UE should measure the RACH access periodically and report if this delay exceeds threshold T1.

If the output at step 6 is Accept, the procedure may further determine new route information, if the NWDAF determines that the desired planned route will not meet the strict QoS requirements.

The call flow of FIG. 11A is continued in FIG. 11B. At step 7 of FIG. 11B, the NWDAF responds to the Server-MF with an QoS Evaluation Response, including the output information described in step 6. This response may include: Reject/Accept, New route, Monitoring Configuration, and Measurement Configuration.

At step 8, if the NWDAF has determined that new measurements are required, the Server-MF configures the UE/RAN node/CN node measurements as described herein.

At step 9, if the NWDAF has determined that new monitoring is required, the Server-MF configures the RAN node/CN node monitoring as described herein. The NWDAF may also configure dedicated monitoring in the UEs.

At step 10, the Server-MF responds to the Client-MF in the device with a Planned Route Update Response. The response may contain a new Planned Route, if the NWDAF had to reroute the device in order to meet the QoS requirements. Further, the response may contain the QoS warning, if the NWDAF has determined that the strict QoS requirements of one or more of the applications will not be met. In such a case, the Server-MF may also provide an indication of the application(s) that is(are) impacted.

As another alternative the exchanges with the UE, RAN Nodes, and CN nodes described in steps 8, 9, and 10, may be combined to reduce these signalling exchanges. For example, a single message may be sent to the UE that may include the new route information from step 10, the new measurements from step 8, and/or the new monitoring from step 9. Similarly, a single message may be sent to each of the impacted RAN nodes or CN nodes to configure the new measurements from step 8, and/or the new monitoring from step 9.

Event 3: New Strict QoS Application Over a Planned Route is Started on Device

In this case, the device is either in a stationary or sojourning transit state. An application with strict QoS requirements is started and this application needs to be used on a Planned route. For example, this could be the application that is controlling the autonomous driving of a vehicle. The application needs very stringent delay requirements in order to maintain small inter-vehicle distances. The call flow is identical to the one shown in FIG. 10, and the details are described below.

At step 1, the application sends a message to the Client-MF to check whether the QoS requirements of the application may be met along a planned route. The message may include one or more of the following:

First is the QoS Requirements. The QoS requirements of the application as described herein.

Second is an Advance Warning. The advanced warning the application requires if the QoS requirement will not be met.

Third is a Core Network Action. The action to be taken by the core network, if it determines that the QoS requirements will not be met. The network action may include an indication to the application of the QoS that may be offered, for example, or a notification to a $3^{rd}$ party server with an indication of the QoS that may be offered. In such a case, the application may also need to specify the address of the $3^{rd}$ party server, change the route of the device; and change the planned route of the device.

At step 2, The Client-MF in the device determines the aggregate needs of all active applications.

At step 3, The modem issues an Application Evaluation Request. This request message may include the information that is part of step 1. In addition, the request may also include some Application ID to identify the application on the device. This ID may be assigned by the Client-MF. The message is sent to the Server-MF through the AMF.

At step 4, Server-MF retrieves the device context, using a Retrieve Device Context Request to the UDR. This request may include a device identifier, for example the PEI, 5G-S-TMSI, SUPI, or GPSI, as well as an indication of the requested information. For example, for this event, the Server-MF may retrieve the QoS requirements of active applications on the device, and the Route Flexibility of the device.

At step 5, the Server-MF aggregates the QoS requirements and issues the QoS Evaluation Request to the NWDAF. This request may include: aggregated QoS requirements from step 4, the planned route of the device received from step 4.

At step 6, the NWDAF evaluates if the strict QoS requirements of the application can be met on the planned route of the device. See NWDAF QoS Eval Procedure. The output of this procedure is Reject or Accept. If Accept, the procedure may also determine whether any monitoring needs to be set up at RAN nodes and CN nodes to verify that QoS is maintained. If so, the NWDAF may also specify what needs to be monitored in each node. For example, NWDAF may determine that a RAN node should monitor the number of devices in IDLE mode and notify the Server-MF if this number exceeds a threshold. In another example, the NWDAF may determine that a RAN node should monitor the average DL throughput to a given device and notify the Server-MF if this throughput is below a threshold.

Similarly, if the output of the procedure at step 6 Accept, the procedure may also determine whether any new measurements need to be made at the device, any RAN node, and/or any CN node. If so, the NWDAF may also specify the details for the new measurements, such as the frequency of reporting, or thresholds. For example, the NWDAF may determine that a UE should measure the RACH access periodically and report if this delay exceeds threshold T1.

Further if the output of the procedure at step 6 Accept, the procedure may also determine new route information, if the NWDAF determines that the planned route will not meet the strict QoS requirements.

At step 7, the NWDAF responds to the Server-MF with the QoS Evaluation Response, including the output information described in step 6. This response may include: Reject/Accept, New route, Monitoring Configuration, Measurement Configuration.

At step 8, if the NWDAF has determined a new route, the Server-MF requests that the device change route as described herein.

At step 9, if the NWDAF has determined that new measurements are required, the Server-MF configures the UE/RAN node/CN node measurements as described herein.

At step 10, if the NWDAF has determined that new monitoring is required, the Server-MF configures the RAN node/CN node monitoring as described herein. If required, the Server-MF may also configure new monitoring at the UE At step 11, if the NWDAF has determined that the QoS required by the application can be met, the Server-MF asks the SMF to establish the QoS Flow for this application. As part of this step, the SMF sends Application Evaluation Response to the device. The response may contain Accept/

Reject decision, QoS Rules for the application, and QoS Flow level QoS parameters if needed for the QoS Flow(s) associated with those QoS rule(s).

At step 12, the Server-MF saves the device context in the UDR. This may include the new route, the new measurements, the new monitoring, and the accepted QoS requirements.

As an alternative to the above procedure, the new route information from step 8 may be included in the Application Evaluation Response from step 11.

In step 4 and step 12, the route information and device context are stored in the UDR. Alternatively, these can be stored in the UDSF or any other NF.

Event 4: Strict QoS Requirement not Met for a Device on a Planned Route

In this case, the device has one or more applications with strict QoS requirements. The network has accepted these applications and has set up monitoring to guarantee that the QoS is met. The device context is stored in the UDR. Alternatively, the device context may be stored in the UDSF or any other NF.

Owing to some event, the network determines that one or more of the QoS requirements will not be met. For example, the network may know that a device will move through a specific cell in 10 minutes. The network is also aware that a commuter train full of passengers is scheduled to move through the cell at about the same time. Most of the passengers on the train happen to be subscribers of the same operator that is providing service to the device. The network determines that it will not be able to meet the strict QoS requirements of the device (namely the average UL and DL throughputs). The detailed call flow is shown in FIGS. 12A, 12B, and 12C and described below.

Figure 12A:
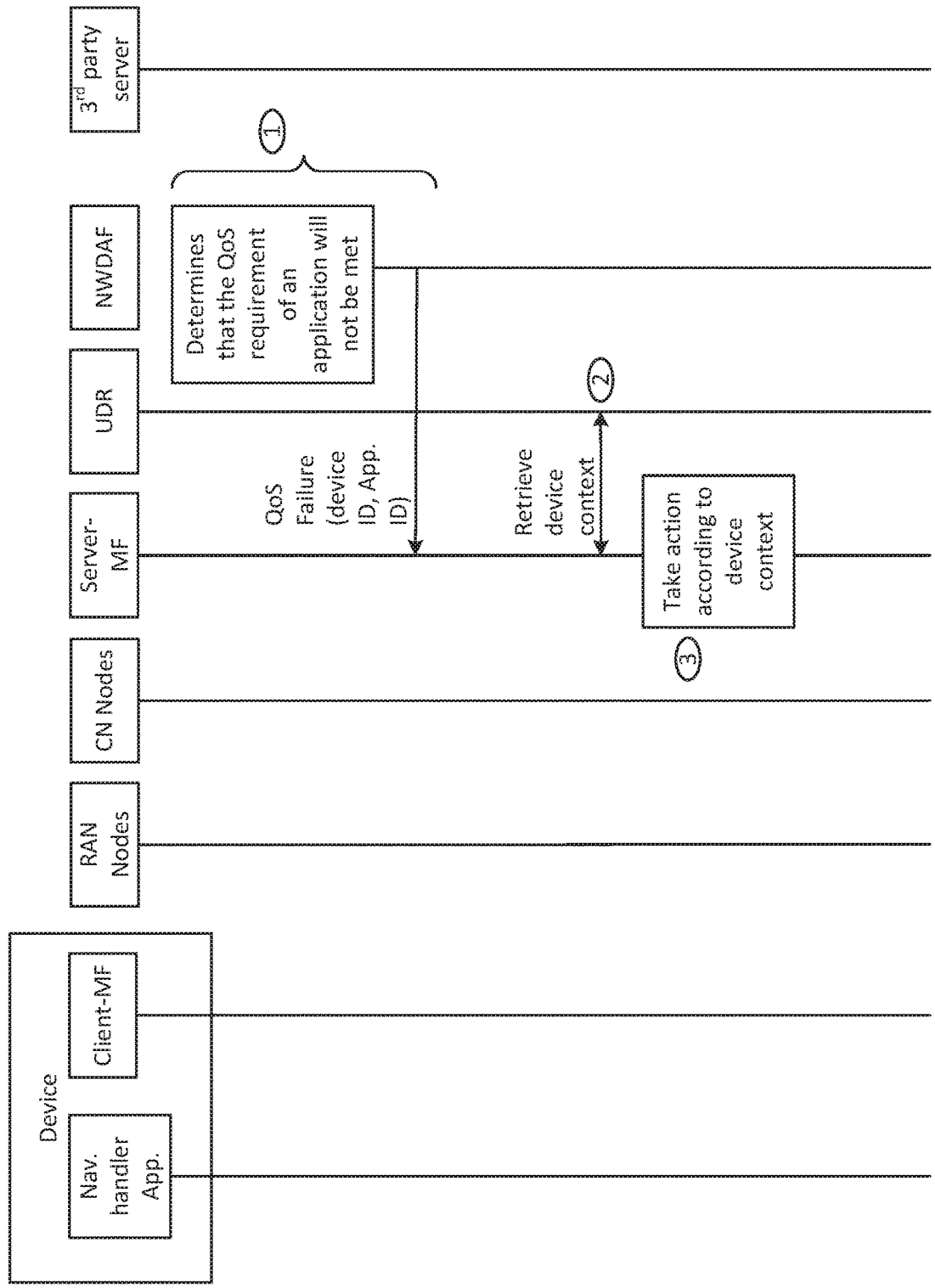
FIGS. 12A, 12B, and 12C shows call flow of an example method for a strict QoS requirement not met for a device on a planned route.
Figure 12B:
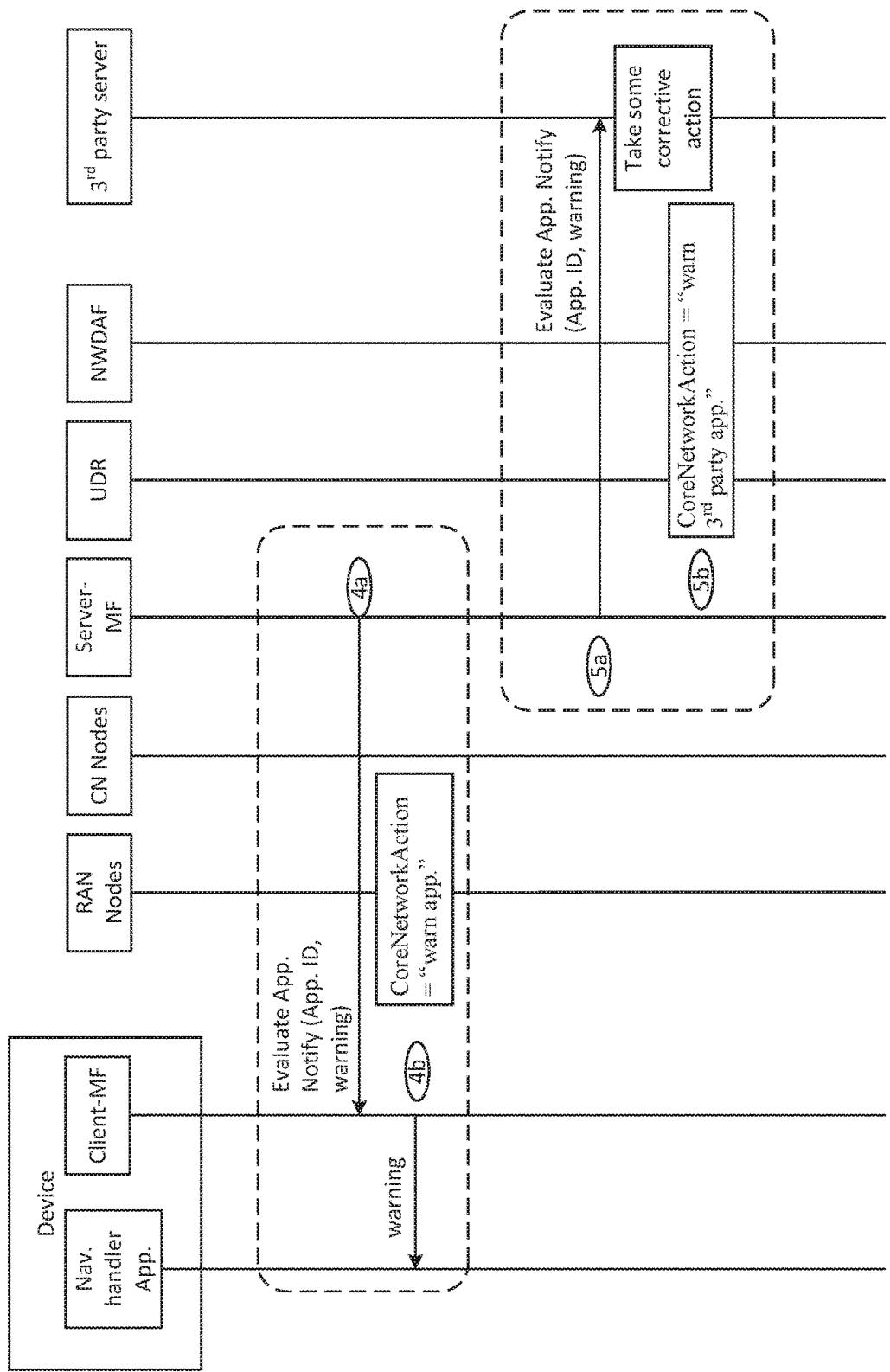
Figure 12C:
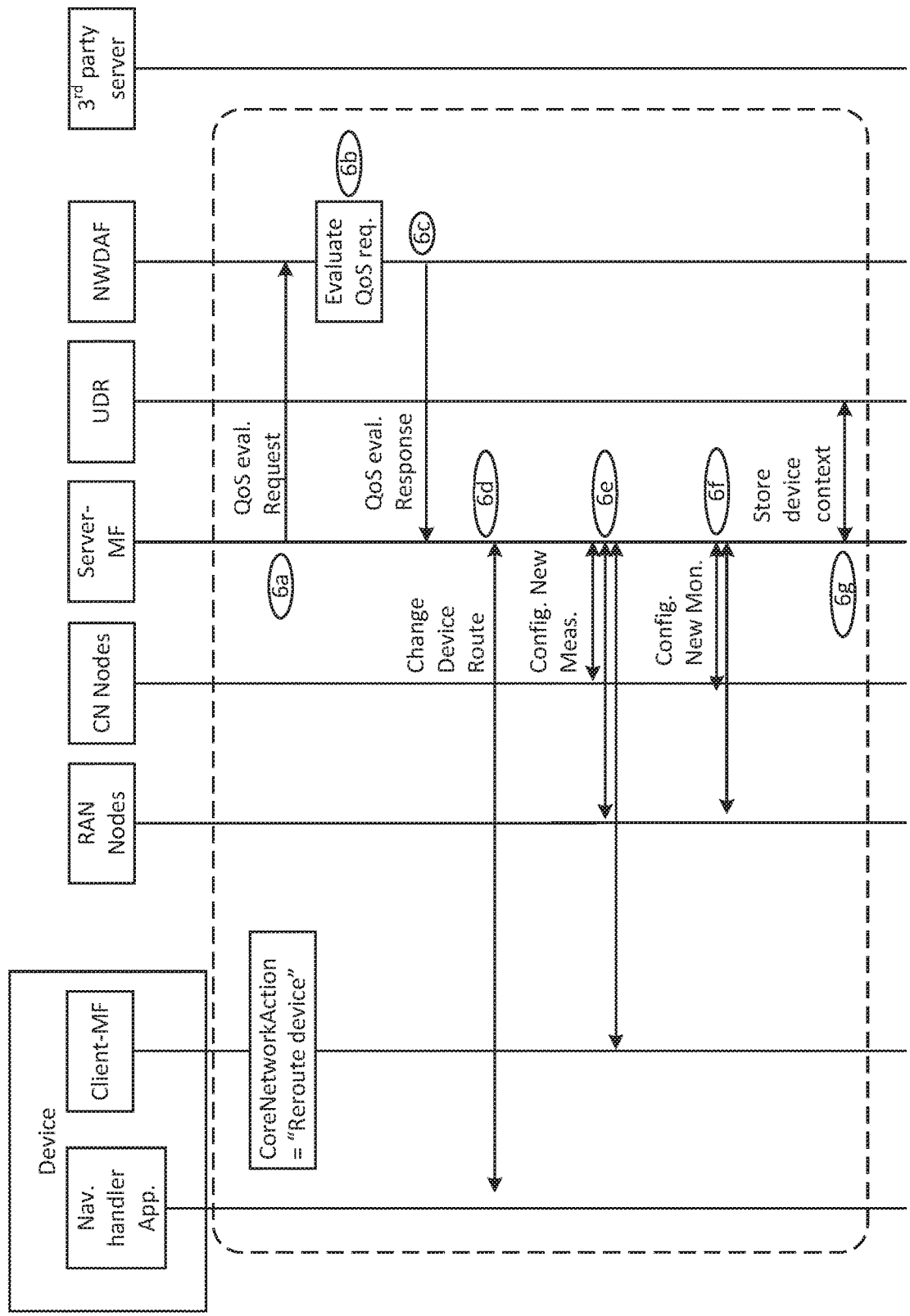

At step 1 of FIG. 12A, The NWDAF estimates that the strict QoS requirement will not be met for an application. It notifies the Server-MF through the QoS Failure message. The NWDAF may provide a Device ID, an Application ID, and the QOS Flow ID.

At step 2, The Server-MF retrieves the device context from the UDR, using a Retrieve Device Context Request. This request may include a device identifier, for example the PEI, 5G-S-TMSI, SUPI, or GPSI, well as an indication of the requested information. For example, for this event, the Server-MF may retrieve all device context for the device identified by the Device ID from step 1.

At step 3, The Server-MF examines the CoreNetworkAction parameter associated with the application (this is part of the device context).

The call flow of FIG. 12A is continued in FIG. 12B. At step 4a of FIG. 12B, if CoreNetworkAction="warn application", the Server-MF sends an Evaluate Application Notify message to the Client-MF of the device. This message may include: an Application ID, such as an ID of an application whose QoS will not be met; the QoS Flow ID, or additional information about the warning. This may include the expected time of the QoS failure, expected location of the failure (this may be a geofence, a cell, and a tracking area), QoS metric that is expected not to be met, QoS that is expected to be provided by the network. An example warning may be "Cell ABC not expected to meet average UL throughput between times 15:45-16:00. UL throughput expected to be 16 Kbps."

In step 4b, the Client-MF forwards the warning to the application. The application may then take some remedial action.

At step 5a, If CoreNetworkAction="warn $3^{rd}$ partyapplication", the Server-MF sends an Evaluate Application Notify message to an external IP address. The external IP address is part of the device context information. This message may include: an Application ID, such as an ID of application whose QoS will not be met; the QoS Flow ID, such as an ID of application flow whose QoS will not be met; or an additional information about the warning. This may include the expected time of the QoS failure, expected location of the failure (this may be a geofence, a cell, a tracking area, etc), QoS metric that is expected not to be met, QoS that is expected to be provided by the network. An example warning may be "Cell ABC not expected to meet average UL throughput between times 15:45-16:00. UL throughput expected to be 16 Kbps."

At step 5b, the $3^{rd}$ party application may then take some remedial action.

The call flow of FIG. 12B is continued in FIG. 12C. At step 6a of FIG. 12C, if CoreNetworkAction="reroute the device", the Server-MF aggregates the QoS requirements and issues the QoS Evaluation Request to the NWDAF.

At step 6b, the NWDAF evaluates if the strict QoS requirements of the application can be met. See NWDAF QoS Eval Procedure. The output of this procedure is Reject or Accept. If Accept, the procedure may also determine:

If any monitoring needs to be set up at RAN nodes and CN nodes to verify that QoS is maintained. If so, the NWDAF may also specify what needs to be monitored in each node. For example, NWDAF may determine that a RAN node should monitor the number of devices in IDLE mode and notify the Server-MF if this number exceeds a threshold. In another example, the NWDAF may determine that a RAN node should monitor the average DL throughput to a given device and notify the Server-MF if this throughput is below a threshold.

If any new measurements need to be made at the device, any RAN node, and/or any CN node. If so, the NWDAF may also specify the details for the new measurements, such as the frequency of reporting, thresholds, etc. For example, the NWDAF may determine that a UE should measure the RACH access periodically and report if this delay exceeds threshold T1.

New Route Information.

At step 6c, the NWDAF responds to the Server-MF with the QoS Evaluation Response, including the output information described in step 6b. This response may include: Reject/Accept, New route, Monitoring Configuration, and Measurement Configuration.

At step 6d, the Server-MF requests that the device change route (as described herein.

At step 6e, if the NWDAF has determined that new measurements are required, the Server-MF configures the UE/RAN node/CN node measurements. The Server-MF may also delete any UE/RAN node/CN node measurements that are no longer required as described herein.

At step 6f, if the NWDAF has determined that new monitoring is required, the Server-MF configures the RAN node/CN node monitoring. The Server-MF may also delete any RAN node/CN node monitoring that is no longer required as described herein.

At step 6g, the Server-MF saves the device context in the UDR. This may include the new route, the new measurements, the new monitoring, and the accepted QoS requirements.

As another alternative the exchanges with the UE, RAN Nodes, and CN nodes described in steps 6d, 6e, and 6f, may be combined to reduce these signalling exchanges. For example, a single message may be sent to the UE that may include the new route information from step 6d, the new measurements from step 6e, and/or the new monitoring from step 6f. Similarly, a single message may be sent to each of the impacted RAN nodes or CN nodes to configure the new measurements from step 6e, and/or the new monitoring from step 6f.

Sojourning Flexibility

Sojourn flexibility allows the core network to direct a device to move within its sojourning area so that the network may a meet strict QoS requirements of an application on the device. In addition, sojourn flexibility also allows the core network to direct a device to move within its sojourning area for network optimization reasons (for example load balancing). In the following, it is assumed that the device has already registered with the core network, and has indicated that is supports sojourn flexibility, and that sojourn flexibility is enabled.

Two additional events highlight these effects. Event 5 is when an application with strict QoS requirements is started on a device. The device is in the Sojourning Area Event 6 is when a device has an ongoing application with strict QoS requirements, the device is located within the Sojourning Area, and the network determines that the QoS requirement will not be met.

Although not shown, if the device has further indicated support for network optimization flexibility, (NetworkOptimizationFlexibility=enabled), the core network may independently determine to change the physical location of a device within the sojourn area, for load balancing or other network optimizations. In such a case, the procedure/call flow is like that of Event 6, with the following delta—the trigger is network optimization and not failure to meet QoS requirements.

Event 5: New Strict QoS Application Started on Device in Sojourning Area

Figure 13:
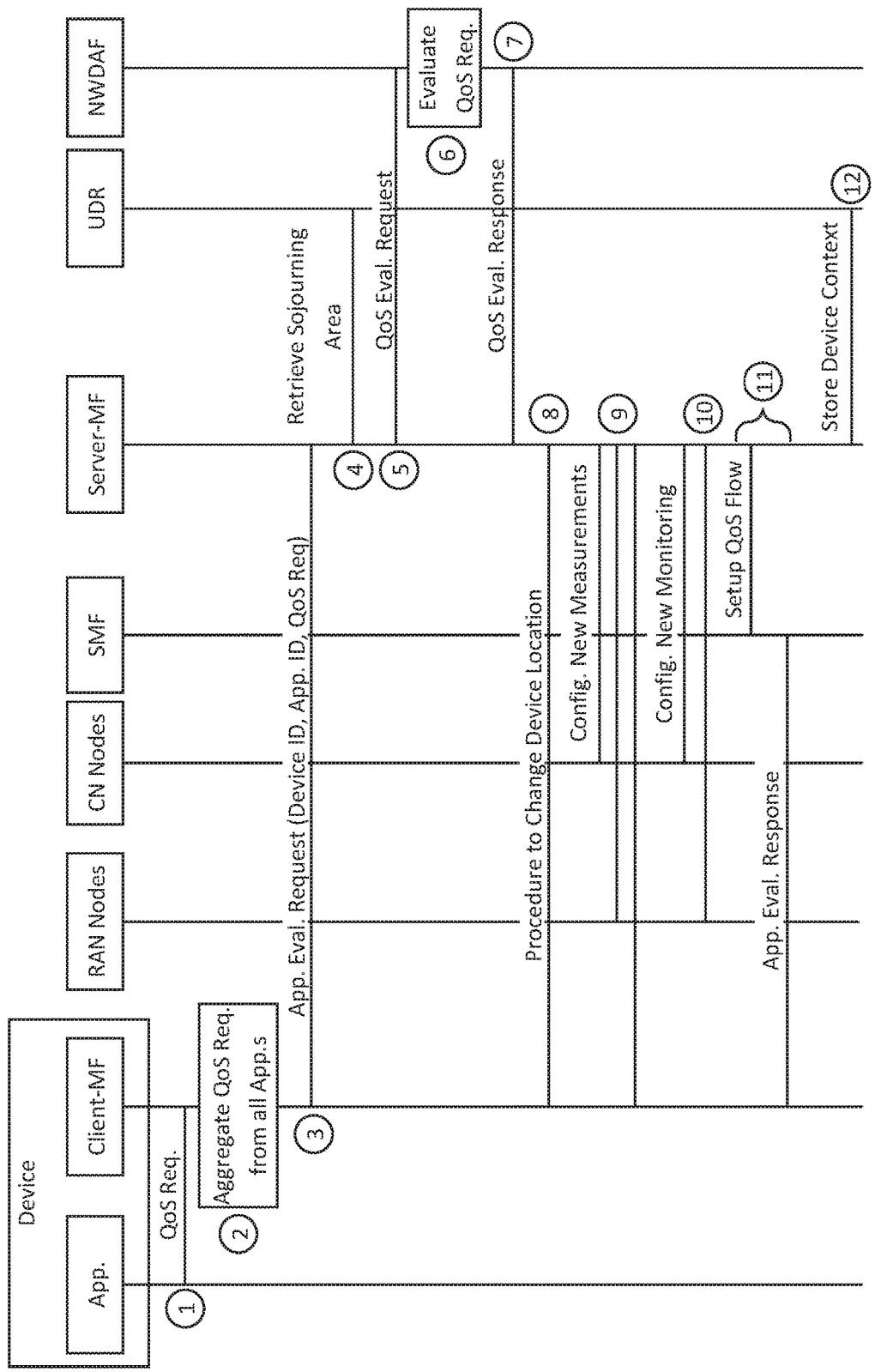
FIG. 13 shows a call flow of an example method for a new strict QoS application while a device is in the Sojourning Area.

In this case, the device is in its sojourning area. The device has informed the network of its current location. An application with strict QoS requirements is started on the device. The detailed call flow is shown in FIG. 13 and described below.

At step 1, The application sends a message to the Client-MF to check whether the QoS requirements of the application may be met while the device is in its sojourning area. The message may include one or more of, for example: QoS Requirements, such as the QoS requirements of the application; Advance Warning, such as warning the application requires if the QoS requirement will not be met; and a Core Network Action, such as an action to be taken by the core network if it determines that the QoS requirements will not be met.

The Core Network Action may include, for example: notifying the application with an indication of the QoS that may be offered; notifying a 3$^{rd}$ party server, with an indication of the QoS that may be offered. In such a case, the application may also need to specify the address of the 3$^{rd}$ party sever; or moving the device within the sojourning area to achieve the required QoS. Recall that the device can perform all its tasks anywhere in the sojourning area.

At step 2, The Client-MF in the device determines the aggregate needs of all active applications.

At step 3, The modem issues an Application Evaluation Request. This request message may include the information that is part of step 1. In addition, the request may also include some Application ID to identify the application on the device. This ID may be assigned by the Client-MF. The message is sent to the Server-MF through the AMF.

At step 4, Server-MF retrieves the sojourning area of the device, using a Retrieve Device Context Request to the UDR. This request may include a device identifier, for example the PEI, 5G-S-TMSI, SUPI, or GPSI as well as an indication of the requested information. For example, for this event, the Server-MF may retrieve the Sojourning Area of the device, and the Sojourn Flexibility of the device.

At step 5, The Server-MF, issues the QoS Evaluation Request to the NWDAF. This request may include: QoS requirements received from step 3, the sojourning area of the device received from step 4.

At step 6, The NWDAF evaluates if the strict QoS requirements of the application can be met at its current location. See NWDAF QoS Eval Procedure. The output of this procedure is Reject or Accept. If Accept, the procedure may also determine whether any monitoring needs to be set up at RAN nodes and CN nodes to verify that QoS is maintained. If so, the NWDAF may also specify what needs to be monitored in each node. For example, NWDAF may determine that a RAN node should monitor the number of devices in IDLE mode and notify the Server-MF if this number exceeds a threshold. In another example, the NWDAF may determine that a RAN node should monitor the average DL throughput to a given device and notify the Server-MF if this throughput is below a threshold.

If the output of this procedure at step 6 is Accept, the procedure may also determine whether any new measurements need to be made at the device, any RAN node, and/or any CN node. If so, the NWDAF may also specify the details for the new measurements, such as the frequency of reporting, thresholds, etc. For example, the NWDAF may determine that a UE should measure the RACH access periodically and report if this delay exceeds threshold T1.

Further, if the output of the is Accept, the procedure may also determine a new device location, if the NWDAF determines that the strict QoS requirements will not be meet at the current location.

At step 7, The NWDAF responds to the Server-MF with the QoS Evaluation Response, including the output information described in step 6. This response may include: Reject/Accept, New device location, Monitoring Configuration, Measurement Configuration.

At step 8, If the NWDAF has determined a new device location, the Server-MF requests that the device move to this location as described herein.

At step 9, If the NWDAF has determined that new measurements are required, the Server-MF configures the UE/RAN node/CN node measurements as described herein.

At step 10, If the NWDAF has determined that new monitoring is required, the Server-MF configures the RAN node/CN node monitoring as described herein.

At step 11, If the NWDAF has determined that the QoS required by the application can be met, the Server-MF asks the SMF to establish the QoS Flow for this application. As part of this step, the SMF sends Application Evaluation Response to the device. The response may contain Accept/Reject decision, QoS Rules for the application, and QoS Flow level QoS parameters if needed for the QoS Flow(s) associated with those QoS rule(s).

At step 12, The Server-MF saves the device context in the UDR. This may include the new device location, the new measurements, the new monitoring, and the accepted QoS requirements.

Note that in step 3, the device sends a control plane message to the core network to evaluate if the desired QoS requirement may be met at the device's current location. This message is shown as an Application Evaluation Request, but it may be a PDU Session Establishment Request, a PDU Session Modification Request, or some other control plane message. Hereinafter, only the Application Evaluation Request is shown as representative embodiment, but it should be understood, that the procedures described below may be triggered by any of the control plane messages.

As another alternative the exchanges with the UE, RAN Nodes, and CN nodes described in steps 8, 9, and 10, may be combined to reduce these signalling exchanges. For example, a single message may be sent to the UE that may include the new device location from step 8, the new measurements from step 9, and/or the new monitoring from step 10. Similarly, a single message may be sent to each of the impacted RAN nodes or CN nodes to configure the new measurements from step 9, and/or the new monitoring from step 10.

Event 6: Strict QoS Requirement not Met for a Device in Sojourning Area

In this case, the device has one or more applications with strict QoS requirements. The network has accepted these applications and has set up monitoring to guarantee that the QoS is met. The device context is stored in the UDR.

Owing to some event, the network determines that one or more of the QoS requirements will not be met. For example, the network may monitor the current UL load in the device's serving cell and determine that the QoS requirement will not be met. The detailed call flow is shown in FIGS. 14A and 14B and described below.

Figure 14A:
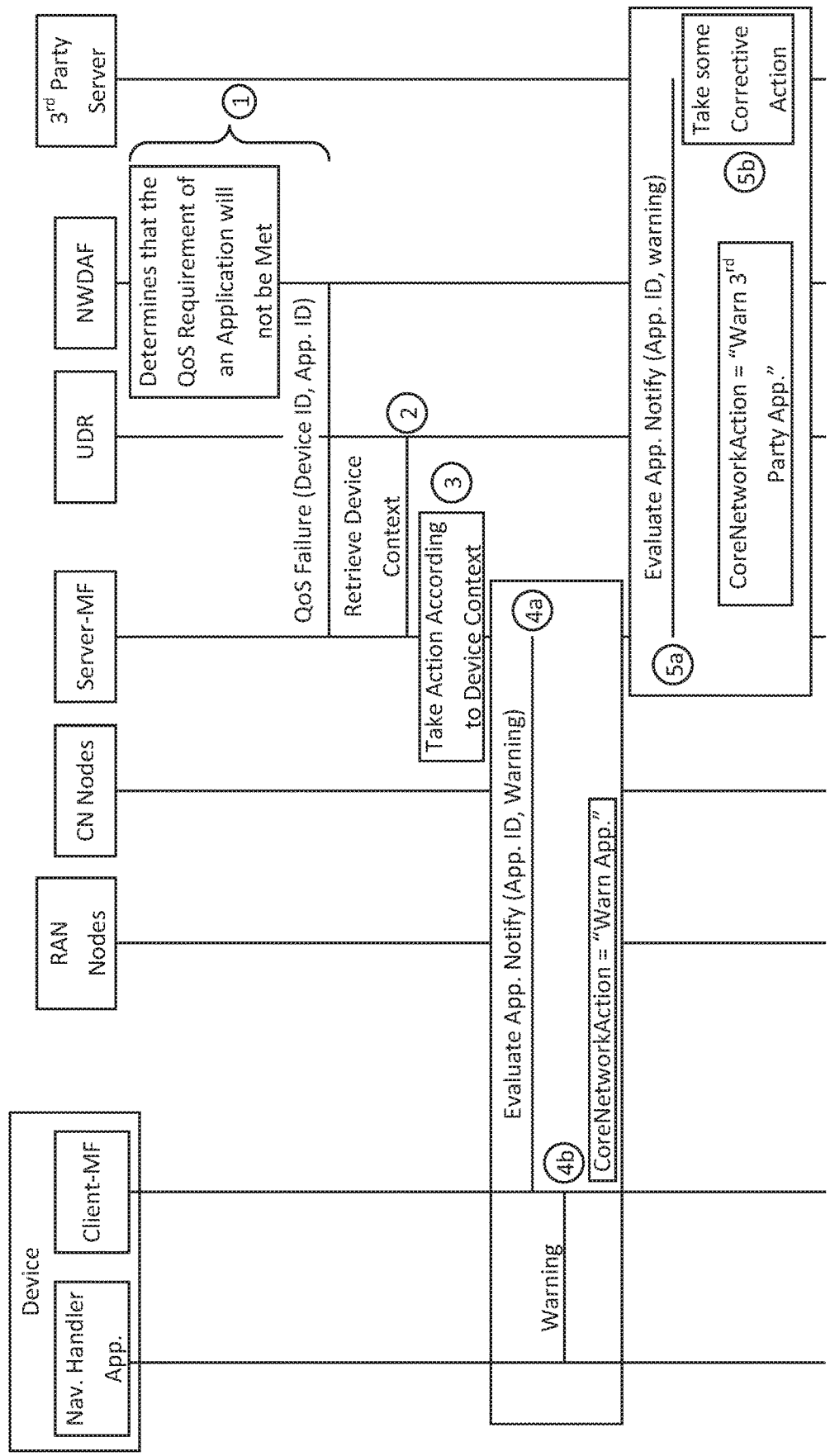
FIGS. 14A and 14B shows a call flow of an example method for a strict QoS requirement for an ongoing application not met for a device in its sojourning area.
Figure 14B:
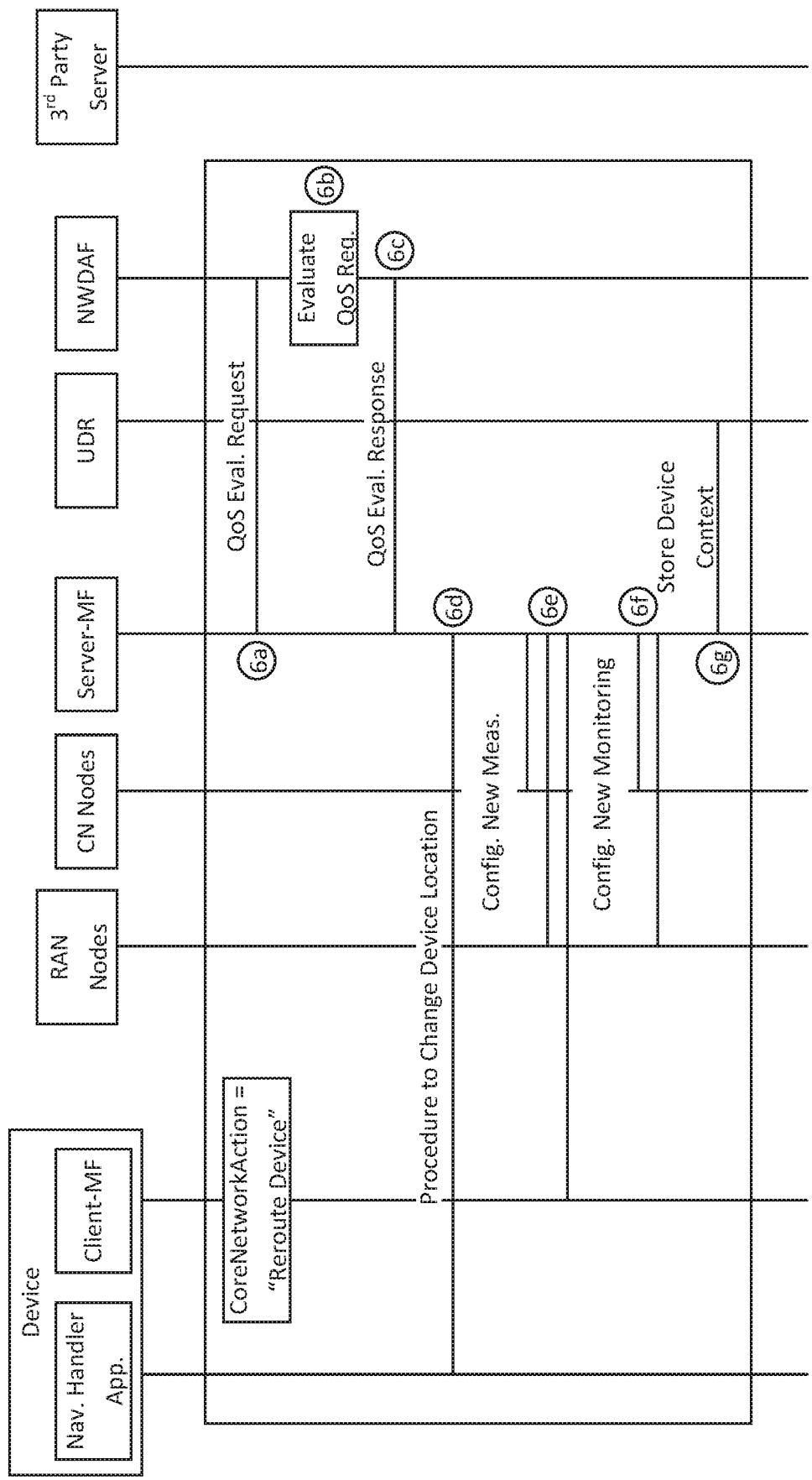

At step 1 of FIG. 14A, The NWDAF estimates that the strict QoS requirement will not be met for an application. It notifies the Server-MF. The NWDAF may provide a Device ID and an Application ID.

At step 2, The Server-MF retrieves the device context from the UDR, using a Retrieve Device Context Request. This request may include a device identifier, for example the PEI, 5G-S-TMSI, SUPI, or GPSI as well as an indication of the requested information. For example, for this event, the Server-MF may retrieve all device context for the device identified by the Device ID from step 1.

At step 3, The Server-MF examines the CoreNetworkAction parameter associated with the application (this is part of the device context).

At step 4a if CoreNetworkAction="warn application", the Server-MF sends an Evaluate Application Notify message to the Client-MF of the device. This message may include, for example, an Application ID, such as an ID of application whose QoS will not be met.

Further, the message may contain additional information about the warning. This may include, for example, the QoS metric that is expected not to be met and/or the QoS that is expected to be provided by the network. An example warning may be "average UL throughput between times 15:45-16:00. UL throughput expected to be 16 Kbps."

At step 4b, the Client-MF forwards the warning to the application. The application may then take some remedial action.

At step 5a, if CoreNetworkAction="warn 3$^{rd}$ party application", the Server-MF sends an Evaluate Application Notify message to an external IP address. The external IP address is part of the device context information. This message may include an Application ID, such as an ID of application whose QoS will not be met, and may include additional information about the warning, such as the QoS metric that is expected not to be met and/or the QoS that is expected to be provided by the network. An example warning may be "average UL throughput between times 15:45-16:00. UL throughput expected to be 16 Kbps."

At step 5b, the 3$^{rd}$ party application may then take some remedial action.

The call flow of FIG. 14A is continued in FIG. 14B. At step 6a of FIG. 14B, if CoreNetworkAction="move the device", the Server-MF aggregates the QoS requirements and issues the QoS Evaluation Request to the NWDAF.

At step 6b, the NWDAF evaluates if the strict QoS requirements of the application can be met. See NWDAF QoS Eval Procedure. The output of this procedure is Reject or Accept. If Accept, the procedure may also determine whether any monitoring needs to be set up at RAN nodes and CN nodes to verify that QoS is maintained. If so, the NWDAF may also specify what needs to be monitored in each node. For example, NWDAF may determine that a RAN node should monitor the number of devices in IDLE mode and notify the Server-MF if this number exceeds a threshold. In another example, the NWDAF may determine that a RAN node should monitor the average DL throughput to a given device and notify the Server-MF if this throughput is below a threshold.

If the output is Accept, the procedure may also determine whether any new measurements need to be made at the device, any RAN node, and/or any CN node. If so, the NWDAF may also specify the details for the new measurements, such as the frequency of reporting, thresholds, etc. For example, the NWDAF may determine that a UE should measure the RACH access periodically and report if this delay exceeds threshold T1.

If the output is Accept, the procedure may also determine whether new device location information.

At step 6c, the NWDAF responds to the Server-MF with the QoS Evaluation Response, including the output information described in step 6b. This response may include: Reject/Accept, New device location, Monitoring Configuration, Measurement Configuration.

At step 6d, the Server-MF requests that the device change location as described herein.

At step 6e, if the NWDAF has determined that new measurements are required, the Server-MF configures the UE/RAN node/CN node measurements. The Server-MF may also delete any UE/RAN node/CN node measurements that are no longer required as described herein.

At step 6f, if the NWDAF has determined that new monitoring is required, the Server-MF configures the RAN node/CN node monitoring. The Server-MF may also delete any RAN node/CN node monitoring that is no longer required as described herein.

At step 6g, the Server-MF, saves the device context in the UDR. This may include the new device location, the new measurements, the new monitoring, and the accepted QoS requirements.

As an alternative, the exchanges with the UE, RAN Nodes, and CN nodes described in steps 6d, 6e, and 6f, may be combined to reduce these signalling exchanges. For example, a single message may be sent to the UE that may include the new device location from step 6d, the new measurements from step 6e, and/or the new monitoring from step 6f. Similarly, a single message may be sent to each of the impacted RAN nodes or CN nodes to configure the new measurements from step 6e, and/or the new monitoring from step 6f.

Support/Common Procedures
Strict QoS Application Terminated

In this case, the device already has ongoing applications with strict QoS requirements. The device may be in any transit state (stationary, sojourning, and in-transit).

Figure 15:
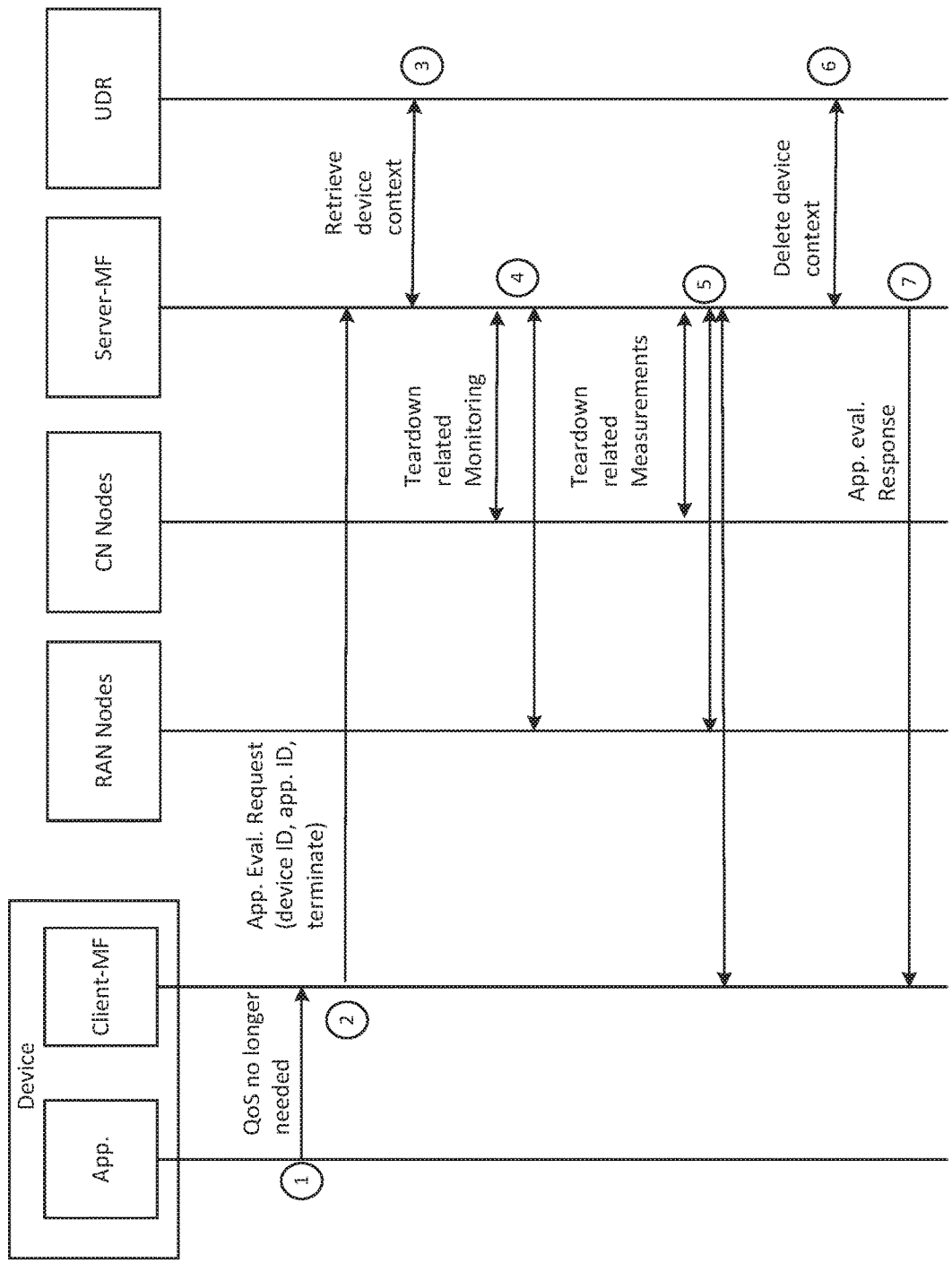
FIG. 15 shows a call flow of an example method for an application where a strict QoS requirement is terminated.

The application closes or is terminated, and the device context in the core network needs to be updated. It is assumed that the network has monitoring setup for this application, measurements set up for this application, as well as QoS requirement information stored in the device context stored in the UDR. The detailed call flow is shown in FIG. 15 and described below.

At step 1, The application sends a message to the Client-MF indicating that it no longer requires strict QoS. Alternatively, the application may send a message that it is closing (shutting down). As another alternative, the Client-MF may monitor activity of the application and after the expiry of an inactivity timer, it may take this as an indication that the application is no longer active.

At step 2, The Client-MF modem issues an Application Evaluation Request to the core network. This request message may include: an Application ID, such as an identifier of the application; the QoS Flow ID: Identifier of the application flow; or a Termination Indication, such as an indication that strict QoS no longer needed for this application.

The message is sent to the Server-MF through the AMF.

At step 3, Server-MF retrieves the device context from the UDR, using a Retrieve Device Context Request. This request may include a device identifier, for example the PEI, 5G-S-TMSI, SUPI, GPSI as well as an indication of the requested information. For example, for this event, the Server-MF may retrieve all device context related to the application, identified by the Application ID from step 2.

At step 4, The Server-MF cancels all monitoring in the RAN nodes and CN nodes that is tied to this application.

At step 5, The Server-MF cancels all measurements in the UE, RAN nodes, and/or CN nodes that are tied to this application.

At step 6, The Server-MF deletes all device context in the UDR that is tied to the terminating application.

At step 7, The Server-MF sends an Application Evaluation Response to the device, confirming that the device context, measurements, and monitoring tied to the terminating application have been deleted.

As an alternative to the above procedure, the core network may also maintain inactivity timers for the application. If these inactivity timers expire, the core network may take this as an indication that the application has been terminated. For example, the application may have been stopped by the device. The inactivity time may be a component of the QoS requirement of the application and provided to the Server-MF in the application's "Evaluate Application Request". As another alternative, if the inactivity timer expires, the core network may consider the application as INACTIVE. For example, it may stop QoS monitoring related to this application, and taking measurements to support this QoS monitoring. The core network may maintain the device context on the UDR in case the application becomes active again.

NWDAF QoS Eval Procedure

This procedure is used by the Server-MF to evaluate if the core network can meet strict QoS requirement over a physical route of a device. Such a procedure may be used, for example, when a device wants to start a new application with strict QoS requirements. For example, this may happen when a device wants to establish a new PDU session or update an existing PDU session.

Such a procedure may also be used when a device wants to re-start an application with strict QoS requirements. For example, this may happen when a device must re-establish a PDU session that was terminated due to an unexpected disconnect, Such a procedure may further be used when a device with an existing application with strict QoS requirements must change its physical route. This may be as a result of some external event (as described herein) or because the network is no longer capable of guaranteeing the QoS requirements for the current physical route of the device (as described herein).

In an example embodiment, the evaluation is shown as being performed in the NWDAF. However, this evaluation may be performed by a network management function, some other control plane network function, or some $3^{rd}$ party server. It is assumed that the NWDAF regularly receives one or more of Cell Information and Coverage Information.

Cell Information is cell specific information such as load in cell, number of ACTIVE-mode devices, number of IDLE-mode devices, average UL load, and average DL load.

Coverage Information is coverage information for each location. The operator may maintain coverage maps that show where received signal strength is strong or weak. For example, a street corner in an industrial park may have poor coverage owing to numerous buildings between the cell tower and the corner. The coverage map may also include information about the cell tower expected to serve each location.

It is assumed that the NWDAF may also keep historic records of this input information.

Figure 16:
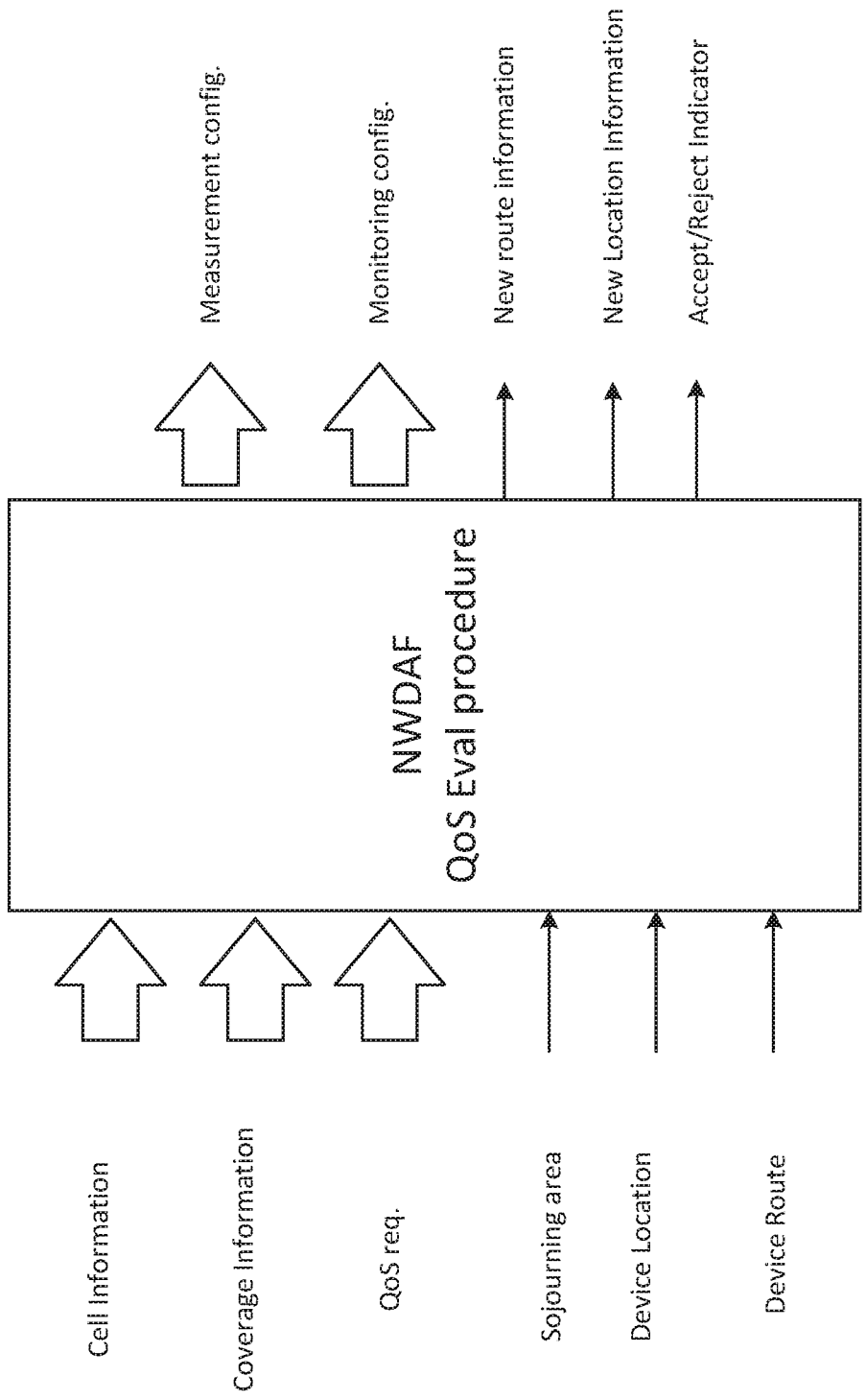
FIG. 16 shows a block diagram of example inputs and outputs for an NWDAF QoS Eval procedure.

FIG. 16 shows the inputs and outputs of the NWDAF QoS Eval procedure.

The inputs include the Cell Information and Coverage Information, and may additionally include:

A Sojourning Area of the device; a Device Location, such as the current location of the device; a Device Route, such as the current or expected route of a device; or QoS Requirements, such as the aggregate QoS requirements of the device.

The outputs of the NWDAF QoS Eval procedure include an indication if the strict QoS requirements may be met (this may be an Accept/Reject indicator). If the QoS may be met, the NWDAF also may include new monitoring or measurement requirements.

New Monitoring requirements may be required if any monitoring needs to be set up at RAN nodes and CN nodes to verify that QoS is maintained. If so, the NWDAF may also specify what needs to be monitored in each node. For example, NWDAF may determine that a RAN node should monitor the number of devices in IDLE mode and notify the Server-MF if this number exceeds a threshold. In another example, the NWDAF may determine that a RAN node should monitor the average DL throughput to a given device and notify the Server-MF if this throughput is below a threshold.

New Measurement Requirements may be required if any new measurements need to be made at the device, any RAN node, and/or any CN node. If so, the NWDAF may also specify the details for the new measurements, such as the frequency of reporting, thresholds, etc. For example, the NWDAF may determine that a UE should measure the RACH access periodically and report if this delay exceeds threshold T1.

New Measurement requirements for other devices maybe required. Some devices may have informed the core network that they support Advanced Measurement Capability. The NWDAF may determine that one or more of these other device measurements may be useful. The NWDAF may specify the details for these measurements.

The NWDAF may also include, new route information or a new device location.

The NWDAF QoS Eval procedure for events 1-4, is depicted in FIG. 16, and described below.

At step 0, The NWDAF receives a request from some Originator, to evaluate if QoS requirements may be met along a specific Device Route. For example, the events described in herein assume that the Originator is the Server-MF. Alternatively, the Originator may be an Application Function that communicates with the NWDAF via the Network Exposure Function (NEF)

At step 1, The NWDAF uses the input information (QoS requirements, Device Route, Cell Information, or Coverage Information) to make its decision. If decision is yes, go to step 2. Otherwise go to step 3. Note that the actual algorithm to make this determination is likely proprietary and is considered out-of-scope.

At step 2, The NWDAF generates the new monitoring requirements and measurement requirements. The NWDAF then responds to the Originator that the QoS requirements can be met, and includes the monitoring requirements, measurement requirements, and Device Route. Processing stops.

At step 3, The NWDAF checks if the device has route-Flexibility enabled. If so, the procedure continues with step 4. Otherwise the procedure continues with step 5.

At step 4, NWDAF finds an alternate planned route as described herein. After selecting the alternate route, the procedure returns to step 1, except that it uses the alternate route as the Device Route.

At step 5, NWDAF responds to the Originator that the QoS cannot be met.

The NWDAF QoS Eval procedure for events 5-6, is very similar. The main differences are described below.

At step 0, The NWDAF receives a request from some Originator, to evaluate if QoS requirements may be met at the current location of a device. For example, the events described herein assume that the Originator is the Server-MF. Alternatively, the Originator may be an Application Function that communicates with the NWDAF via the Network Exposure Function (NEF)

At step 1, The NWDAF uses the input information (QoS requirements, Device Location, Sojourning area, Cell Information, and Coverage Information) to make its decision. If decision is yes, go to step 2. Otherwise go to step 3. Note that the actual algorithm to make this determination is likely proprietary and is considered out-of-scope.

At step 2, The NWDAF generates the new monitoring requirements and measurement requirements. The NWDAF then responds to the Originator that the QoS requirements can be met, and includes the monitoring requirements, measurement requirements, and Device Location. Processing stops.

At step 3, The NWDAF checks if the device has Sojourn-Flexibility enabled. If so, the procedure continues with step 4. Otherwise the procedure continues with step 5.

At step 4, NWDAF finds an alternate location within the Sojourning area. After selecting this alternate location, the procedure returns to step 1, except that it uses the alternate location as the Device Location.

At step 5, NWDAF responds to the Originator that the QoS cannot be met. Note that it is assumed that the NWDAF has the functionality to determine the cells that will be impacted on the Device Route or the cells that will be impacted in the Sojourning area.

The Originator may invoke the NWDAF QoS Eval procedure by issuing a Nnwdaf_AnalyticsInfo_Request service operation. In step 4 of the procedures, it is assumed that the NWDAF is always capable of finding alternate routes for the device, or an alternate location for the device. If the number of potential routes or locations is finite, then the NWDAF QoS Eval procedure would eventually go to step 5 if all routes or locations have been evaluated and none can meet the QoS requirements of the device and its applications.

NWDAF Determining Alternate Routes

As described in the NWDAF QoS Eval procedure, the NWDAF may need to find an alternate route for a device to guarantee that the network meets the strict QoS requirements of the applications on the device. Several options are available for finding these alternate routes, including the following.

Option 1: Device always provides an ordered list of routes to the Server-MF. For example, when a device tells the network its Planned Route, it may provide a list of potential routes. These may be sorted in preferred order (from most preferred route to least preferred route), or alternatively, each route in the list may have a preference indication.

The ordered list of routes is stored in the UDR with the device context. When the NWDAF needs to select an alternate route for the device, it selects the next route on this ordered list. Note that the device may update the ordered list at any time using the procedure described herein.

Option 2: Device always provides the final destination of the route to the Server-MF. When the NWDAF needs to find an alternate route for the device, it recalculates an alternate route from the device's current position to the final destination. The navigation logic may be hosted internally to the core network or hosted in an external server. In the latter case, the core network queries the external service to determine another route from the device's current position to the final destination of the device. Note that in cases where the core network does not know the current position of the device, it may query the device. Note that the device may also provide additional information to help guide the selection of a preferred route. A device may provide information as to the relative importance of a metric. For example, the device may say that time is more important than distance travelled. Potential other metrics that may be provided by the device to assist in route selection may include: probability of collision along route, crime rate along route, death toll along route, road rage instances along route, or tolls along the route. All this information may be stored in the UDR and may be opaque to the cellular network.

Option 3: In this option, every time the NWDAF needs to find an alternate route of a device, the network triggers the device to generate an alternate route and provide it to the Server-MF. A call flow for Option 3 is described below.

At step 1, The NWDAF signals to the Server-MF that the device needs to provide an alternate route. The NWDAF may issue an Alternate Route Request to the Server-MF. The message may include an identifier of the device. The message may further include a list of Off-Limit Areas, such as areas or locations which the device should avoid. For example, the NWDAF may know that Highway 15 runs through a cell that is heavily loaded and should be avoided. In this case, the NWDAF may include Highway 15 in the list of Off-Limit Areas. The list may be described in terms of a geofence or specific streets/highways. When calculating the alternate route, the navigation handler application of the device will avoid these areas.

At step 2, the Server-MF sends a new control message to the Client-MF of the device, for example an Alternate Planned Route Request. This message may include the Off-Limit Areas from step 1.

At step 3, the Client-MF asks the navigation handler application for an alternate route. The route is calculated while avoiding the areas on the Off-Limit Areas list.

At step 4, the Client-MF returns the alternate route to the Server-MF, in a New Alternate Route Response message.

At step 5, the Server-MF provides the alternate route to the NWDAF using Alternate Route Response.

Changing the Route of a Device

If the device has indicated that it supports route flexibility, and that route flexibility is enabled, the network may need to change the physical route of a device in order to meet a strict QoS requirement. For example, for events 1, 2, 3, and 4, the network may determine that the device may need to choose an alternate route in order to meet a device's QoS requirements. In these events, the NWDAF determines the alternate route, and provides this route information to the device. The overall procedure is described below.

At step 1, NWDAF provides the alternate route information to the Server-MF. This message may include the device identity and the new route. The new route information may include the information from Table 1, Table 2, and Table 3. The new route information may include what QoS levels may be used in each segment in each time period. The message may include a reference ID that identifies the route information.

At step 2, Server-MF sends a Change Device Route request to the device's Client-MF. This request contains the new route information that was received in step 1.

At step 3, The Client-MF forwards the Change Device Route request to the navigation handler application in the device. The message includes information that was received in step 1.

At step 4, The navigation handler application stores the physical route and begins navigating the device according to the new route.

At step 5, The Client-MF sends an acknowledgement to the Server-MF (Change Device Route response).

At step 6, The Server-MF stores the new route in the device context.

The UE may subsequently send a PDU Session request to the network to indicate that the new route has been accepted. The Reference ID that was provided in step 1 may be included in the message to indicate what route has been accepted.

Changing the Location of a Device

If the device has indicated that is supports sojourn flexibility, and that sojourn flexibility is enabled, the network may need to change the physical location of a device in order to meet a strict QoS requirement. For example, for events 5 and 6, the network may determine that the device may need to move to an alternate location within the sojourning area in order to meet a device's QoS requirements. In these events, the NWDAF determines the alternate location, and provides this location information to the device. The overall procedure is described below.

At step 1, NWDAF provides the alternate location information to the Server-MF. This message may include the device identity and the new location.

At step 2, Server-MF sends a Change Device Location request to the device's Client-MF. This request contains the new location.

At step 3, The Client-MF forwards the Change Device Location request to the navigation handler application in the device.

At step 4, The navigation handler directs the device to move to the new location.

At step 5, The Client-MF sends an acknowledgement to the Server-MF (Change Device Location response).

At step 6, The Server-MF stores the new location in the device context.

Configuring New Measurements

This procedure is executed each time the NWDAF has determined that new measurements are required in order to assist the network in evaluating whether a UE, RAN node, and/or CN node can meet QoS requirements. As part of this procedure, the Server-MF configures measurements for the planned route. Note that if the NWDAF has also changed the route of a device, then the Server-MF may also be required to tear down the measurements for the prior planned route. The procedure is described below.

At step 1, The Server-MF receives the QoS Evaluation response from the NWDAF, containing new measurement configuration. The configuration information may include two lists, for example: one for a list of nodes for which the measurement needs to be cleared, and another for a list of devices where new measurements need to be performed. Both lists contain information to help identify the metrics.

For example, the List of Measurements to Clear may include an indication of a metric to be cleared and a Node ID the node where the measurement is to be cleared. This may be a RAN node, CN node, or a device.

The List of Measurements to Set may include an indication of the metric involved and a Node ID of the node where the measurement is to be taken. This may be a RAN node, a CN node, or a device. The metric may be, for example, the NWDAF also may include the number of ACTIVE-mode devices served by a cell, the average UL throughput, the paging delay in a RAN node, or the free buffer size in UPF.

At step 2, The Server-MF communicates to each of the impacted nodes in the "List of measurements to Set" to configure the measurement.

At step 3, The Server-MF communicates to each of the impacted nodes in the "List of measurements to Clear" to clear the measurement.

Configure UE Measurement of RACH Access Latency

Figure 17:
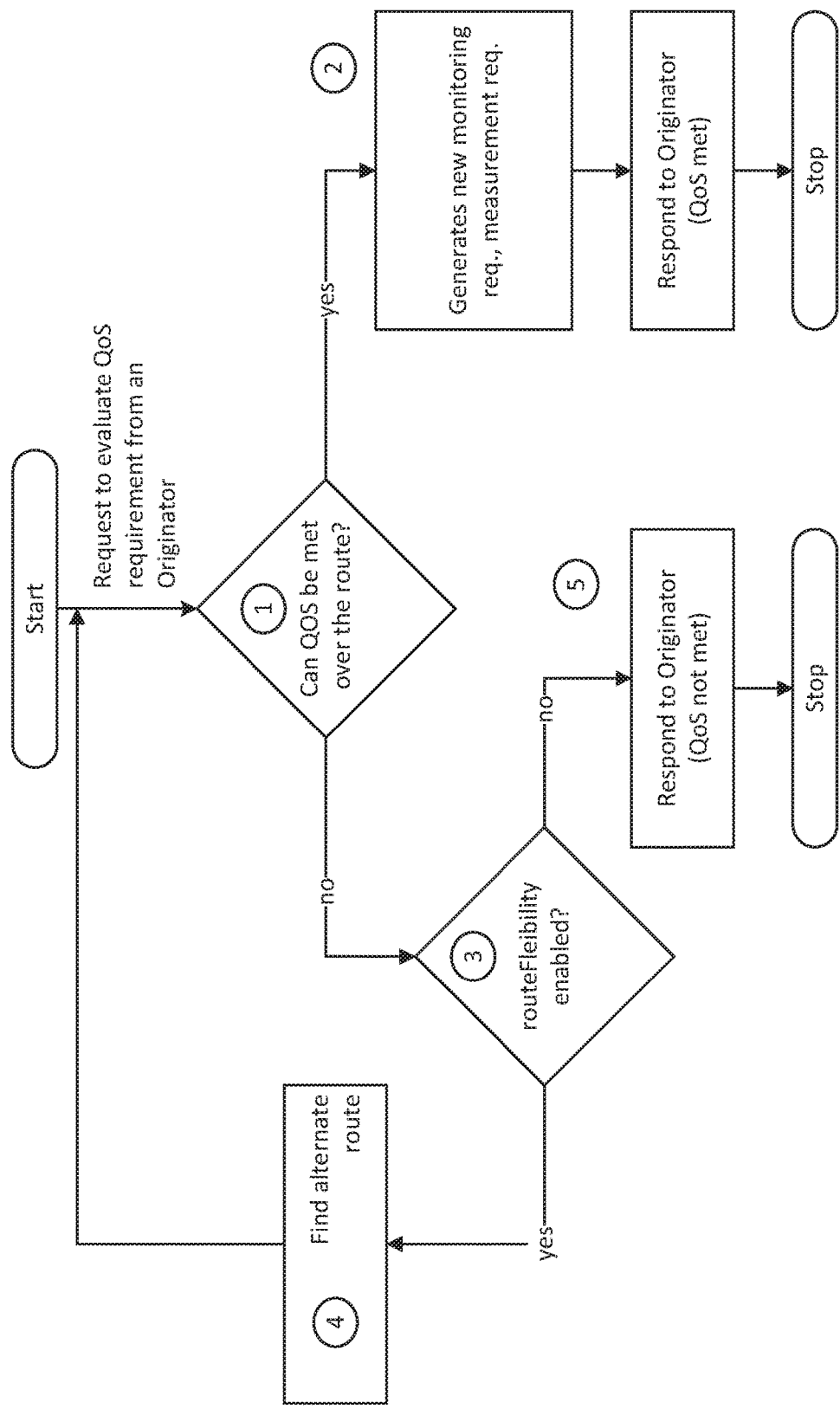
FIG. 17 shows a flow chart of an example method for a NWDAF QoS Eval Procedure.

Some applications will have strict QoS requirements on Access Latency from IDLE-mode. In this case, the device may need to take RACH access measurements and report these to the network. The configuration of RACH Access Latency is shown in FIG. 17 and described below.

At step 1, The Server-MF receives the QoS Evaluation response from the NWDAF, containing RACH measurement configuration for the device. The configuration information may include a Measurement Period in ACTIVE-mode. While in ACTIVE-mode, a device will attempt to access the RACH, once every Measurement Period. For example, a device in ACTIVE-mode may be asked to measure the RACH access delay every 600 seconds.

The configuration information may include a Measurement Period in IDLE-mode. While in IDLE-mode, a device will attempt to access the RACH, once every Measurement Period. The period may be tied to the DRX cycle of the device. For example, a device may be told to measure the RACH delay every K DRX cycles.

The configuration information may include an indication of Reporting, whereby the device may be told to report the RACH delay after every measurement, or if the delay exceeds a threshold.

At step 2, the Server-MF communicates to each of the impacted nodes in the "List of measurements to Set" to configure the measurement.

At step 3, the Server-MF asks the AMF to configure the RACH measurements on the device. The device may be provided with the information from step 1.

At step 4, once configured, the device takes the RACH measurements according to the configuration.

At step 5, the configuration information may include a hen reporting is triggered, the device sends a Measurement Report to the RAN node.

Configuring New Monitoring

This procedure is executed each time the NWDAF has determined that new monitoring is required in order to assist the network in evaluating whether a RAN node and/or CN node can meet QoS requirements. As part of this procedure, the Server-MF set-ups the monitoring for the planned route. Note that if the NWDAF has also changed the route of a device, then the Server-MF may also be required to tear down the monitoring for the prior planned route. The procedure is described below.

At step 1, The Server-MF receives the QoS Evaluation response from the NWDAF, containing new monitoring configuration. The configuration information may include two lists: one for a list of nodes for which the monitoring needs to be torn down, and another for a list of devices where new monitoring needs to be performed. Both lists contain information to help identify the metric to be monitored.

For example, the list of monitoring to be torn down may include the metric to be deleted and a Node ID to identity of the node where the monitoring is to be torn down. This may be a RAN node or CN node.

The list of monitoring to be set-up may include a Node ID and a metric. The Node ID identifies where the monitoring is to be set-up. This may be a RAN node or CN node. The metric t may include thresholds or timers, to guide when the monitoring will trigger a report to the Server-MF. For example, a UE may ask to report the RACH delay once every hour.

At step 2, the Server-MF communicates to each of the impacted nodes in the "List of monitoring to be Set-Up" to configure the monitoring.

At step 3, the Server-MF communicates to each of the impacted nodes in the "List of monitoring to be torn down" to clear the monitoring.

V2X NR Sidelink Communications Procedures

In cases like use case three discussed above, he strict QoS requirement to be met occurs over sidelink communications. In addition to employing methods for route and location control, the network may use its knowledge about the radio environment along the path to meet strict QoS requirements by changing the sidelink communications policies, for the most important objectives of the task to be met successfully.

Two alternative methods for UEs or AFs to request sidelink communication policies to be allocated for tasks requiring that strict QoS requirements are met include, for example: an explicit request for sidelink communication policy provisioning which may be initiated by either UEs or AFs; and an implicit method of provisioning new or updated sidelink communication policies when relevant information (e.g., application/traffic patterns for critical tasks) is received.

Explicit Request for Sidelink Communication Policy

Figure 20:
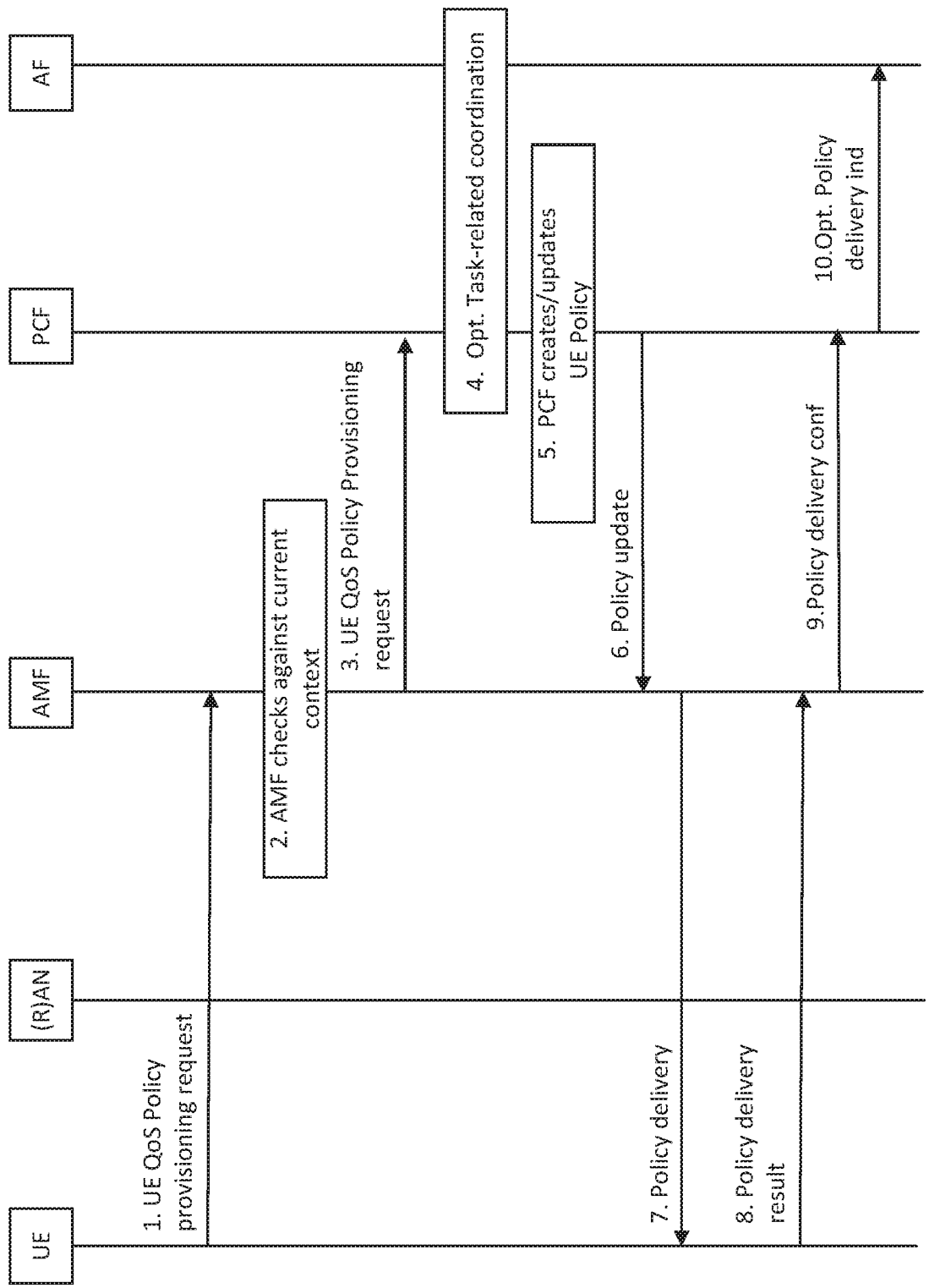
FIG. 20 shows a call flow of an example method for requesting provisioning of a UE Policy for meeting QoS requirements.

FIG. 20 depicts a method for an explicit request for a sidelink communication policy. This procedure may be used by a UE involved in a cooperating task, e.g., which requires sidelink communications meeting strict QoS requirements. The procedure allows the UE to request V2X NR sidelink resources to be allocated for the cooperative task. The UE provides in the request information that will be used by the PCF to determine an applicable sidelink communication policy.

The PCF may interact with other NFs as well as external AFs to determine the policy parameters. As such, the policy determination functionality shown to be implemented at the PCF may be implemented in other 5GC network functions, e.g., UDM, NWDAF, Server-MF, V2X application server, or other application functions. In addition, this functionality may be implemented in external application servers providing input to 5GC functions and PCF.

Step 1: In response to a new application on the UE starting, or an application on the UE signalling that the UE's route will change, the UE makes a request for sidelink communication policies. The information specified may include several items.

First, the information may include a V2X service identifier to indicate the service using the resources.

Second is a V2X Policy/Parameters identifying the policies provisioned at the UE.

Third is a task identifier, such as a UE generated or pre-provisioned identifier which is used to correlate the sidelink communication policy with the local communication task.

Fourth is task information, such as information about task criticality and security information. For example, the UEs may be pre-provisioned with tokens for mission-critical tasks based on subscription. The task information may also include information about AFs coordinating the task.

Fifth is UE information, such as specific IDs for the UEs involved in the communication or generic information (e.g., the number of UEs anticipated to be involved). This may also include a group identifier. The UE information may also indicate if the cooperative task may be accomplished with only specific UEs or with any authorized UEs which may be recommended by the network based on existing conditions.

Sixth is required or desired communication characteristics. Several characteristics may be provided in either "required" or "desired" categories depending on their criticality for the specific task (e.g., data volume per UE); QoS requirements; communication range requirements, inter-device distance requirements, stationary vs. mobility requirements; timing parameters (e.g., task/communication duration, time window for communication applicability); geographical area requirements or restrictions (e.g., specific location, route, or sojourning area); communication patterns (e.g., indications of periodic communications) along with pattern info (e.g., communication duration time, time period, scheduled communication time, and data size); or a request identifier (e.g., unique ID) associated with the request.

In step 2, optionally the AMF checks if the current UE context includes a sidelink communication policy corresponding to the request.

In step 3, the AMF sends a request to PCF for creation or update of a policy supporting the request.

In step 4, If the request includes information about AFs coordinating the task, the PCF, AF and any other necessary NF may exchange task information necessary for the creation or validation of the policy. For example, the PCF may communicate the UE information received to the AF, who then provides parameters which will be used in determining the UEs to accomplish the task or other recommended parameters to be included in the policy. The AF may also provide validation criteria most pertinent for the task it coordinates.

In step 5, PCF creates a new policy or updates an existing one, in order to support the requested sidelink communication. In addition to the information received in the request, the PCF includes information received from the task coordinating AF or other NFs, e.g., \NWDAF. The policy may include several pieces of information.

First, for example, the policy may include a policy identifier, such as a unique ID for the policy, may be the same as the request ID provided by the UE or an associated ID.

Second is allocated network resource pool information, such as radio information needed for discovery and communications using V2X NR sidelink for the request. This may include resource pools for sidelink communication monitoring or resource pools for sidelink communication transmission, for example. This information is in turn used by lower layers in performing resource allocation.

Third is allocated resource characteristics e.g., allocated data volume per UE, QoS requirements, allocated communication range parameters, or time window for allocated policy applicability. The resource characteristics may also specify the service or application the policy applies to.

Fourth is recommended communication characteristics. These parameters may be used to recommend communication characteristics leading to meeting the required characteristics. For example, updated communication range parameters, routes or sojourning areas may be proposed. The recommendation may also include a group ID corresponding to UEs recommended for task communication in order to achieve the desired QoS. The recommendation may also include task control info, e.g., for reducing inter-device distance.

Fifth is validation criteria. In addition to a time window for policy applicability, the policy may include other criteria to be used for policy validation, e.g., a specific location, speed, time of day, radio environment measurement, observed bit error rate, or any other measurement. This allows also the possibility of providing more than one policy for a given request, with different policies being valid under different conditions.

More than one sidelink communication policy may be provided for the same request or task. Parameters such that the validation criteria can then be used to specify how to apply each policy under different conditions, e.g., at specific locations along the route, based on UE speed.

In step 6, the PCF provides the AMF with the new or updated sideling communication policy.

In step 7, the AMF delivers the Policy received from the PCF to the UE. This step may be preceded by procedures such as network-initiated Service Request, depending on the registration state of the UE.

In step 8, the UE retains and applies the sidelink communication policy provided by the PCF and sends the result to the AMF.

In step 9, the PCF is notified when the AMF receives the policy delivery response from the UE. The PCF maintains the latest list of sidelink communication policies delivered to the UE.

In step 10, optionally, the PCF notifies the coordinating AF (and other NFs as needed) of the policy delivery to the UE.

Once the sidelink communication policy has been provided, the UE or AF can schedule the task, e.g., at a specified time and location. The cooperating and communicating UEs may also be chosen based on the information provided. Other task control parameters may be changed based on the information provided in the recommended communication characteristics, e.g., different inter-device distance may be applied and a new sojourning area may be allocated.

Implicit Request for Sidelink Communication Policy

The technique illustrated in FIG. 20 may be used as an implicit request for V2X NR sidelink communication policy allocation. The implicit procedure may be triggered by either the UE or AF providing the PCF or AMF information about upcoming traffic with strict QoS requirements (other than an explicit request), based on which the PCF decides to create or update a sidelink communication policy providing dedicated resources for the task. For example, either the UE or AF may update traffic pattern information based on which the PCF decides that a new or updated sidelink communication policy is required. From there, steps 5-10 from the explicit procedure described above apply.

The technique illustrated in FIG. 20 may rely also upon the UE including V2X Policy Provisioning request during other requests/procedures such as Registration, UE Policy Association Establishment, UE Policy Association Modification, etc.

Alternative Signalling of Sidelink Communication Policy Parameters.

Once the sidelink communication policy has been provided to AMF in step 6 of the explicit request procedure, the information may be provided to UEs using two main alternatives, for example.

First, the information provided via direct signalling in step 7 specifies how to receive the information above (e.g., for sidelink radio communication scheduling) via broadcast using specific/dedicated SIBs. For example, specific time-window, location, group ID, or optional SIB information may be provided. If a group ID is provided via the information broadcast during the specified time window, the policy will apply only to the UEs in the indicated group.

Second, the direct signalling method detailed above starting with step 7. All parameters are delivered within a policy container. In this case there are two further alternatives. The direct signalling steps 6-10 may be executed with the assumption that the requesting UE or a task-coordinating AF delivers the policy to all UEs involved in the communication in an over-the-top manner, or the direct signalling steps 6-10 may be executed repeatedly by the 5GS such that each of the UEs involved in the cooperative task communication is provisioned with the information. This method assumes that the process of creating the policy in step 5 resulted in a specific list or group of UEs being identified as policy users.

Graphical User Interface

A device may have a GUI that allows the user to select whether route information may be shared with the network. The GUI may also allow the user to select whether it is willing to accept route adjustments from the network.

When the device receives a route adjustment suggestion, as described above, the device may display a pop up message to the user. The pop up message may indicate that a new route has been received. The message may indicate the new expected arrival times. The message may allow the user to select to browse the new route content.

Acronyms and Terminology

The following is a list of acronyms that may appear in the above description. Unless otherwise specified, the acronyms used herein refer to the corresponding term listed in Table 4.

TABLE 4

Acronyms

| Acronym | Term |
|---|---|
| 5GC | 5G Core Network |
| 5GS | 5G System |
| 5G-GUTI | 5G Globally Unique Temporary Identifier |
| 5G-S-TMSI | 5G S-Temporary Mobile Subscription Identifier |
| AGV | Automatic Guided Vehicle |
| AF | Application Function |
| AMF | Access and Mobility Management Function |
| AP | Access Point |
| AS | Access Stratum |
| ASICs | Application Specific Integrated Circuits |
| AUSF | Authentication Server Function |
| BSC | Base Station Controller |
| BTS | Base Transceiver Station |
| Client-MF | Client Mobility Function |
| CN | Core Network |
| D2D | Device to Device (communications) |
| DL | Downlink |
| DN | Packet Data Network |
| DSP | Digital Signal Processor |
| DVD | Digital Versatile Disks |
| DRX | Discontinuous Reception |
| EDGE | Enhanced Data rates for GSM Evolution |
| eV2X | Enhanced Vehicle-to-Everything |
| FM | Frequency Modulated |
| FPGAs | Field Programmable Gate Array |
| GERAN | GSM EDGE |
| GGSN | Gateway GPRS Support Node |
| GPS | Global Position System |
| GSM | Global System for Mobile Communications |
| GUI | Graphical User Interface |
| HeNB | A Home Evolved Node-B |
| HSDPA | High-Speed Downlink Packet Access |
| HSUPA | High-Speed Uplink Packet Access |
| HSPA | High-Speed Packet Access |
| HSPA+ | Evolved HSPA |
| IC | Integrated Circuit |
| IMS | IP Multimedia Subsystem |
| IP | Internet Protocol |
| IR | Infrared |
| IS-2000 | Interim Standard 2000 |
| IS-856 | Interim Standard 856 |
| IS-95 | Interim Standard 95 |
| LCD | Liquid Crystal Display |
| LTE | Long Term Evolution |
| LTE-A | LTE-Advanced |
| MDT | Minimization of Drive Testing |
| MF | Mobility Function |
| MGW | Media Gateway |
| MIMO | Multiple-Input Multiple Output |
| MME | Mobility Management Gateway |
| mMTC | Massive Machine Type Communications |
| MOS | Mean Opinion Score |
| MSC | Mobile Switching Center |
| NAS | Non Access Stratum |
| NEF | Network Exposure Function |
| NF | Network Function |
| NR | New Radio |
| NWDAF | Network Data Analytic Function |
| OAM | Operations and Management |
| OLED | Organic Light-Emitting Diode |
| PCF | Policy Control Function |
| PCI | Peripheral Component Interconnect |
| PDA | Personal Digital Assistant |
| PDN | Packet Data Network |
| PDR | Packet Detection Rule |
| PDU | Protocol Data Unit |
| PEI | Permanent Equipment Identifier |
| PLMN | Public Land Mobile Network |
| POTS | Plain Old Telephone Service |
| PSTN | Public Switched Telephone Network |
| ProSe | Proximity-based Services |
| PPPP | ProSe Per-Packet Priority |
| PPPR | ProSe Per-Packet Reliability |
| PSM | Power Saving Mode |
| QoS | Quality of Service |
| RAM | Random-Access Memory |

TABLE 4-continued

Acronyms

| Acronym | Term |
|---|---|
| RAN | Radio Access Network |
| RAT | Radio Access Technology |
| RF | Radio Frequency |
| RG | Residential Gateway |
| RNC | Radio Network Controller |
| ROM | Read-Only Memory |
| RRC | Radio Resource Control |
| RRH | Remote Radio Heads |
| RSU | Roadside Units |
| SD | Secure Digital |
| Server-MF | Server Mobility Function |
| SGSN | Serving GPRS Support Node |
| SIM | Subscriber Identity Module |
| SDF | Service Data Flow |
| SMF | Session Management Function |
| SMS | Short Message Service |
| TCP | Transmission Control Protocol |
| TRP | Transmission and Reception Points |
| UDM | Unified Data Management |
| UDP | User Datagram Protocol |
| UDR | Unified Data Repository |
| UDSF | Unstructured Data Storage Function |
| UE | User Equipment |
| UL | Uplink |
| UMTS | Universal Mobile Telecommunications System |
| UPF | User Plane Function |
| URLLC | Ultra-Reliable Low-Latency Communication |
| USB | Universal Serial Bus |
| UV | Ultraviolet |
| V2I | Vehicle-to-Infrastructure Communication |
| V2N | Vehicle-to-Network Communication |
| V2P | Vehicle-to-Pedestrian Communication |
| V2V | Vehicle-to-Vehicle Communication |
| V2X | Vehicle to Everything |
| VoIP | Voice Over Internet Protocol |
| WiMAX | Worldwide Interoperability For Microwave Access |
| WLAN | Wireless Local Area Network |
| WPAN | Wireless Personal Area Network |
| WTRU | Wireless Transmit/Receive Units |

Herein the term "Client Mobility Function (Client-MF)" generally refers to a functionality in the device to aid the network-controlled device location or network-controlled device route.

Herein the term "In-Transit" generally refers to a transit mode of a device. When In-Transit, the device is moving and following a route.

Herein the term "Location" generally refers to a physical location of a device. This may be defined as GPS coordinate. When needed, the core network may also find Alternate Locations. These are locations within the Sojourning Area Herein the term "Sojourning" generally refers to a transit mode of a device. When Sojourning, the device is not following a route, but can move within a Sojourning Area. The device may be considered portable.

Herein the term "Sojourning Area" generally refers to an area over which a device may fulfil all its primary tasks (for example sensing), and over which the device is willing or allowed to move.

Herein the term "Stationary" generally refers to a transit mode of a device. When Stationary the device is fixed and not allowed to move. For example, the device may be at a charging station and physically attached to the charger.

Herein the term "Transit Mode" generally refers to one of three modes: In-Transit, Sojourning, Stationary. These modes are used to denote the level at which the device mobility may be controlled by the cellular network.

Herein the term "QoS Requirements" generally refers to a set of requirements that are needed by an application.

Herein the term "Route" generally refers to a route that a device is taking or following. It can be defined in any number of formats (for example a set of route indices and a time to be at that route index). When needed, the core network may also define an Alternate Route. This is a route that reaches the same final destination but has one or more different route indices from the current route of the device. A route index may describe a series of locations. A location description may be a GPS location, an address, a base station id, a cell id, an access point ID, etc. A route may also include time indices that describe when near location should be occupied. A route may also include other information. For example: speed, acceleration, direction, inter-device distance, etc.

Herein the term "Route Flexibility" generally refers to a willingness of an In-Transit device to have its route changed by the cellular network.

Herein the term "Server Mobility Function" (Server-MF) generally refers to a functionality in the core network to aid the network-controlled device location or network-controlled device route.

Herein the term "Serving Cell Flexibility" generally refers to a willingness of a device (in any Transit Mode) to have its cell selection procedure and measurements changed by the cellular network. Those devices that are Serving Cell Flexible, may not necessarily be served by the strongest cell.

Herein the term "Sojourning Flexibility" generally refers to a willingness of a sojourning device to be moved to another location within its Sojourning Area, by the cellular network.

Herein the term "ProSe Per-Packet Priority" generally refers to a scalar value associated with a protocol data unit that defines the priority handling to be applied for transmission of that protocol data unit.

Herein the term "ProSe Per-Packet Reliability" generally refers to a scalar value associated with a protocol data unit that defines the reliability to be applied for transmission of that protocol data unit.

Herein the term "PC5" generally refers to a reference point between V2X-enabled UEs used for control and user plane. The lower protocol layers of the PC5 reference point can be based on E-UTRA or NR sidelink capabilities.

Herein the term "Sidelink" generally refers to AS functionality enabling V2X Communication between nearby UEs, using E-UTRA or NR technology, but not traversing any network node. Sidelink transmissions are defined for sidelink discovery and communication between UEs.

Herein the term "control plane" generally refers to non-IP based messaging that is used to exchange information with the network infrastructure nodes. Examples include NAS messaging, Radio Resource Control (RRC) Messaging, MDT messages, etc.

What is claimed:

1. A first apparatus providing a Network Data Analytic Function (NWDAF), comprising:
a processor configured to:
receive, from an application server, a request, wherein
the request comprises geographical information about a location, a quality of service (QoS) requirement of the application server, and an advance warning, and
the advance warning indicates advance warning requirement for the application server when the QoS requirement is not met;
determine whether the QoS requirement is met along at the location; and
send, to the application server, a response comprising an indication of the determination.

2. The first apparatus of claim 1, wherein:
the application server is a V2X application server, and
the location comprises a planned route.

3. The first apparatus of claim 1, wherein the processor is further configured to:
collect information from one or more cells near the location; and
determine, based on the information collected from the one or more cells near the location, whether the QoS requirement is met at the location.

4. The first apparatus WWWDAF of claim 1, wherein the processor is further configured to collect information from a plurality of cells near the location via an Operations and Management (OAM) system.

5. The first apparatus of claim 1, wherein the request further comprises timing information pertaining to when the application server desires data delivery.

6. The first apparatus of claim 1, wherein the processor is further configured to receive the request via a second apparatus providing a Network Exposure Function (NEF).

7. The first apparatus of claim 1, wherein the processor is further configured to send the response via a second apparatus providing a Network Exposure Function (NEF).

8. The first apparatus of claim 1, wherein the processor is further configured to receive the request via an Nnwdaf_AnalyticsInfo_Request service operation.

9. The first apparatus of claim 1, wherein the response comprises an indication of a potential QoS change at the location.

10. The first apparatus of claim 1, wherein the processor is further configured to send, to the application server, an update comprising an indication of a potential QoS change at the location.

11. The first apparatus of claim 10, wherein the update comprises information on a possible QoS change relative to a geographic area or a planned route.

12. A second apparatus providing a Network Exposure Function (NEF), comprising:
a processor configured to:
receive, from an application server, a request, wherein
the request pertains to determination of whether a quality of service (QoS) requirement of the application server is met at a location, wherein
the request comprises geographical information about the location, the QoS requirement of the application server, and an advance warning, and
the advance warning indicates advance warning requirement for the application server when the QoS requirement is not met;
send the request to a first apparatus providing a Network Data Analytic Function (NWDAF);
receive, from the first apparatus, a response, wherein the response comprises an indication of whether the QoS requirement is met at the location; and
send, to the application server, the response.

13. The second apparatus of claim 12, wherein:
the application server is a V2X application server, and
the location comprises a planned route.

14. The second apparatus of claim 12, wherein the processor is further configured to receive the request via an Nnwdaf_AnalyticsInfo_Request service operation.

15. An application server, comprising:
a processor configured to:
send, to a first apparatus providing a Network Data Analytic Function (NWDAF), a request, wherein the request pertains to determination of whether a quality of service (QoS) requirement of the application server is met at a location, the request comprises geographical information about the location, the QoS requirement of the application server, and an advance warning, and the advance warning indicates advance warning requirement for the application server when the QoS requirement is not met; and receive, from the first apparatus, a response, wherein the response comprises an indication of whether the QoS requirement of the application server is met at the location;

determine, based on the response, a new route, wherein the new route pertains to a user equipment (UE); and send, to the UE, the new route.

16. The application server of claim 15, wherein:
the application server is a V2X application server; and
the location comprises a planned route of the UE.

17. The application server of claim 15, wherein the request further comprises timing information pertaining to when the application server desires data delivery.

18. The application server of claim 15, wherein the processor is further configured to send the request via a second apparatus providing a Network Exposure Function (NEF).

19. The application server of claim 15, wherein the processor is further configured to receive the response via a second apparatus providing a Network Exposure Function (NEF).

20. The application server of claim 15, wherein the processor is further configured to send the request via an Nnwdaf_AnalyticsInfo_Request service operation.

21. The application server of claim 15, wherein the response comprises an indication of a potential QoS change at the location.

22. The application server of claim 15, wherein the processor is further configured to receive, from the application server, an update comprising an indication of a potential QoS change at the location.

23. The application server of claim 22, wherein the update comprises information on a possible QoS change relative to a geographic area or a planned route.

* * * * *